United States Patent
Lee et al.

(10) Patent No.: US 9,476,162 B2
(45) Date of Patent: *Oct. 25, 2016

(54) HIGH SOFTNESS, HIGH DURABILITY BATCH TISSUE INCORPORATING HIGH LIGNIN EUCALYPTUS FIBER

(71) Applicant: Georgia-Pacific Consumer Products LP, Atlanta, GA (US)

(72) Inventors: Jeffrey A. Lee, Neenah, WI (US); Daniel W. Sumnicht, Hobart, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,163

(22) Filed: Jan. 11, 2016

(65) Prior Publication Data

US 2016/0115648 A1    Apr. 28, 2016

Related U.S. Application Data

(63) Continuation of application No. 13/548,620, filed on Jul. 13, 2012, now Pat. No. 9,267,240.

(60) Provisional application No. 61/574,200, filed on Jul. 28, 2011.

(51) Int. Cl.
    *D21H 13/08*  (2006.01)
    *D21H 27/00*  (2006.01)
    (Continued)

(52) U.S. Cl.
    CPC .............. *D21H 13/08* (2013.01); *B32B 3/30* (2013.01); *B32B 29/005* (2013.01); *D21H 27/002* (2013.01); *D21H 27/30* (2013.01); *D21H 27/40* (2013.01); *Y10T 428/24612* (2015.01); *Y10T 428/24942* (2015.01)

(58) Field of Classification Search
    CPC .... D21H 27/002; D21H 27/30; D21H 21/32; D21H 13/08; D21C 9/001; D21C 9/002; D21C 9/005; D21C 9/007; D21C 9/10; Y10T 428/24612; Y10T 428/24942

See application file for complete search history.

(56) References Cited

U.S. PATENT DOCUMENTS

| 3,508,941 A | 4/1970 | Johnson |
| 3,545,705 A | 12/1970 | Hodgson |

(Continued)

FOREIGN PATENT DOCUMENTS

| CA | 2053505 C | 10/1991 |
| CA | 2095554 A | 8/1994 |

(Continued)

OTHER PUBLICATIONS

Espy, Herbert H., "Chapter 2: Alkaline-Curing Polymeric Amine-Epichlorohydrin Resins," in Wet Strength Resins and Their Application, L. Chan, Editor, 1994.

(Continued)

*Primary Examiner* — Catherine A Simone
(74) *Attorney, Agent, or Firm* — Laura L. Bozek

(57) ABSTRACT

A cellulosic tissue includes cellulosic fibers that include at least one of (a) chemically pulped fibers and (b) mechanically pulped fibers. The cellulosic fibers include (i) from about 10% to about 50% by weight eucalyptus fibers having a lignin content of at least about 20% by weight, and (ii) a percentage by weight of regenerated cellulosic microfibers. The cellulosic fibers further include virgin chemically pulped fibers, recycle fiber in an amount of up to 50%. The eucalyptus fiber has been prepared from eucalyptus chips by alkaline peroxide mechanical pulping, exhibiting an ISO brightness of at least $0.82 \times (\% \text{ VCP}) + 0.795 \times (\% \text{ RF})^{0.98} + 0.84 \times (\% \text{ APMP})$, in which % VCP is the percentage of virgin chemical pulp in the sheet, % RF, the percentage of recycle fiber, and % alkaline peroxide mechanical pulping (APMP), the percentage of APMP eucalyptus.

81 Claims, 34 Drawing Sheets

(51) Int. Cl.
*D21H 27/30* (2006.01)
*B32B 3/30* (2006.01)
*B32B 29/00* (2006.01)
*D21H 27/40* (2006.01)

(56) References Cited

U.S. PATENT DOCUMENTS

| | | |
|---|---|---|
| 3,549,742 A | 12/1970 | Benz |
| 3,556,932 A | 1/1971 | Coscia et al. |
| 3,556,933 A | 1/1971 | Williams et al. |
| 3,700,623 A | 10/1972 | Keim |
| 3,772,076 A | 11/1973 | Keim |
| 3,858,623 A | 1/1975 | Lefkowitz |
| 4,041,989 A | 8/1977 | Johansson et al. |
| 4,071,050 A | 1/1978 | Codorniu |
| 4,112,982 A | 9/1978 | Bugge et al. |
| 4,149,571 A | 4/1979 | Burroughs |
| 4,157,276 A | 6/1979 | Wandel et al. |
| 4,161,195 A | 7/1979 | Khan |
| 4,182,381 A | 1/1980 | Gisbourne |
| 4,184,519 A | 1/1980 | McDonald et al. |
| 4,246,221 A | 1/1981 | McCorsley, III |
| 4,314,589 A | 2/1982 | Buchanan et al. |
| 4,359,069 A | 11/1982 | Hahn |
| 4,376,455 A | 3/1983 | Hahn |
| 4,379,735 A | 4/1983 | MacBean |
| 4,453,573 A | 6/1984 | Thompson |
| 4,529,480 A | 7/1985 | Trokhan |
| 4,533,437 A | 8/1985 | Curran et al. |
| 4,543,156 A | 9/1985 | Cheshire et al. |
| 4,564,052 A | 1/1986 | Borel |
| 4,592,395 A | 6/1986 | Borel |
| 4,603,176 A | 7/1986 | Bjorkquist et al. |
| 4,605,585 A | 8/1986 | Johansson |
| 4,605,702 A | 8/1986 | Guerro et al. |
| 4,611,639 A | 9/1986 | Bugge |
| 4,640,741 A | 2/1987 | Tsuneo |
| 4,675,394 A | 6/1987 | Solarek et al. |
| 4,709,732 A | 12/1987 | Kinnunen |
| 4,720,383 A | 1/1988 | Drach et al. |
| 4,759,391 A | 7/1988 | Waldvogel et al. |
| 4,759,976 A | 7/1988 | Dutt |
| 4,804,769 A | 2/1989 | Solarek et al. |
| 4,866,151 A | 9/1989 | Tsai et al. |
| 4,942,077 A | 7/1990 | Wendt et al. |
| 4,967,085 A | 10/1990 | Bryan et al. |
| 4,973,512 A | 11/1990 | Stanley et al. |
| 4,981,557 A | 1/1991 | Bjorkquist |
| 4,983,748 A | 1/1991 | Tsai et al. |
| 4,998,568 A | 3/1991 | Vohringer |
| 5,002,635 A | 3/1991 | Gentile, Jr. et al. |
| 5,008,344 A | 4/1991 | Bjorkquist |
| 5,016,678 A | 5/1991 | Borel et al. |
| 5,023,132 A | 6/1991 | Stanley et al. |
| 5,030,081 A | 7/1991 | Schulz |
| 5,054,525 A | 10/1991 | Vohringer |
| 5,066,532 A | 11/1991 | Gaisser |
| 5,085,736 A | 2/1992 | Bjorkquist |
| 5,091,032 A | 2/1992 | Schulz |
| 5,093,068 A | 3/1992 | Schulz |
| 5,098,519 A | 3/1992 | Ramasubramanian et al. |
| 5,103,874 A | 4/1992 | Lee |
| 5,114,777 A | 5/1992 | Gaisser |
| 5,138,002 A | 8/1992 | Bjorkquist |
| 5,167,261 A | 12/1992 | Lee |
| 5,182,164 A | 1/1993 | Eklund et al. |
| 5,199,261 A | 4/1993 | Baker |
| 5,199,467 A | 4/1993 | Lee |
| 5,211,815 A | 5/1993 | Ramasubramanian et al. |
| 5,217,756 A | 6/1993 | Shinzawa |
| 5,219,004 A | 6/1993 | Chiu |
| 5,223,096 A | 6/1993 | Phan et al. |
| 5,225,269 A | 7/1993 | Bohlin |
| 5,240,562 A | 8/1993 | Phan et al. |
| 5,245,025 A | 9/1993 | Trokhan et al. |
| 5,262,007 A | 11/1993 | Phan et al. |
| 5,264,082 A | 11/1993 | Phan et al. |
| 5,269,983 A | 12/1993 | Schulz |
| 5,277,761 A | 1/1994 | Van Phan et al. |
| 5,312,522 A | 5/1994 | Van Phan et al. |
| 5,328,565 A | 7/1994 | Rasch et al. |
| 5,368,696 A | 11/1994 | Cunnane, III et al. |
| 5,372,876 A | 12/1994 | Johnson et al. |
| 5,379,808 A | 1/1995 | Chiu |
| 5,415,737 A | 5/1995 | Phan et al. |
| 5,607,551 A | 3/1997 | Farrington, Jr. et al. |
| 5,618,612 A | 4/1997 | Gstrein |
| 5,657,797 A | 8/1997 | Townley et al. |
| 5,958,187 A | 9/1999 | Bhat et al. |
| 6,059,928 A | 5/2000 | Van Luu et al. |
| 6,413,368 B1 | 7/2002 | Dwiggins et al. |
| 6,413,614 B1 | 7/2002 | Giesler, Sr. et al. |
| 6,500,302 B2 | 12/2002 | Dwiggins et al. |
| 6,808,557 B2 | 10/2004 | Holbrey et al. |
| 6,824,599 B2 | 11/2004 | Swatloski et al. |
| 6,866,768 B2 | 3/2005 | Barnett et al. |
| 6,896,768 B2 | 5/2005 | Dwiggins et al. |
| 6,899,791 B2 | 5/2005 | Sabourin |
| 7,300,541 B2 | 11/2007 | Sabourin |
| 7,399,378 B2 | 7/2008 | Edwards et al. |
| 7,442,278 B2 | 10/2008 | Murray et al. |
| 7,494,563 B2 | 2/2009 | Edwards et al. |
| 7,503,998 B2 | 3/2009 | Murray et al. |
| 7,585,389 B2 | 9/2009 | Yeh et al. |
| 7,588,660 B2 | 9/2009 | Edwards et al. |
| 7,588,661 B2 | 9/2009 | Edwards et al. |
| 7,718,036 B2 | 5/2010 | Sumnicht et al. |
| 7,758,720 B2 | 7/2010 | Sabourin |
| 7,758,721 B2 | 7/2010 | Sabourin |
| 7,763,715 B2 | 7/2010 | Hecht et al. |
| 7,789,995 B2 | 9/2010 | Super et al. |
| 7,850,823 B2 | 12/2010 | Chou et al. |
| 7,888,412 B2 | 2/2011 | Holbrey et al. |
| 7,892,400 B2 | 2/2011 | Sabourin |
| 7,967,948 B2 | 6/2011 | Nguyen |
| 8,048,263 B2 | 11/2011 | Herkel et al. |
| 8,216,423 B2 | 7/2012 | Xu |
| 8,287,986 B2 | 10/2012 | Huss et al. |
| 8,293,072 B2 | 10/2012 | Super et al. |
| 8,318,859 B2 | 11/2012 | Amano et al. |
| 8,414,738 B2 | 4/2013 | Rekoske et al. |
| 9,267,240 B2 * | 2/2016 | Lee .......... D21H 27/002 |
| 9,309,627 B2 * | 4/2016 | Miller .......... D21H 21/18 |
| 2004/0069427 A1 | 4/2004 | Xu |
| 2004/0200586 A1 | 10/2004 | Herkel |
| 2005/0217814 A1 | 10/2005 | Super et al. |
| 2006/0090271 A1 | 5/2006 | Price et al. |
| 2006/0207722 A1 | 9/2006 | Amano et al. |
| 2006/0240727 A1 | 10/2006 | Price et al. |
| 2006/0240728 A1 | 10/2006 | Price et al. |
| 2007/0204966 A1 | 9/2007 | Chou et al. |
| 2007/0224419 A1 | 9/2007 | Sumnicht et al. |
| 2007/0277947 A1 | 12/2007 | Nguyen |
| 2008/0066877 A1 | 3/2008 | Sabourin |
| 2009/0056892 A1 | 3/2009 | Rekoske et al. |
| 2009/0297781 A1 | 12/2009 | Huss et al. |
| 2010/0186910 A1 | 7/2010 | Herkel et al. |
| 2010/0186913 A1 | 7/2010 | Super et al. |
| 2010/0263815 A1 | 10/2010 | Xu |
| 2013/0029105 A1 | 1/2013 | Miller et al. |

FOREIGN PATENT DOCUMENTS

| | | |
|---|---|---|
| WO | 03/008703 A1 | 1/2003 |
| WO | 2006/001901 A1 | 1/2006 |
| WO | 2009/038730 A1 | 3/2009 |
| WO | 2009/038735 A1 | 3/2009 |

OTHER PUBLICATIONS

Westfelt, Lars, "Chemistry of Paper Wet-Strength. I. A Survey of Mechanisms of Wet Strength Development," in Cellulose Chemistry and Technology, V. 13, pp. 813-825, 1979.

(56) References Cited

OTHER PUBLICATIONS

Evans, W.P., "Cationic fabric softeners," Chemistry and Industry, 5, Jul. 1969, pp. 893-903.

Egan, R.R., "Cationic Surface Active Agents as Fabric Softeners," J. Am. Oil Chemist's Soc., V. 55 (1978), pp. 118-121.

Trivedi, B.C., et al., "Quatemization of Imidazoline: Unequivocal Structure Proof," J. Am. Oil Chemist's Soc., Jun. 1981, pp. 754-756.

Imperato, Giovanni, et al., "Low-melting sugar-urea-salt mixtures as solves for Diels-Alder reactions," Chem. Commun. 2005, pp. 1170-1172.

Gooding, R. W. and J. A. Olson, "Fractionation in a Bauer-McNett Classifier," Journal of Pulp and Paper Science, vol. 27, No. 12, Dec. 2001, pp. 423-428.

Notification of and International Search Report and Written Opinion mailed Oct. 11, 2012, in counterpart International Patent Application PCT/US2012/047918.

International Preliminary Report on Patentability issued Jan. 28, 2014, in counterpart International Patent Application No. PCT/US2012/047918.

Communication pursuant to Article 94(3) EPC dated Nov. 13, 2014, issued in counterpart European Patent Application No. 12 745 731.5-1308.

Communication with Extended European Search Report dated Sep. 16, 2015, issued in counterpart European Patent Application No. 15001587.3-1308.

Russian Official Action dated Jun. 1, 2016, issued in corresponding Russian Patent Application No. 2014107739/05.

* cited by examiner

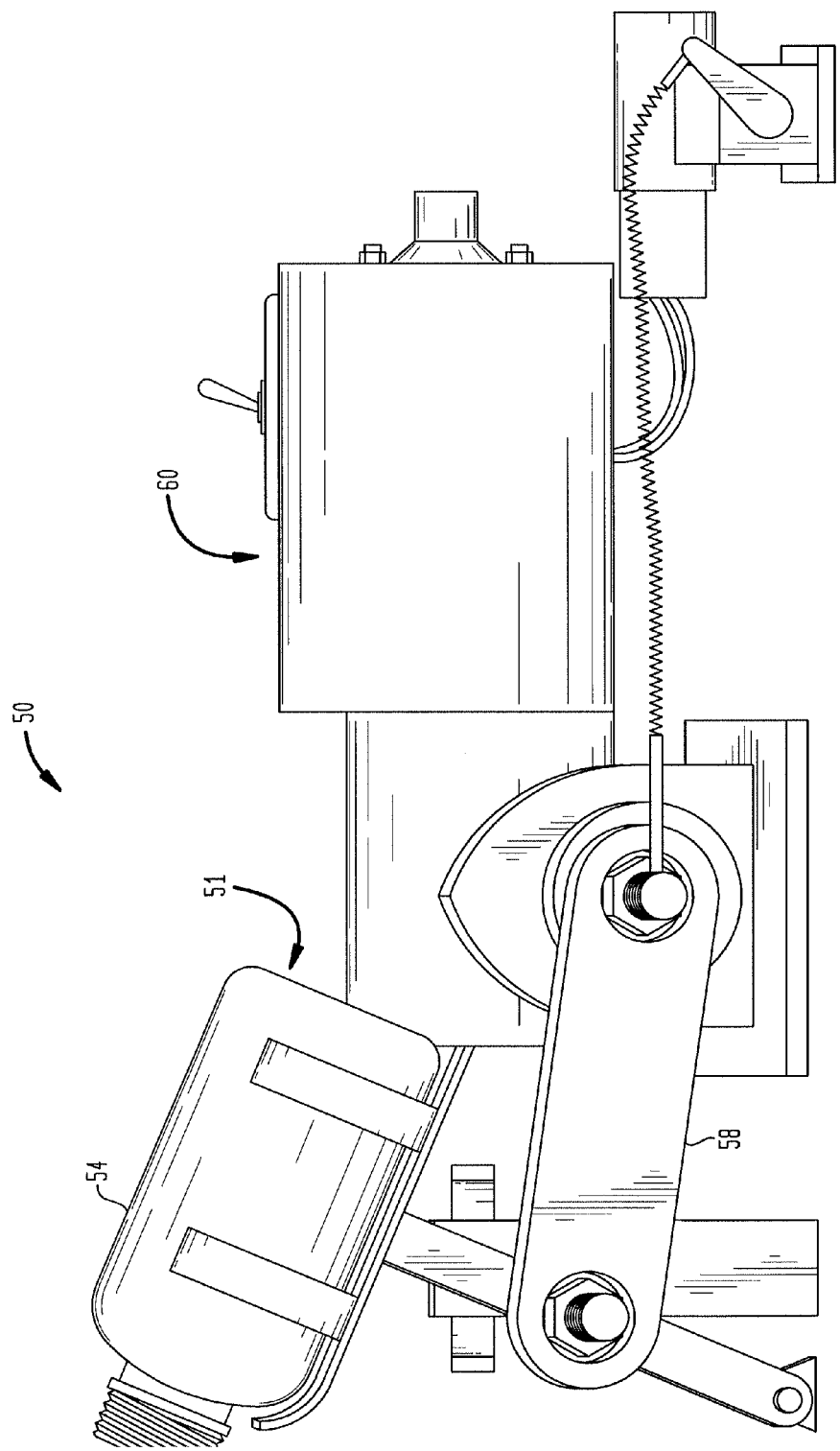

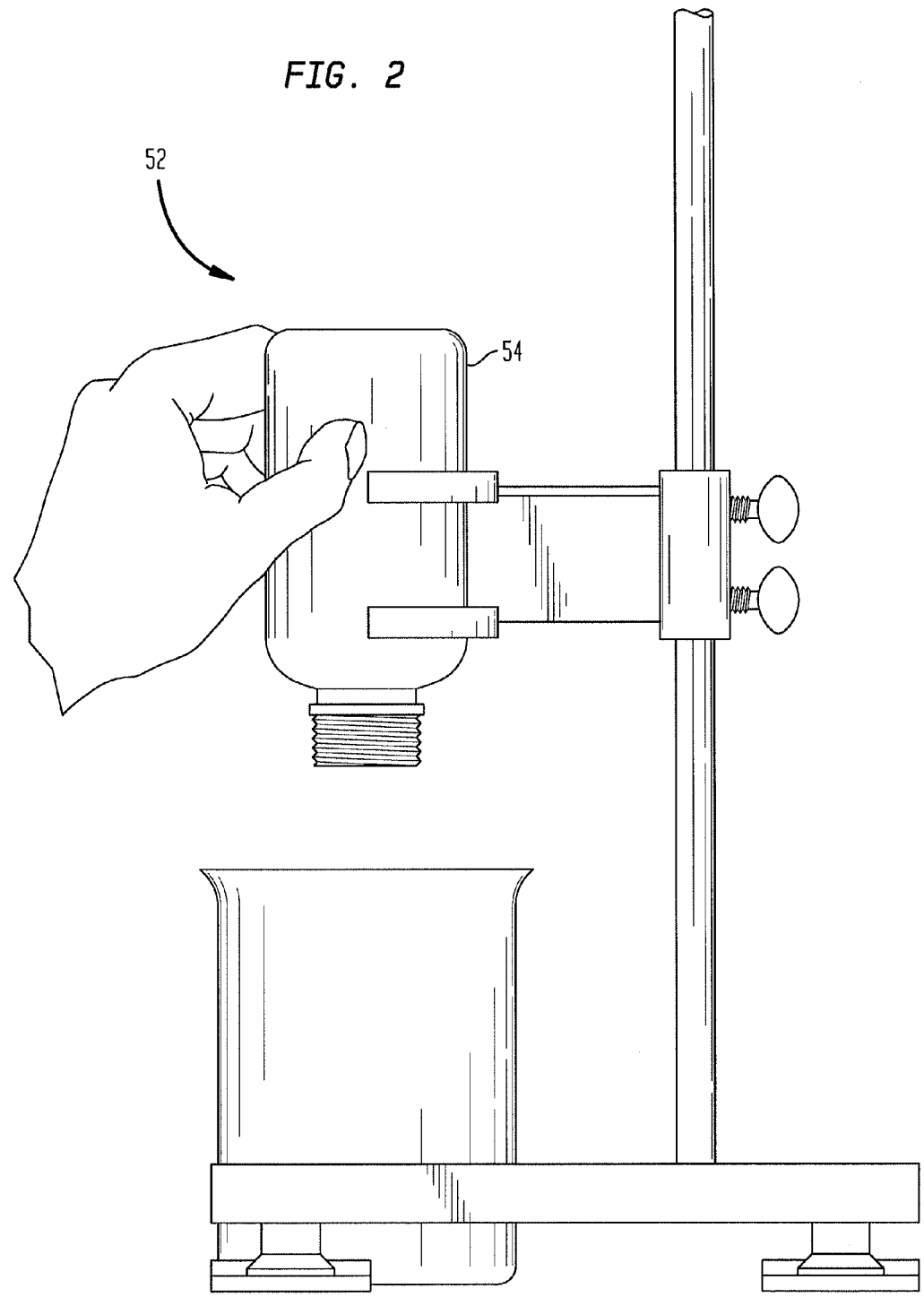

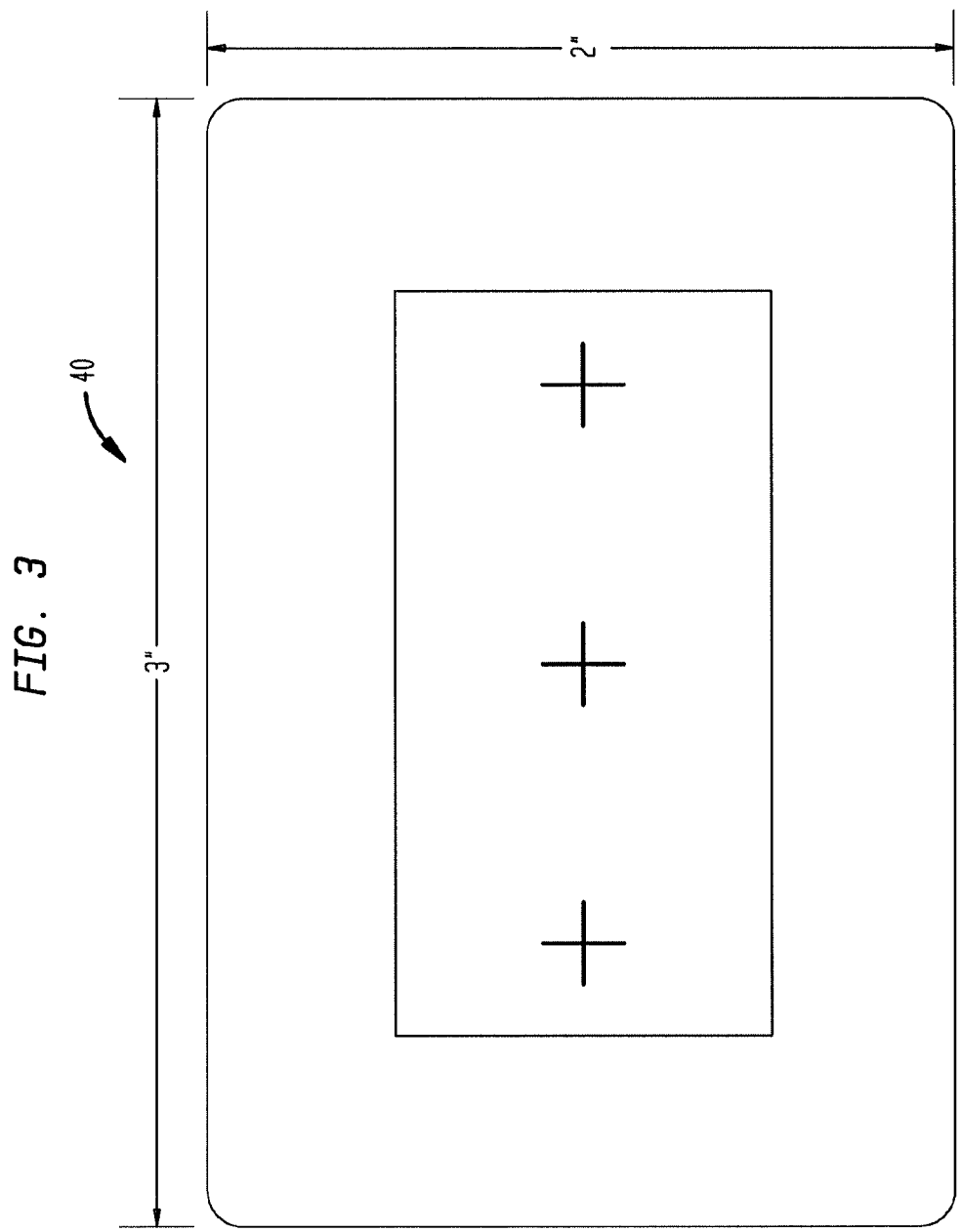

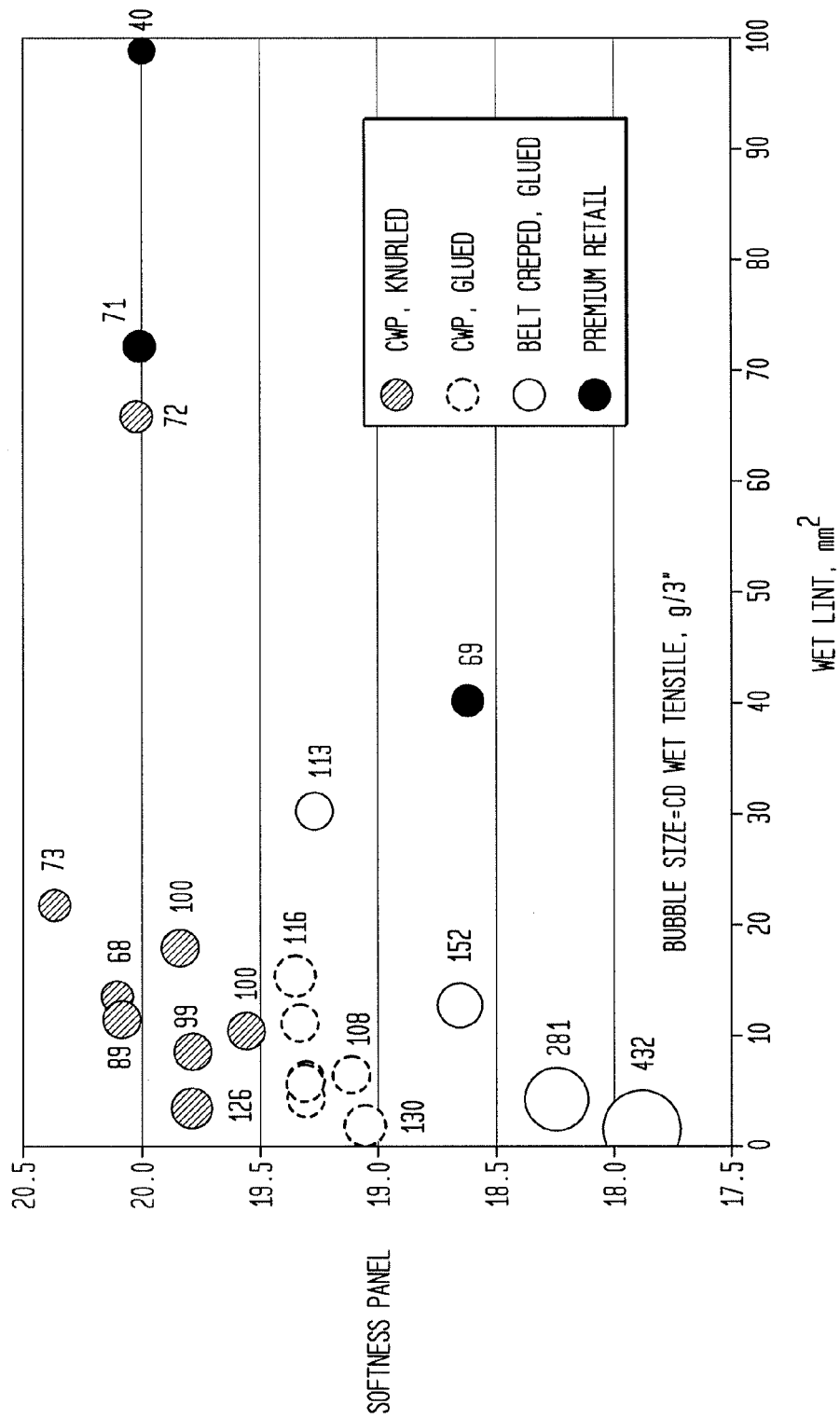

SECTION "D-D"

SECTION "E-E"

SECTION "F-F"

HEART DETAIL

TULIP DETAIL

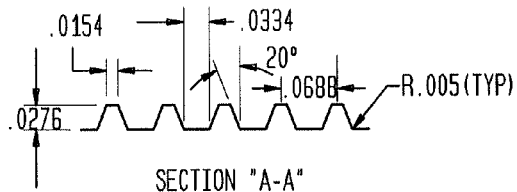
FIG. 30-A
SECTION "A-A"
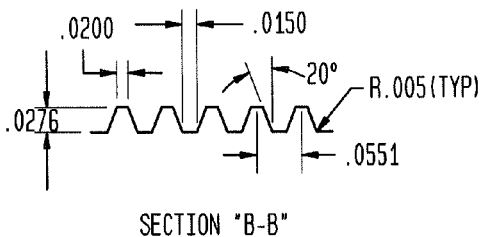
FIG. 30-B
SECTION "B-B"
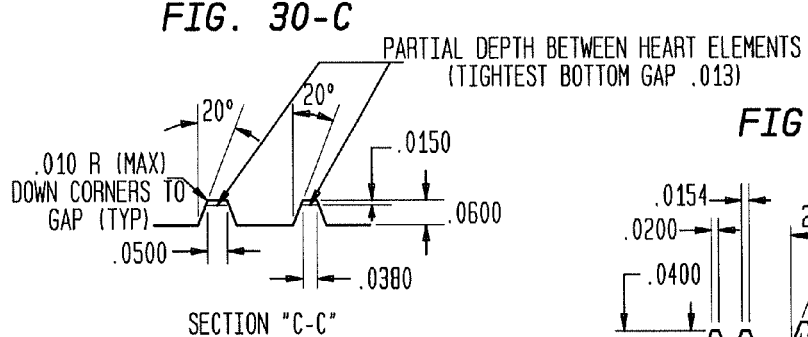
FIG. 30-C
SECTION "C-C"
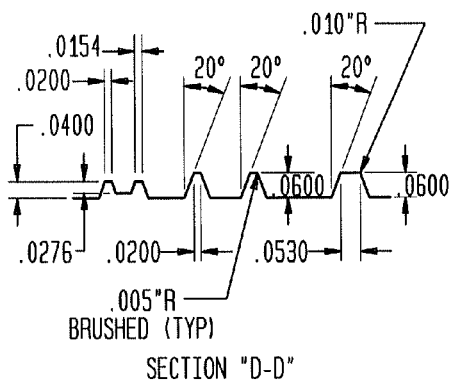
FIG. 30-D
SECTION "D-D"
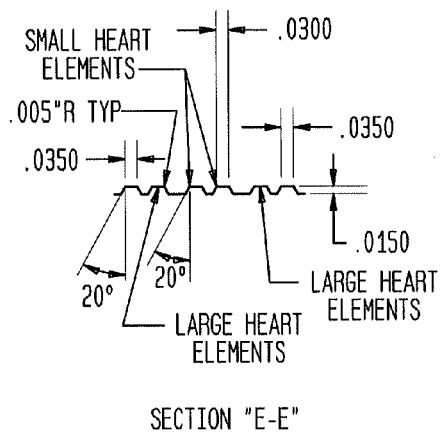
FIG. 30-E
SECTION "E-E"
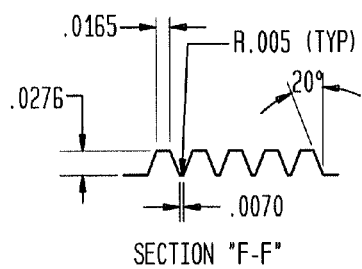
FIG. 30-F
SECTION "F-F"
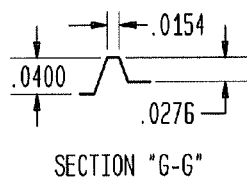
FIG. 30-G
SECTION "G-G"
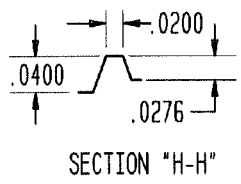
FIG. 30-H
SECTION "H-H"
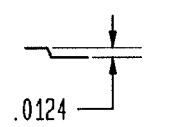
FIG. 30-J
SECTION "J-J"

HIGH SOFTNESS, HIGH DURABILITY BATCH TISSUE INCORPORATING HIGH LIGNIN EUCALYPTUS FIBER

CLAIM OF PRIORITY

This application is a continuation application of copending U.S. patent application Ser. No. 13/548,620, filed Jul. 13, 2012, which is a non-provisional patent application based upon U.S. Provisional Patent Application No. 61/574,200, of the same title, filed on Jul. 28, 2011, the priorities of which are hereby claimed and the disclosures of which are hereby incorporated herein by reference.

TECHNICAL FIELD

Bath tissue must reconcile several competing imperatives. It must be soft and strong. It must absolutely be flushable and protect the user's hands And, it has to be effective at cleaning. Bath tissue is primarily used for dry cleaning. To further complicate matters, economy grades of bath tissue that are made incorporating large amounts of recycle fiber are typically "grayer"—less bright—than tissue made using kraft fibers. Kraft fibers, however, are relatively expensive, as the yield from the kraft pulping process is quite low. This invention relates to a tissue that approaches the softness and brightness of bath tissues that are made entirely from kraft fiber, but incorporating large amounts of a high yield fiber, broadly described as alkaline peroxide mechanically pulped eucalyptus, and, in preferred embodiments, more specifically, as pre-conditioning refiner chemical alkaline peroxide mechanical pulping. To avoid repeating this long and cumbersome phrase excessively, we refer to both the broader class of alkaline pulped eucalyptus fibers and the narrower, pre-conditioning refiner chemical alkaline peroxide mechanically pulped eucalyptus fibers, as APMP eucalyptus. We have also found that we can substitute a controlled coarseness APMP eucalyptus into wet strength bath tissues as a replacement for eucalyptus kraft and obtain excellent softness, wet strength, lint resistance and wet lint resistance with very small amounts of cellulose microfiber (CMF). Surprisingly, we have also found that eucalyptus APMP can be incorporated to good effect into tissue that is intended to be used dry.

BACKGROUND

By including alkaline peroxide mechanically pulped (APMP) eucalyptus fiber and small amounts of cellulosic microfiber into a web, we have found that we can obtain excellent results, even when using conventional wet press (CWP) technology. We have further discovered that the APMP eucalyptus fiber is an excellent substitute for conventional eucalyptus kraft fiber in conventional bath tissue, imparting surprising softness, increased opacity, bulk, absorbency and reduced strength, even to tissue made with recycle furnishes.

One early pre-wettable tissue was disclosed in Bhat et al., "Prewettable High Softness Paper Product Having Temporary Wet Strength", U.S. Pat. No. 5,958,187, issued Sep. 28, 1999, relating to a paper product with a glabrous surface and adapted for use either dry or for use in a manually premoistened condition. The paper product had temporary wet strength exhibiting an initial normalized cross-machine direction (CD) wet tensile strength of at least about 25 g/l in. strip, preferably, 35 g/l in. strip as measured by the Finch Cup Test 5 seconds after immersion and a subsequent CD wet tensile strength of less than about two-thirds the initial value as measured 30 minutes after immersion. Temporary wet strength was provided by the addition to the furnish of an aldehydic temporary wet strength agent in the range of from about 2 pounds per ton to about 30 pounds per ton. The furnish also included a cationic nitrogenous softener/debonder in an amount of from about 1 pound per ton to about 6 pounds per ton. The CD dry tensile strength of the paper product was from about 133 g/l in. strip up to about 267 g/l in. strip, and the tensile modulus was from about 10 to about 32 g/% strain, while the geometric mean friction deviation value (GM MMD) was from about 0.26 to about 0.10. The CD wet strength of the product decayed to about 15 g/l in. strip within 10 hours after immersion. When rubbed against a skin-like surface in a moistened condition, the paper product remained substantially free of pilling. Significantly, in Bhat et al., the wet abrasion resistance of a 2" by 4.5" sample of tissue was measured under a load of 135 grams against a wetted pigskin and visual observation was made to determine whether the sample left pills, shreds or lint behind.

Another early pre-wettable tissue was disclosed in Van Luu et al. [sic, Luu et al.], "Prewettable High Softness Paper Product Having Temporary Wet Strength", U.S. Pat. No. 6,059,928, issued May 9, 2000, in which a temporary wet strength agent comprising uncharged chemical moieties such as aldehydes, and aldehyde containing polymers, polyols and cyclic ureas or mixtures thereof in the range of from about 2 pounds per ton to about 30 pounds per ton is added to the web to provide the temporary wet strength. In this application, glyoxal was preferably sprayed on the sheet after it left the Yankee dryer.

Canadian Patent Application No. 2,095,554 in the name of William D. Lloyd, published Aug. 6, 1994, discloses hardwood bleached chemithermomechanical pulp (BCTMP) fibers at amounts of about 5 weight percent or greater, which provide a soft tissue useful for use as facial or bath tissue, but fails to disclose the degree of bleaching and chemical refining applied to his fibers and is devoid of information concerning the brightness, lignin content or Kappa number of his fibers, other than to state that the fibers contain "substantial amounts of lignin" and that the pulping yield is "about 90% or greater". Lloyd also states that "it is not necessary to bury the BCTMP fibers in the middle of the tissue sheet by layering. Instead, the tissue sheets can be blended using a mixture of hardwood BCTMP fibers (for softness) and longer softwood fibers (for strength). If a layered tissue is preferred, the hardwood BCTMP fibers can be utilized in the outer layer(s)."

SUMMARY OF THE INVENTION

Three-ply, conventional wet press (CWP), wet-durable bath tissue prototypes of the present invention were softer than Ultra Strong Charmin® bath tissue, while being up to 90% more durable with up to 96% less wet lint. Contributors to these results include stratification of softwood and/or cellulose microfiber (CMF) in the Yankee layer, concentration of temporary wet strength in the Yankee layer, and debonding of the air layer. Integrated fiber, such as eucalyptus APMP or southern furnish away from the outer surface, offsets the cost of cellulose microfiber (CMF) and premium furnish.

Results suggest that a three-ply format like Quilted Northern Ultra Plush® could deliver a tissue with high softness, good durability, and low lint, using only wood pulp in the furnish. CMF and fiber re-orienting belt creping technology, and glue lamination, improve the results.

We have found that we can achieve this desirable combination of properties in a two- or a three-ply sheet formed from cellulosic basesheet, the multi-ply sheet having a basis weight of from about 15 to about 35 lbs comprising from about 3% to about 30% cellulosic microfiber, from about 70% to about 90% wood pulp fibers, with a geometric mean (GM) dry tensile of from about 35 to 80 g/3 in. per pound of basis weight, a CD dry tensile of between about 30 to about 60 g/3 in. per pound of basis weight, sufficient wet strength resin to provide a CD wet tensile of from about 8.5 to about 20 g/3 in. per pound of basis weight, and a caliper of at least 4 mils per 8 sheets per pound of basis weight. Preferably, such a multi-ply tissue will have an opacity of at least about 2.5 Macbeth Opacity Units per pound of basis weight. More preferably, the basis weight will be between 22 and 37 lbs per 3000 sq ft ream. Upon testing for dry lint, as referenced herein, sheets of the present invention will exhibit a $\Delta L^*$ of less than about 5. "L*" as used in this connection relates to International Commission on Illumination (CIE) 1976, also known as CIELAB measurement of lightness, and should not be confused with Hunter lightness typically denominated "L". In this connection, the asterisk "*" is not a reference mark directing the reader to some other location in this document, but is a portion of the commonly used symbol for CIE 1976 lightness "L*". When tested for wet lint as set forth herein, sheets of the present invention will exhibit a wet abraded lint area of less than about 40 mm². Alternatively, when tested as set forth herein, resistance to wet linting will be represented by the number of fibers that are removed having a length of greater than 350 μm, with products of the invention suffering a loss of less than 2500 fibers having a length of greater than 350 μm.

Another aspect of this invention relates to a roll of bath tissue comprising cellulosic fibers selected from the group consisting of chemically pulped fibers and mechanically pulped fibers, not more than 30% by weight of the tissue being chemically pulped softwood fibers, and from about 10 to about 50% by weight of eucalyptus fibers having a lignin content of at least about 20% by weight, wherein the eucalyptus fiber has been prepared from eucalyptus chips by pre-conditioning refiner chemical alkaline peroxide mechanical pulping, and from about 3 to about 10% by weight of regenerated cellulosic microfiber, and the tissue exhibits a machine direction (MD) stretch of between about 20 and 30%.

Still another aspect of this invention relates to a three-ply bath tissue product having an upper stratified ply comprising two strata, an outer stratum and an inner stratum, the outer stratum comprising a blend of at least about 30% to about 70% kraft fiber and at least 30% to about 70% by weight of eucalyptus kraft and having a basis weight of at least about 5 to about 12 lbs per 3000 sq ft ream, the inner stratum comprising at least about 50% eucalyptus fibers having a lignin content of at least about 20% by weight, and a basis weight of at least about 2.0 lbs per 3000 sq ft ream, an interior ply having a basis weight of at least about 6 to about 15 lbs per 3000 sq ft ream, comprising at least about 30% to about 70% eucalyptus fibers having a lignin content of at least about 20% by weight, and from at least about 30% to about 70% by weight of bleached softwood kraft fibers, and a lower stratified ply comprising two strata, a first stratum and a second stratum, the first stratum comprising from at least about 30% to about 70% kraft fiber and from about 30% to about 70% by weight of eucalyptus kraft and having a basis weight of about 5 to about 12 lbs per 3000 sq ft ream, the second stratum comprising at least about 50% eucalyptus fibers having a lignin content of at least about 20% by weight and a basis weight of at least about 2.0 lbs per 3000 sq ft ream. Preferably, the interior ply and the upper ply have been joined by being embossed together, the fibrous composition of the upper stratified ply is substantially the same as the fibrous composition of the lower stratified ply, the depth of emboss of the lower stratified ply is less than 80%, more preferably, less than 50%, of the depth of emboss of the upper stratified ply, while the lower stratified ply is generally unembossed, the outer stratum of the upper ply further comprises at least about 5%, more preferably, at least about 8%, still more preferably, from about 15 to 35%, by weight of individualized regenerated cellulosic microfiber having a diameter of no more than about 5 microns, more preferably, having an average diameter of no more than about 4 microns, still more preferably, no more than about 2 microns, most preferably, no more than about 1 micron, and passing a screen of about 14 mesh, more preferably, having a number average length of between about 50 microns and 2000 microns. Preferably, each of the inner stratum of the upper ply and the second stratum of the lower ply comprises at least about 70% eucalyptus fibers having a lignin content of at least about 20% by weight, while the interior ply is heavily creped, exhibiting a bulk at least 3% greater than that of the exterior plies, this increased bulk usually resulting from both the use of APMP eucalyptus and increased crepe in the middle ply.

An especially preferred embodiment of the present invention is a three-ply bath tissue product having an upper stratified ply comprising two strata, an outer stratum and an inner stratum, the outer stratum comprising a blend of at least about 30% to about 70% kraft fiber and at least 30% to about 70% by weight of eucalyptus kraft and at least about 5% by weight of individualized regenerated cellulosic microfiber having an average diameter of no more than about 4 microns and an average length of between about 50 microns and 2000 microns, the outer stratum having a basis weight of at least about 5 to about 12 lbs per 3000 sq ft ream, the inner stratum comprising at least about 70% eucalyptus fibers having a lignin content of at least about 20% by weight, and a basis weight of at least about 2.0 lbs per 3000 sq ft ream, a homogeneous interior ply having a basis weight of at least about 6 to about 15 lbs per 3000 sq ft ream, comprising at least about 40% to about 90% eucalyptus fibers having a lignin content of at least about 20% by weight, and from at least about 10% to about 60% by weight of bleached kraft fiber, and a lower stratified ply comprising two strata, a first stratum and a second stratum, the first stratum comprising from at least about 30% to about 70% kraft fiber and from about 30% to about 70% by weight of eucalyptus kraft and having a basis weight of about 5 to about 12 lbs per 3000 sq ft ream, the second stratum comprising at least about 70% eucalyptus fibers having a lignin content of at least about 20% by weight and a basis weight of at least about 2.0 lbs per 3000 sq ft ream and the upper stratified ply and the lower stratified ply have substantially identical fibrous compositions.

Preferred tissues of the present invention containing both APMP and CMF will exhibit an International Organization for Standardization (ISO) brightness of the upper ply (facing to the exterior of the roll) of at least:

$$0.82 \times (\% \text{ VCP}) + 0.795 \times (\% \text{ RF})^{0.98} + 0.84 \times (\% \text{ APMP} + \text{CFM}),$$

where % VCP is the percentage of virgin chemical pulp in the sheet, % RF, the percentage of recycle fiber and %

APMP+CMF is the percentage of APMP eucalyptus and regenerated cellulosic microfiber in the outer stratified ply and the weight percentage of chemically pulped softwood fiber in the tissue is limited to no more than 30%, while the eucalyptus fibers in the interior ply have a lignin content of at least about 23%, and exhibit an ISO brightness of at least about 82. Even though we prefer not to use APMP eucalyptus in the outer stratum, when used in a lower stratum of the ply, usually, the second, the brightness of the ply is strongly influenced by the brightness of the fiber in the interior layers.

BRIEF DESCRIPTION OF THE DRAWINGS

The invention is described below with reference to the drawings, wherein:

FIG. 1 is a schematic illustration of a shaker for use in the "Dispersibility Test" described herein.

FIG. 2 is a schematic illustration of a fixture used for holding the test bottle used in the "Dispersibility Test" upright, while the contents are being drained therefrom.

FIG. 3 illustrates a marked microscope slide used in the Wet Abrasion Lint Test.

FIGS. 5 and 5A are bubble graphs illustrating the inter-relationship among the softness, CD wet strength and wet linting resistance of several prototype products.

FIGS. 30, 30-1, 30-2, 30-A to 30-H, and 30-J illustrate details of the emboss pattern HVS 9 referred to herein.

DETAILED DESCRIPTION

Figure 4:
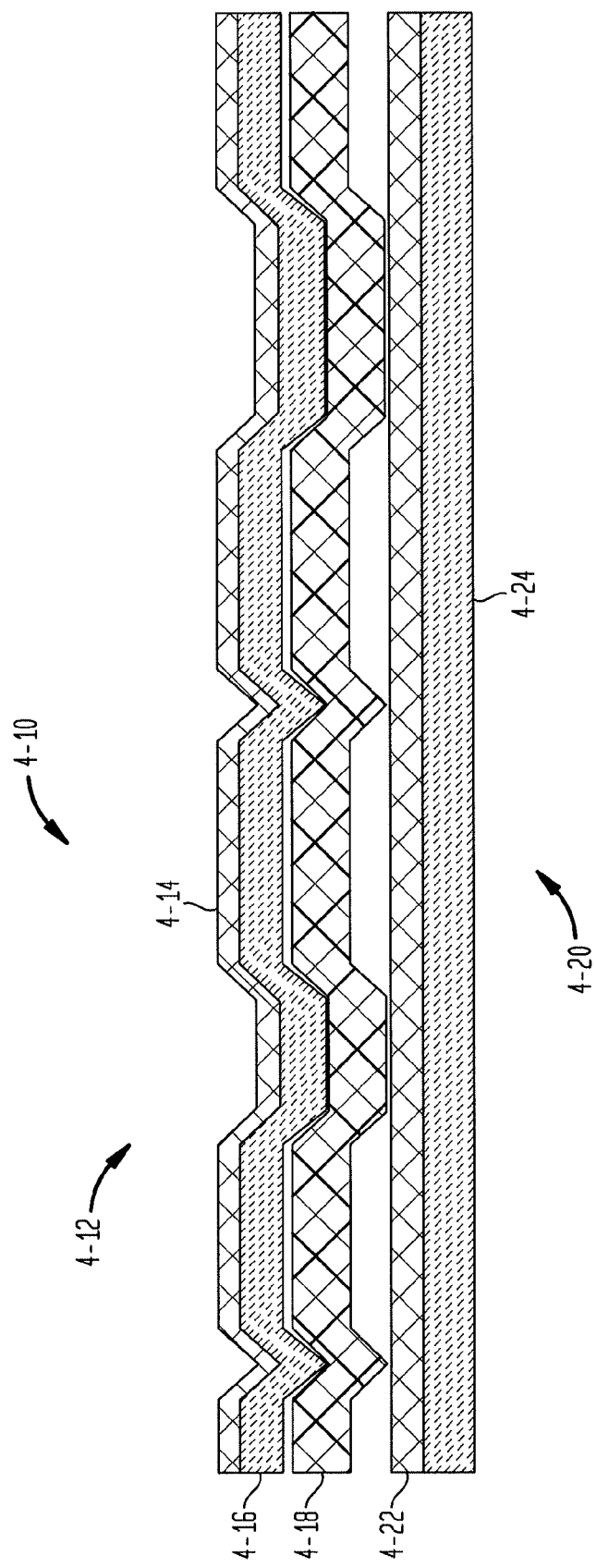
FIG. 4 illustrates a schematic sectional view of a three-ply tissue with two stratified outer plies and a homogenous inner ply, wherein eucalyptus APMP is incorporated in all three plies.

The invention is described below with reference to numerous embodiments. This discussion is for purposes of illustration only. Modifications to particular examples within the spirit and scope of the present invention, set forth in the appended claims, will be readily apparent to one of skill in the art.

Terminology used herein is given its ordinary meaning consistent with the exemplary definitions set forth immediately below, mg refers to milligrams, $m^2$ refers to square meters, $mm^2$ refers to square millimeters, and so forth.

The creping adhesive "add-on" rate is calculated by dividing the rate of application of adhesive (mg/min) by surface area of the drying cylinder passing under a spray applicator boom ($m^2$/min). The resinous adhesive composition most preferably consists essentially of a polyvinyl alcohol resin and a polyamide-epichlorohydrin resin, wherein the weight ratio of polyvinyl alcohol resin to polyamide-epichlorohydrin resin is from about two to about four. The creping adhesive may also include a modifier sufficient to maintain good transfer between the creping belt and the Yankee cylinder, generally, less than 5% by weight modifier and, more preferably, less than about 2% by weight modifier, for peeled products. For blade creped products, from about 5% to about 25% modifier or more may be used.

Unless otherwise specified, "basis weight", BWT, bwt, BW, and so forth, refers to the weight of a 3000 square-foot (278.7 m$^2$) ream of product (basis weight is also expressed in g/m$^2$ or gsm). Likewise, "ream" means a 3000 square-foot (278.7 m$^2$) ream unless otherwise specified.

For reel crepe, the reel crepe ratio is typically calculated as the Yankee speed divided by reel speed. To express reel crepe as a percentage, 1 is subtracted from the reel crepe ratio and the result multiplied by 100.

Calipers and/or bulk reported herein may be measured at 8 or 16 sheet calipers as specified. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in/sec (5.87 mm/sec) descent rate. For finished product testing, each sheet of product to be tested must have the same number of plies as the product as sold. For testing, in general, eight sheets are selected and stacked together. For napkin testing, napkins are unfolded prior to stacking. For base sheet testing off of winders, each sheet to be tested must have the same number of plies as produced off of the winder. For base sheet testing off of the papermachine reel, single plies must be used. Sheets are stacked together, aligned in the machine direction (MD). Bulk may also be expressed in units of volume/weight by dividing caliper by basis weight.

The terms "cellulosic", "cellulosic sheet," and the like, are meant to include any wet-laid product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include nonwood fibers, such as cotton fibers or cotton derivatives, abaca, kenaf, sabai grass, flax, esparto grass, straw, jute hemp, bagasse, milkweed floss fibers, and pineapple leaf fibers, and wood fibers such as those obtained from deciduous and coniferous trees, including softwood fibers, such as northern and southern softwood kraft fibers, hardwood fibers, such as eucalyptus, maple, birch, aspen, or the like. Papermaking fibers can be liberated from their source material by any one of a number of chemical pulping processes familiar to one experienced in the art, including sulfate, sulfite, polysulfide, soda pulping, etc. The pulp can be bleached if desired by chemical means including the use of chlorine, chlorine dioxide, oxygen, alkaline peroxide, and so forth. The products of the present invention may comprise a blend of conventional fibers (whether derived from virgin pulp or recycle sources) and high coarseness lignin-rich tubular fibers, mechanical pulps such as bleached chemithermomechanical pulp (BCTMP). "Furnishes" and like terminology refers to aqueous compositions including papermaking fibers, optionally, wet strength resins, debonders, and the like, for making paper products. Recycle fiber is typically more than 50% by weight hardwood fiber and may be 75% to 80% or more hardwood fiber. For purposes of this invention, a particularly preferred method for pulping of eucalyptus chips is usually referred to as alkaline peroxide mechanical pulping or eucalyptus APMP, even though the longer, but less euphonious name of pre-conditioning refiner chemical alkaline peroxide mechanical pulp describes the more preferred process in more detail. In this application, when the term eucalyptus APMP or APMP eucalyptus is used, we intend to include pre-conditioning refiner chemical alkaline peroxide mechanical pulped eucalyptus within that genus as well. We have found that we can get surprisingly good softness, bulk and wet properties using eucalyptus APMP, in conjunction with fibrillated cellulosic microfibers, often referred to as "CMF".

As used herein, the term "compactively dewatering the web or furnish" refers to mechanical dewatering by overall wet pressing, such as on a dewatering felt, for example, in some embodiments, by use of mechanical pressure applied continuously over the web surface as in a nip between a press roll and a press shoe, wherein the web is in contact with a papermaking felt. The terminology "compactive dewatering" is used to distinguish from processes wherein the initial dewatering of the web is carried out largely by thermal means, as is the case, for example, in U.S. Pat. No. 4,529,480 to Trokhan and U.S. Pat. No. 5,607,551 to Farrington et al. Compactively dewatering a web thus refers, for example, to removing water from a nascent web having a consistency of less than 30% or so by application of pressure thereto and/or increasing the consistency of the web by about 15% or more by application of pressure thereto, that is, increasing the consistency, for example, from 30% to 45%. In U.S. Pat. No. 7,399,378, entitled "Fabric Crepe Process for Making Absorbent Sheet," and the many applications related to it, the importance of the distinction between creping using a woven fabric and a creping belt formed by perforating a solid belt was of minor importance, so the term "belt" could apply to either creping medium. In U.S. Patent Application Publication No. 2010/0186913, now U.S. Pat. No. 8,293,072, entitled "Belt-Creped, Variable Local Basis Weight Absorbent Sheet Prepared With Perforated Polymeric Belt," and its related applications, however, the distinction between the use of a creping fabric and a perforated polymeric belt is of considerable importance, as it has been found that the use of a perforated polymeric belt makes it possible to obtain consolidated regions, particularly, consolidated saddle shaped regions, in the web, giving it improved physical properties over the webs previously formed using the technique of creping from a transfer drum. For convenience, we refer to this method of forming a sheet as Fiber Reorienting Belt Creping or FRBC. Further, in related applications, it is demonstrated that CMF containing wipers made using a perforated polymeric belt have substantial performance advantages over wipers made using a woven creping fabric, which we refer to as Fiber Reorienting Fabric Creping or FRFC. Throughout this application, we have endeavored to make this distinction explicit, but, definitional language in applications incorporated by reference notwithstanding, in this application, belts and creping fabrics should not be considered to be synonymous.

Consistency refers to % solids of a nascent web, for example, calculated on a bone dry basis. "Air dry" means including residual moisture, by convention, up to about 10% moisture for pulp and up to about 6% for paper. A nascent web having 50% water and 50% bone dry pulp has a consistency of 50%.

When the term "FRBC" is used herein, the reference is to papermaking technology as disclosed in U.S. Patent Application Publication No. 2010/0186913, now U.S. Pat. No. 8,293,072, while "FRFC" is used to refer to the technology of using a fabric to crepe from a transfer surface as disclosed in U.S. Pat. No. 7,494,563; U.S. Pat. No. 7,399,378; U.S.

Patent Application Publication No. 2005/0217814, now U.S. Pat. No. 7,789,995; U.S. Pat. No. 7,442,278; U.S. Pat. No. 7,503,998; U.S. Pat. No. 7,588,660; U.S. Pat. No. 7,585,389; U.S. Patent Application Publication No. 2007/0204966, now U.S. Pat. No. 7,850,823; U.S. Pat. No. 7,588,661; and related applications, even though those processes are usable with belts as well. The disclosures of the foregoing patents, publications and patent applications referred to above are incorporated herein by reference in their entireties.

FPM, Fpm and fpm refer to feet per minute, while fps refers to feet per second.

MD means machine direction and CD means cross-machine direction.

Pusey and Jones (P&J) hardness (indentation) is measured in accordance with American Society for Testing and Materials (ASTM) D 531, and refers to the indentation number (standard specimen and conditions).

"Predominantly" means more than 50% of the specified component, by weight, unless otherwise indicated.

Figure 27:
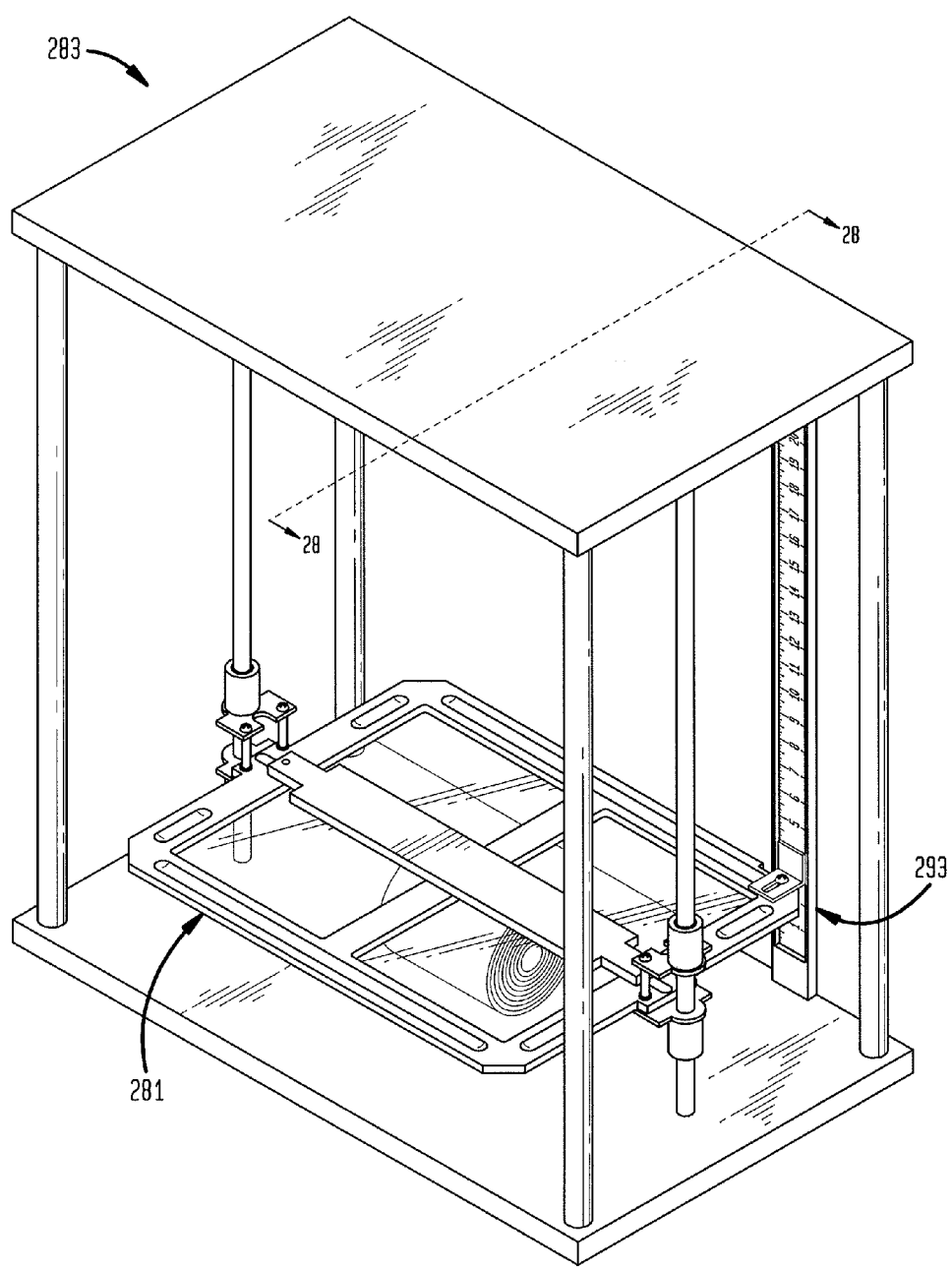
FIG. 27 is an isometric schematic illustrating a device to measure roll compression of tissue products.
Figure 28:
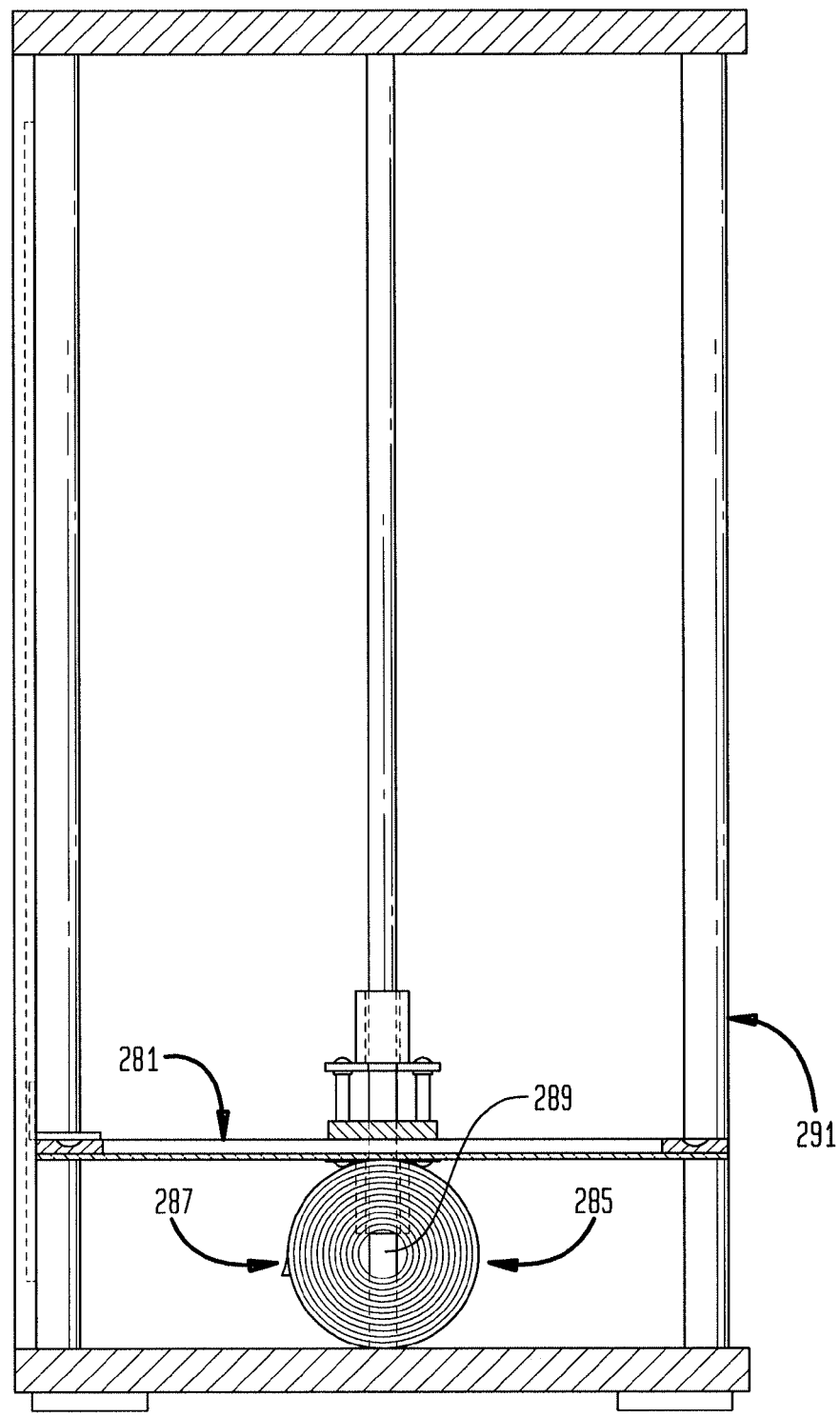
FIG. 28 is a sectional view taken along line 28-28 of FIG. 27.
Figure 29A:
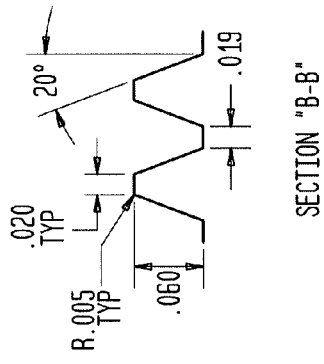
FIGS. 29, 29A-29F, 29H, and 29T illustrate details of the emboss pattern U 19 referred to herein.
Figure 29B:
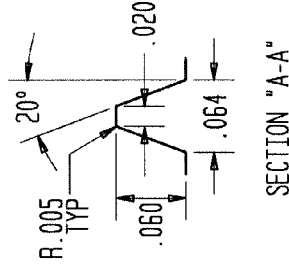
Figure 29C:
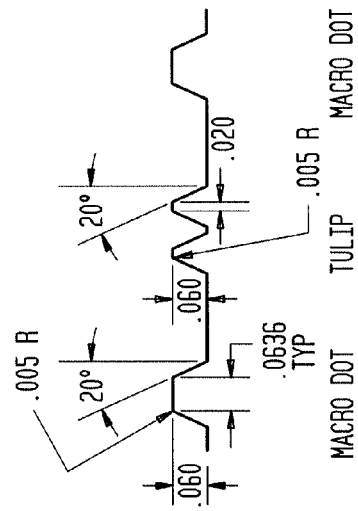
Figure 29:
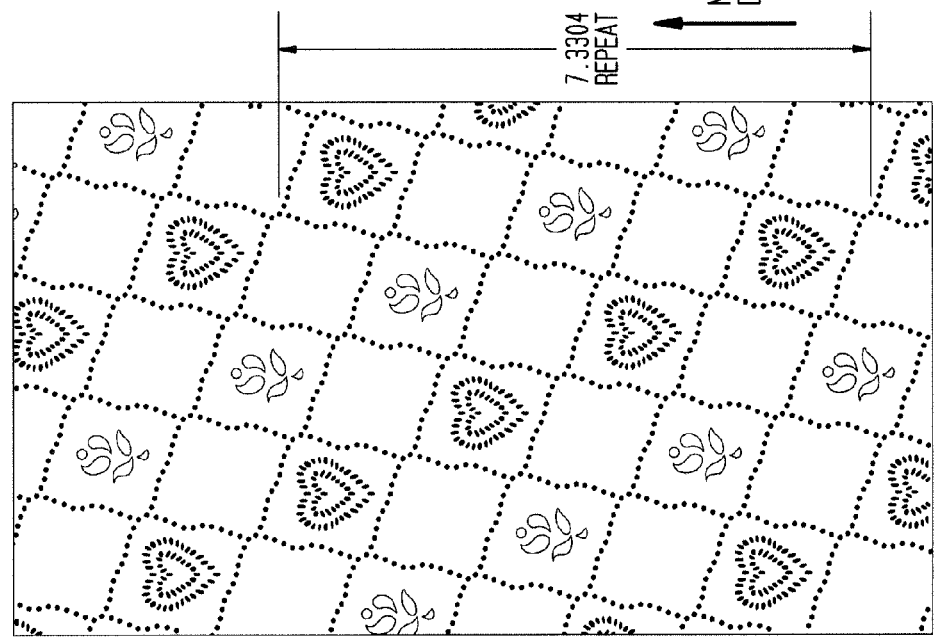
Figure 29D:
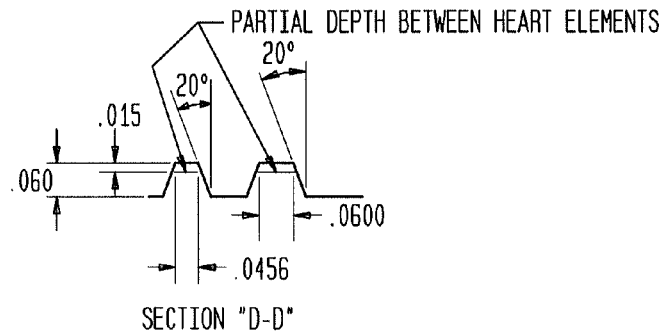
Figure 29E:
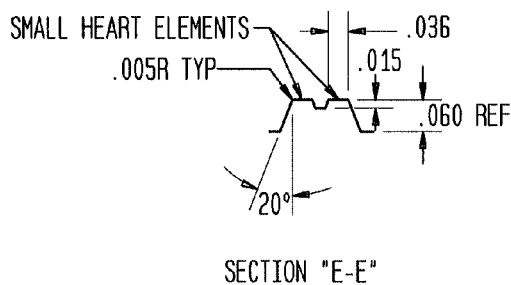
Figure 29F:
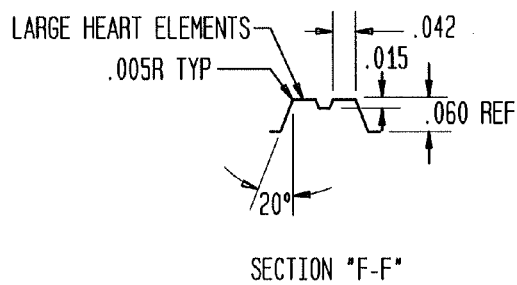
Figure 29H:
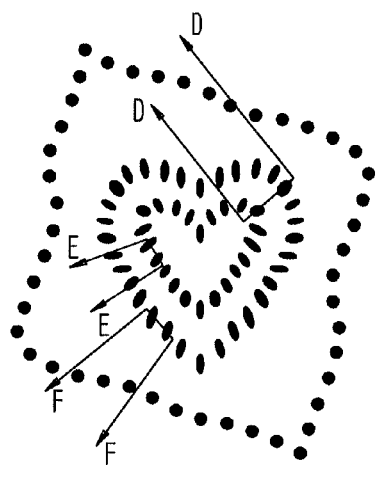
Figure 29T:
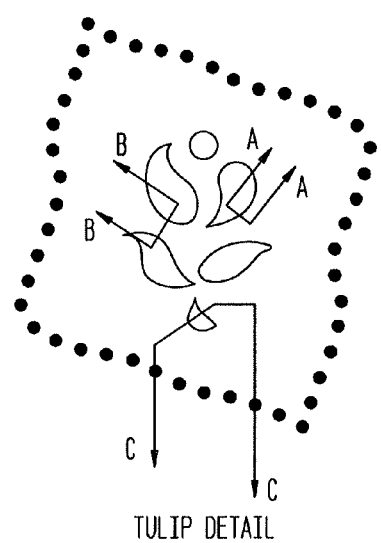

Roll compression is measured by compressing the roll under a 1500 g flat platen 281 of a test apparatus 283 similar to that shown in FIGS. 27 and 28. Sample rolls 285 are conditioned and tested in an atmosphere of 23.0°±1.0° C. (73.4°±1.8° F.). A suitable test apparatus 283 with a movable 1500 g platen 281 (referred to as a Height Gauge) is available from:

Research Dimensions
1720 Oakridge Road
Neenah, Wis. 54956
920-722-2289
920-725-6874 (FAX).

The test procedure is generally as follows:

(a) Raise the platen 281 and position the roll 285 to be tested on its side, centered under the platen, with the tail seal 287 to the front of the gauge 291 and the core 289 parallel to the back of the gauge 291.

(b) Slowly lower the platen 281 until it rests on the roll 285.

(c) Read the compressed roll diameter or sleeve height from the gauge pointer 293 to the nearest 0.01 inch (0.254 mm).

(d) Raise the platen 281 and remove the roll 285.

(e) Repeat for each roll to be tested.

To calculate roll compression in percent, the following formula is used:

$$RC(\%) = 100 \times \frac{\text{(initial roll diameter} - \text{compressed roll diameter)}}{\text{initial roll diameter}}.$$

Dry tensile strengths (MD and CD), stretch, ratios thereof, modulus, break modulus, stress and strain are measured with a standard Instron test device or other suitable elongation tensile tester that may be configured in various ways, typically, using 3 inch (76.2 mm) or 1 inch (25.4 mm) wide strips of tissue or towel, conditioned in an atmosphere of 23°±1° C. (73.4°±1° F.) at 50% relative humidity for 2 hours. The tensile test is run at a crosshead speed of 2 in/min (50.8 mm/min). Break modulus is expressed in grams/3 inches/% strain or its SI equivalent of g/mm/% strain. % strain is dimensionless and need not be specified. Unless otherwise indicated, values are break values. Geometric mean (GM) refers to the square root of the product of the MD and CD values for a particular product. Tensile energy absorption (TEA), which is defined as the area under the load/elongation (stress/strain) curve, is also measured during the procedure for measuring tensile strength. Tensile energy absorption is related to the perceived strength of the product in use. Products having a higher TEA may be perceived by users as being stronger than similar products that have lower TEA values, even if the actual tensile strength of the two products are the same. In fact, having a higher tensile energy absorption may allow a product to be perceived as being stronger than one with a lower TEA, even if the tensile strength of the high-TEA product is less than that of the product having the lower tensile energy absorption. When the term "normalized" is used in connection with a tensile strength, it simply refers to the appropriate tensile strength from which the effect of basis weight has been removed by dividing that tensile strength by the basis weight. In many cases, similar information is provided by the term "breaking length".

Tensile ratios are simply ratios of an MD value determined by way of the foregoing methods, divided by the corresponding CD value. Unless otherwise specified, a tensile property is a dry sheet property.

"Upper", "upwardly" and like terminology is used purely for convenience and refers to a position or direction toward the caps of the dome structures, that is, the belt side of the web, which is generally opposite to the Yankee side, unless the context clearly indicates otherwise.

The wet tensile of the tissue of the present invention is measured generally following Technical Association of the Pulp and Paper Industry (TAPPI) Method T 576 pm 7, using a three-inch (76.2 mm) wide strip of tissue that is folded into a loop, clamped in a special fixture termed a Finch Cup, then immersed in a water. A suitable Finch cup, 3-in. (76.2 mm), with base to fit a 3-in. (76.2 mm) grip, is available from:

High-Tech Manufacturing Services, Inc.
3105-B NE 65$^{th}$ Street
Vancouver, Wash. 98663
360-696-1611
360-696-9887 (FAX).

For fresh basesheet and finished product (aged 30 days or less for towel product, aged 24 hours or less for tissue product) containing wet strength additive, the test specimens are placed in a forced air oven heated to 105° C. (221° F.) for five minutes. No oven aging is needed for other samples. The Finch cup is mounted onto a tensile tester equipped with a 2.0 pound (8.9 Newton) load cell with the flange of the Finch cup clamped by the tester's lower jaw and the ends of tissue loop clamped into the upper jaw of the tensile tester. The cup portion of the Finch Cup is filled with a standardized "tap water" comprising: 0.006% calcium chloride, 0.006% magnesium chloride 6H$_2$O, 0.007% sodium bicarbonate in balance purified water at a pH of approximately 6.5.

The sample is immersed in water that has been adjusted to a pH of 7.0±0.1 and the tensile is tested after a 5 second immersion time using a crosshead speed of 2 inches/minute (50.8 mm/minute). The results are expressed in g/3 in. or (g/mm), dividing the readout by two to account for the loop, as appropriate.

A translating transfer surface refers to the surface from which the web is creped onto the creping belt. The translating transfer surface may be the surface of a rotating drum as described hereafter, or may be the surface of a continuous smooth moving belt or another moving fabric that may have surface texture, and so forth. The translating transfer surface needs to support the web and to facilitate the high solids creping, as will be appreciated from the discussion that follows.

Velocity delta means a difference in linear speed.

The void volume and/or void volume ratio, as referred to hereafter, are determined by saturating a sheet with a non-polar POROFIL™ liquid, and measuring the amount of liquid absorbed. The volume of liquid absorbed is equivalent to the void volume within the sheet structure. The % weight increase (PWI) is expressed as grams of liquid absorbed per gram of fiber in the sheet structure times 100, as noted hereafter. More specifically, for each single-ply sheet sample to be tested, select 8 sheets and cut out a 1 inch by 1 inch (25.4 mm by 25.4 mm) square in the machine direction and 1 inch (25.4 mm) in the cross-machine direction. For multi-ply product samples, each ply is measured as a separate entity. Multiple samples should be separated into individual single plies and 8 sheets of each ply position used for testing. Weigh and record the dry weight of each test specimen to the nearest 0.0001 gram. Place the specimen in a dish containing POROFIL™ liquid having a specific gravity of about 1.93 grams per cubic centimeter, available from Coulter Electronics Ltd., Beckman Coulter, Inc., 250 S. Kraemer Boulevard, P.O. Box 8000, Brea, Calif. 92822-8000 USA; Part No. 9902458. After 10 seconds, grasp the specimen at the very edge (1 to 2 millimeters in) of one corner with tweezers and remove from the liquid. Hold the specimen with that corner uppermost and allow excess liquid to drip for 30 seconds. Lightly dab (less than ½ second contact) the lower corner of the specimen on #4 filter paper (Whatman Ltd., Maidstone, England) in order to remove any excess of the last partial drop. Immediately weigh the specimen, within 10 seconds, recording the weight to the nearest 0.0001 gram. The PWI for each specimen, expressed as grams of POROFIL™ liquid per gram of fiber, is calculated as follows:

$$PWI = \frac{(W_2 - W_1)}{W_1} \times 100$$

wherein

"$W_1$" is the dry weight of the specimen, in grams; and
"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of the fluid) to express the ratio as a percentage, whereas the void volume (gms/gm) is simply the weight increase ratio, that is, PWI divided by 100.

Water absorbency rate or WAR, is measured in seconds, and is the time it takes for a sample to absorb a 0.1 gram droplet of water disposed on its surface by way of an automated syringe. The test specimens are preferably conditioned at 23° C.±1° C. (73.4±1.8° F.) at 50% relative humidity for 2 hours. For each sample, 4 test specimens 3"×3" (76.2×76.2 mm) are prepared. Each specimen is placed in a sample holder such that a high intensity lamp is directed toward the specimen. 0.1 ml of water is deposited on the specimen surface and a stop watch is started. When the water is absorbed, as indicated by a lack of further reflection of light from the drop, the stopwatch is stopped, and the time recorded to the nearest 0.1 seconds. The procedure is repeated for each specimen and the results averaged for the sample. WAR is measured in accordance with TAPPI method T 432 cm-99.

Dispersibility Test

Figures 1, 30:
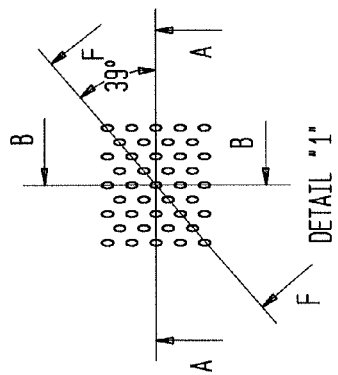
Figures 2, 30:
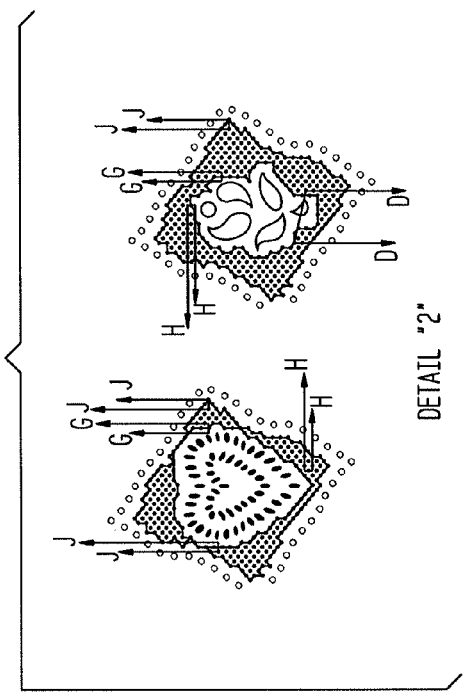
Figure 30:
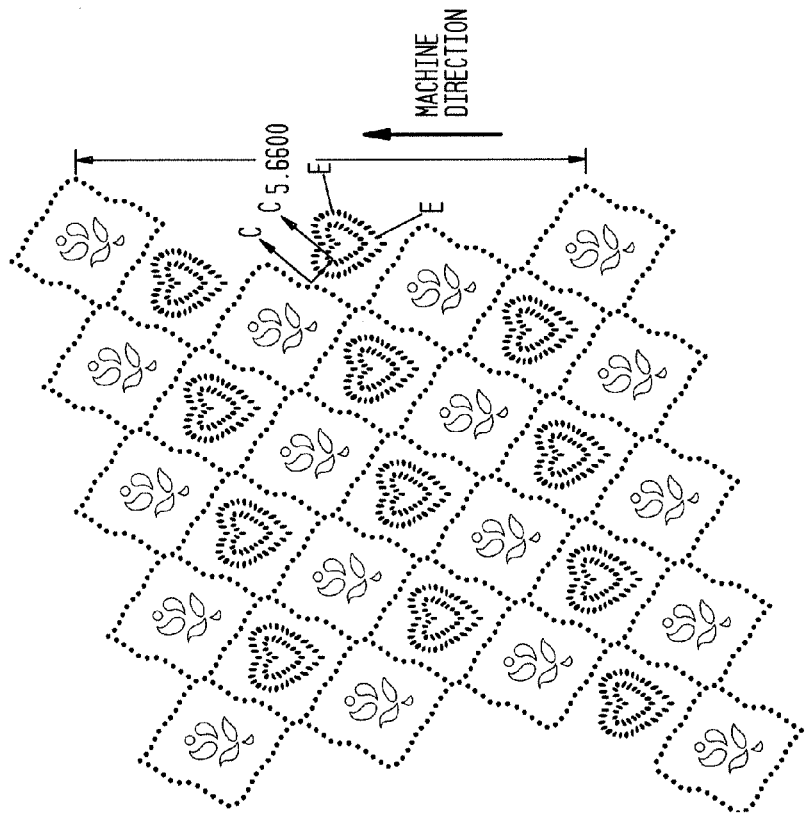

To determine how well bathroom tissue disintegrates in water under controlled agitation using a standard water solution, a sample of tissue is placed in a bottle of specified dimensions in a standardized water solution and subjected to controlled agitation using a standardized shaker that shakes the bottle for a preset number of shakes at 180±5 strokes per minute. One stroke is a complete cycle of back and forth. The bottle is then drained in a fixture adapted to hold the bottle with its centerline perpendicular. See FIGS. 1 and 2. More specifically, the test is conducted as follows:

The standardized bottle shaker 50 and bottle guide fixture 52 are available from Research Dimensions, 1720 Oakridge Road, Neenah, Wis. 54956, (920) 722-2289; FAX (920) 725-6874. A small mouth (11/16-inch diameter orifice) plastic bottle 54 with cap, 250 ml, is catalog number 02-924-6D, available from Fisher Scientific Company, 300 Industry Drive, Pittsburgh, Pa. 15275. The standard water solution, catalog number NC9664362, is available from Fisher Scientific Company, 800-766-7000.

Remove and discard the first three layers of tissue from a roll of tissue. (The tissue sample to be tested may be taken from anywhere in the roll except for the three outer wraps and the last 20 sheets from the core.) If the tissue samples and/or base sheet samples are less than 24 hours old, they are to be oven cured for 5 minutes at 105° C.

For testing of finished product: six three-sheet strips are cut from the roll. If the product being tested is a multi-ply product, the plies are not separated from each other, but are tested still plied together.

For testing of base sheet, specimens are to be cut equivalent to the length and width of the finished product for which they are intended, three specimens are for one-ply product, six specimens are for two-ply product, and nine specimens are cut for three-ply product.

180±5 ml of standard water at 23° C. (73° F.), is transferred to bottle 54 with cap.

Shaker 50 is set for an appropriate number of strokes. In the case of finished product testing, the three-sheet strip of tissue is folded in half, rolled up and inserted into the plastic bottle, which is then capped. In the case of base sheet, the specimen is folded in half and one strip of tissue is rolled up when the intended finished product is one-ply, two strips of tissue for two-ply finished product, and three strips of tissue for three-ply finished product. The roll is inserted into the plastic bottle, which is then capped. Bottle 54 is placed in shaker 50 (FIG. 1) with base 51 toward the drive arm 58, and motor 60 started.

After shaker 50 has shaken bottle 54 for the set number of strokes, the contents are immediately checked for disintegration by inverting bottle 54 and placing it into bottle guide fixture 52 (FIG. 2) in one quick motion to see if the contents will pour out into a beaker. In order for the specimen to pass the test for that number of shakes, the entire contents of bottle 54 must empty within eight seconds without shaking or squeezing bottle 54. The test is replicated and a "pass" is recorded only if both specimens pass.

Dry Lint Test

To quantify the amount of lint removed from towel, tissue and related products when used dry, a Sutherland Rub Tester with 4.0 lb sled is used. This apparatus is available from Danilee Company, 27223 Starry Mountain Street, San Antonio, Tex. 78260; 830-438-7737; 800-438-7738 (FAX). The 4.0 lb rub block for the Rub Tester has dimensions of 2" by 2" so that the pressure exerted during testing is 1 psi.

After the samples to be evaluated are preconditioned at 10 to 35% RH at 22° C. to 40° C. for 24 hours, then conditioned at 50.0%±2.0% RH and 23.0±1.0° C. for 2 hours, all of the subsequent procedures are performed within the confines of a room maintained at between 48 to 53% RH and a temperature between 22° C. and 24° C.

Two stacks of four 2.25-in.×4.5-in. test strips with 4.5-in length in the machine direction are cut from the sample with the top (exterior of roll) side up.

Two 2.5-in.×6-in. strips of black felt are cut with the 6-in. length in the machine direction, and the top side labeled with sample ID numbers.

A baseline reading for the felt is determined by taking one L* lightness color reading on the labeled side of each black felt strip used for testing in the middle of what will be the rubbed area using a GretagMacbeth® Ci5 spectrophotometer using the following settings on the spectrophotometer: Large area view, specular component excluded, UV Source C, 2 degree observer, and Illuminant C. The GretagMacbeth® spectrophotometer Model Ci5 is available from GretagMacbeth, 617 Little Britain Road, New Windsor, N.Y. 12553; 914-565-7660; 914-565-0390 (FAX); www.gretagmacbeth.com. The "before testing" reading is later compared to the "after testing" reading in the same area of the black felt strip on the same side, so particular care is taken to be sure that comparison are made only between the same felt strips. "L*" as used in this connection relates to International Commission on Illumination (CIE) 1976, also known as CIELAB measurement of lightness, and should not be confused with Hunter lightness typically denominated "L". In this connection, the asterisk "*" is not a reference mark directing the reader to some other location in this document, but is a portion of the commonly used symbol for CIE 1976 lightness "L*".

To evaluate a specimen, the specimen is taped to the galvanized plate on the Sutherland Rub Tester with the top side up so that rubbing will be in the machine direction, with care being observed to ensure that each specimen is taped in the same rub area each time the test is performed. The first black felt specimen is taped, labeled side out, to the bottom of the 4.0-lb rub block of the Sutherland Rub Tester, the number of strokes on the rub tester is set to four, and the slow speed selected (#2 setting for 4 speed model or #1 setting for 2 speed model), the rub block is placed on the Sutherland Rub Tester carriage arm and the "Start" button pressed to start testing. After the four strokes are completed, the rub block is removed from the tester and the black felt is removed from the bottom of the rub block with the black felt being preserved for L* "after testing" color reading. The specimen is removed from the galvanized plate and discarded.

One L* color reading is taken on the labeled side of each black felt strip, reading the same spot used to obtain the "before testing" value, in the middle of the rubbed area. The "after testing" reading is paired up with the appropriate "before testing" reading to calculate the difference between the readings—"ΔL*".

For each sample, the average, standard deviation, minimum and maximum test results are recorded as measured to the nearest 0.01 L* unit for both the before testing and after testing values. The difference value of the after reading minus the before reading is indicative of the lint removal by the standardized dry rubbing procedure.

Wet Abrasion Lint Test

To evaluate a tissue sample for lint removal by wet abrasion, it is first subjected to simulated wet use against a sample of standard black felt with a Crockmeter Rub Tester, modified as described herein, then the area in mm² of the lint left on the felt is measured with an Epson Perfection 4490 flat bed scanner and Apogee, SpecScan 2.3.36 Software.

The Crockmeter Rub tester is available from SDL Atlas, LLC, 3934 Airway Drive, Rock Hill, S.C. 29732; (803) 329-2110. To be used to measure wet lint as described herein, the Crockmeter is modified to accept a 360 gram arm and a 1"×2" foot that exerts a pressure on the specimen of 0.435 psi. The weight of the rub block is 355 g for the weighted arm supported on one end, and 36 g for the rub foot. These weights are exerted on a 1"×2" area, for a pressure of 391 g/12.9 cm²=30.3 g/cm². In contrast, the method of evaluating wet abrasion in the Bhat et al. and Luu patents referenced herein used a 135 g sled placed on a 2×3" sample for a pressure of 135 g/38.7 cm²=3.5 g/cm².

Research Dimensions at 1720 Oakridge Road, Neenah, Wis. 54956; 920-722-2289, will modify Crockmeter Rub Testers to conform hereto. Suitable black felt is 3/16-inch thick, part #113308F-24 available from Aetna Felt Corporation, 2401 W. Emaus Avenue, Allentown, Pa. 18103; 800-526-4451.

To test a sample, the outer three layers of tissue are removed from the roll. Three sheets of tissue are cut at the perforations and placed in a stack using a paper cutter ensuring that the tissue sheets are placed in the same orientation relative to direction and the side of the roll. From the stack, samples that are 2-inches by 2.5-inches are cut with the long dimension being the machine direction. Enough samples are cut for 4 replicates. The short (2") side of the tissue is marked with a small dot to indicate the surface of the tissue that was outwardly facing when on the roll. The foot is mounted to the arm of the Crockmeter with the short dimension parallel to the stroke of the Crockmeter and stroke distance set at 4"±⅛ inch and the stroke speed is set to strokes per minute. The black felt is cut into 3-inch by 6-inch pieces with the inside surface being marked along the short edge. In this test, the tissue sample to be tested will be rubbed against the inside of the felt starting at the mark. A 12-inch by 12-inch sheet of black acrylic, a 2-inch by 3-inch glass microscope slide 40 marked as shown in FIG. 3, tape, a pipette and a beaker of distilled water are located on any nearby convenient flat surface. The Crockmeter is turned on, then turned off, to position the arm at its furthest back position. The spacer is placed under the arm to hold it above the rubbing surface. A clean piece of black felt is taped to the base of the Crockmeter over the rubbing surface with the marked surface oriented upward with the marked end up adjacent to the beginning point of the stroke of the foot. A sample is taped along one shorter edge to the foot with the top side of the tissue facing up, and the length of the tissue is wrapped around the foot and attached to the arm of the Crockmeter with the taped side, and the marked location on the tissue sample facing the operator at the forward portion of the Crockmeter. The type of tape used is not critical. Office tape commonly referred to as "cellophane tape" or sold under the trademark "Scotch® Tape" is suitable. The spacer is removed from under the arm and the arm with the attached foot is set down on the black felt with the long dimension of the foot perpendicular to the rub direction, and the foot is fixed in place. The glass microscope slide is placed on the felt forward of the foot and 3 volumes of 200 μL of distilled water each are dispensed from the pipette onto the cross-marks on the glass slide. The sample, foot and arm gently lifted, the glass slide is placed under the sample and the sample is lowered to allow the water to wet the sample for 5 seconds, after which time the arm is lifted, the glass slide removed and the Crockmeter activated to allow the sample to make three forward strokes on the felt with the arm being lifted manually at the beginning of each return stroke to prevent the sample from contacting the felt during the return strokes. After three forward strokes, the Crockmeter is inactivated and the spacer placed under the arm so that the black felt can be removed without disturbing the abraded lint thereupon. Three minutes after the felt is removed from the rubbing surface, it is scanned in an Epson, Perfection 4490 flat bed Scanner using Apogee SpecScan Software version 2.3.36 with the software being set for "lint" in the "Scanner Settings" window, with "5" being set in the "Process Groups of:" window on the "Defaults panel", the "Resolution" being set at "600 dots/inch", the "Scanner Mode" being set to "256-Grayscale", the "Area Setting" being set to "Special", the "Scan Image" being set to "Reverse Image", the "Upper Limit" window on the "Dirt Histogram" panel being set to ">=5.000" the "Lower Limit" window of that panel being set to "0.013-0.020" and the "X Scale:" window being set to "25"; and the "PPM" window of the "Bad Handsheet" panel set to "2500.0". On the "Printout Settings:" panel, the "Gray-Summary", "Sheet Summary" and "Gray Histogram" boxes are checked, the "Copies" window is set to "1", while the "Dirt Histogram", "Categories" and "XY Location boxes on that panel are unchecked. Both the "Enable Display" and "Enable Zoom" boxes are checked on the Display Mode panel. On the "Scanner Setup" panel, the "White" box is set for "255" while the "Black" box is set for "0", the "Contrast Filter" box is set for "0.000", the upper "Threshold=" box is set for 80.0[% percent of background plus] while the lower "Threshold=" box is set for "0.0" [grayscale value]. The "Percent of Background, plus offset" box on the "Scanner Setup" panel is checked while the "Manual Threshold Setting" and "Function of StdDev of Background" boxes are unchecked. If desired the "Grade Identification:" and "Reel/Load Number:" boxes may be used to record indicia related to the identification of the samples being tested. On the "Special Area Definition" panel, "Inches" is checked in the "Dimensions:" region while "Rectangular" is checked in the "Shape:" region. In the "Border at top and left:" region, "0.15" [in.] is entered in the "At the left side: (X)" box and "0.625" [in.] is entered in the "At the top: (Y)" box. In the "Area to scan:" regions "2.7" [in.] is entered in the "Width (X)" box and "5.2" [in.] is entered in the "Height (Y)" box. After scanning, the area in mm$^2$ of the abraded lint left on the black felt is output in the "SHEETS" Table in the "Total Area" column under the "Sample Sheet(s)" heading on the "Sheet & Category Summary" screen. This result is sometimes referred to herein as "WALA" for Wet Abraded Lint Area, which is reported in mm$^2$.

In other cases, the fiber removed will be washed off, and the solution subjected to testing in an Optest Fiber Quality Analyzer to determine the number of fibers removed having a length in excess of 40 μm. The Optest Fiber Quality Analyzer has become a standard in the paper industry for determining fiber length distributions and fiber counts (above a certain minimal length which keeps decreasing as Optest upgrades their technology).

The Optest Fiber Quality Analyzer is available from:
OpTest Equipment Inc.
900 Tupper St. Hawkesbury-ON-K6A 3S3-Canada
Phone: 613-632-5169 Fax: 613-632-3744.

Regenerated Cellulose Microfiber

In accordance with the invention, regenerated cellulose fiber is prepared from a cellulosic dope comprising cellulose dissolved in a solvent comprising tertiary amine N-oxides or ionic liquids. The solvent composition for dissolving cellulose and preparing underivatized cellulose dopes suitably includes tertiary amine oxides such as N-methylmorpholine-N-oxide (NMMO) and similar compounds enumerated in U.S. Pat. No. 4,246,221 to McCorsley, the disclosure of which is incorporated herein by reference. Cellulose dopes may contain non-solvents for cellulose such as water, alkanols or other solvents, as will be appreciated from the discussion that follows.

Suitable cellulosic dopes are enumerated in Table 1, below.

TABLE 1

EXAMPLES OF TERTIARY AMINE N-OXIDE SOLVENTS

| Tertiary Amine N-oxide | % water | % cellulose |
| --- | --- | --- |
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also, U.S. Pat. No. 3,508,941 to Johnson, the disclosure of which is incorporated herein by reference.

Details with respect to preparation of cellulosic dopes including cellulose dissolved in suitable ionic liquids and cellulose regeneration therefrom are found in U.S. Pat. No. 6,824,599 of Swatloski et al. entitled "Dissolution and Processing of Cellulose Using Ionic Liquids", the disclosure of which is incorporated herein by reference. Here, again, suitable levels of non-solvents for cellulose may be included. This patent generally describes a process for dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations such as the following cations: imidazolium; pyridinum; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Processing techniques for ionic liquids/cellulose dopes are also discussed in U.S. Pat. No. 6,808,557, to Holbrey et al., entitled "Cellulose Matrix Encapsulation and Method", the disclosure of which is incorporated herein by reference. Note also, U.S. Pat. No. 7,888,412, of Holbrey et al., entitled "Polymer Dissolution and Blend Formation in Ionic Liquids", as well as U.S. Pat. No. 6,808,557, also of Holbrey et al., entitled "Cellulose Matrix Encapsulation and Method", the disclosures of which are incorporated herein by reference. With respect to ionic fluids, in general, the following documents provide further detail: U.S. Pat. No. 7,763,715, of Hecht et al., entitled "Extracting Biopolymers From a Biomass Using Ionic Liquids"; U.S. Patent Application Publication No. 2006/0240727, of Price et al., entitled "Ionic Liquid Based Products and Method of Using The Same"; U.S. Patent Application Publication No. 2006/0240728 of Price et al., entitled "Ionic Liquid Based Products and Method of Using the Same"; U.S. Patent Application Publication No. 2006/0090271, of Price et al., entitled "Processes For Modifying Textiles Using Ionic Liquids"; and U.S. Patent Application Publication No. 2006/0207722 of Amano et al., now U.S. Pat. No. 8,318,859, entitled "Pressure Sensitive Adhesive Compositions, Pressure Sensitive Adhesive Sheets With Suitable Protecting Films", the disclosures of which are incorporated herein by reference. Some ionic liquids and quasi-ionic liquids which may be suitable are disclosed by Imperato et al., Chem. Commun. 2005, 1170-1172, the disclosure of which is incorporated herein by reference.

"Ionic liquid" refers to a molten composition that includes an ionic compound that is preferably a stable liquid at temperatures of less than 100° C. at ambient pressure. Typically, such liquids have very low vapor pressure at 100° C., less than 75 mBar or so, and preferably, less than 50 mBar or less than 25 mBar at 100° C. Most suitable liquids will have a vapor pressure of less than 10 mBar at 100° C., and often, the vapor pressure is so low that it is negligible and is not easily measurable, since it is less than 1 mBar at 100° C.

Suitable commercially available ionic liquids are Basionic™ ionic liquid products available from BASF (Florham Park, N.J.).

Cellulose dopes, including ionic liquids having dissolved therein about 5% by weight underivatized cellulose, are commercially available from Aldrich (Sigma-Aldrich Corp., St. Louis, Mo.). These compositions utilize alkyl-methyl-imidazolium acetate as the solvent. It has been found that choline-based ionic liquids are not particularly suitable for dissolving cellulose.

After the cellulosic dope is prepared, it is spun into fiber, fibrillated and incorporated into absorbent sheet as described later.

A synthetic cellulose, such as lyocell, is split into micro- and nano-fibers, and added to conventional wood pulp. The fiber may be fibrillated in an unloaded disk refiner, for example, or any other suitable technique including using a Pulmac-Fiber (PFI) mill. Preferably, relatively short fiber is used and the consistency kept low during fibrillation. The beneficial features of fibrillated lyocell include: biodegradability, hydrogen bonding, dispersibility, repulpability, and smaller microfibers than obtainable with meltspun fibers, for example.

Fibrillated lyocell or its equivalent has advantages over splittable meltspun fibers. Synthetic microdenier fibers come in a variety of forms. For example, a 3 denier nylon/polyethylene terephthalate (PET) fiber in a so-called pie wedge configuration can be split into 16 or 32 segments, typically, in a hydroentangling process. Each segment of a 16-segment fiber would have a coarseness of about 2 mg/100 m versus eucalyptus pulp at about 7 mg/100 m. Unfortunately, a number of deficiencies have been identified with this approach for conventional wet laid applications. Dispersibility is less than optimal. Melt spun fibers must be split before sheet formation, and an efficient method is lacking. Most available polymers for these fibers are not biodegradable. The coarseness is lower than wood pulp, but still high enough that they must be used in substantial amounts and form a costly part of the furnish. Finally, the lack of hydrogen bonding requires other methods of retaining the fibers in the sheet.

Fibrillated lyocell has fibrils that can be as small as 0.1-0.25 microns (μm or μ) in diameter, translating to a coarseness of 0.0013-0.0079 mg/100 m. Assuming these fibrils are available as individual strands—separate from the parent fiber—the furnish fiber population can be dramatically increased at various addition rates. Even fibrils not separated from the parent fiber may provide benefit. For convenience, fibrillated lyocell is often referred to herein as CMF as short for cellulosic microfiber. Dispersibility, repulpability, hydrogen bonding, and biodegradability remain product attributes, since the fibrils are cellulose.

Fibrils from lyocell fiber have important distinctions from wood pulp fibrils. The most important distinction is the length of the lyocell fibrils. Wood pulp fibrils are only perhaps microns long, and, therefore, act in the immediate area of a fiber-fiber bond. Wood pulp fibrillation from refining leads to stronger, denser sheets. Lyocell fibrils, however, are potentially as long as the parent fibers. These fibrils can act as independent fibers and improve the bulk, while maintaining or improving strength. Southern pine and mixed southern hardwood (MSHW) are two examples of fibers that are disadvantaged relative to premium pulps with respect to softness. The term "premium pulps" used herein refers to northern softwoods and eucalyptus pulps commonly used in the tissue industry for producing the softest bath, facial, and towel grades. Southern pine is coarser than northern softwood kraft, and mixed southern hardwood is both coarser and higher in fines than market eucalyptus. The lower coarseness and lower fines content of premium market pulp leads to a higher fiber population, expressed as fibers per gram (N or $N_{i>0.2}$) in Table 3. The coarseness and length values in Table 2 were obtained with an OpTest Fiber Quality Analyzer. Definitions are as follows:

$$L_n = \frac{\sum\limits_{all\ fibers} n_i L_i}{\sum\limits_{all\ fibers} n_i}$$

$$L_{n, i>0.2} = \frac{\sum\limits_{i>0.2} n_i L_i}{\sum\limits_{i>0.2} n_i}$$

$$C = 10^5 \times \frac{sampleweight}{\sum\limits_{all\ fibers} n_i L_i}$$

$$N = \frac{100}{CL}(millionfibers/grams)$$

Northern bleached softwood kraft (NBSK) and eucalyptus have more fibers per gram than southern pine and hardwood. Lower coarseness leads to higher fiber populations and smoother sheets.

TABLE 2

Fiber Properties

| Sample | Type | C, mg/100 m | Fines, % | $L_n$, mm | N, MM/g | $L_{n,\ i>0.2\ mm}$ | $N_{i>0.2\ mm}$ MM/g |
|---|---|---|---|---|---|---|---|
| Southern HW | Pulp | 10.1 | 21 | 0.28 | 35 | 0.91 | 11 |
| Southern HW-low fines | Pulp | 10.1 | 7 | 0.54 | 18 | 0.94 | 11 |

TABLE 2-continued

Fiber Properties

| Sample | Type | C, mg/100 m | Fines, % | $L_n$, mm | N, MM/g | $L_{n,\,i>0.2\,mm}$ | $N_{i>0.2\,mm}$ MM/g |
|---|---|---|---|---|---|---|---|
| Aracruz Eucalyptus | Pulp | 6.9 | 5 | 0.50 | 29 | 0.72 | 20 |
| Southern SW | Pulp | 18.7 | 9 | 0.60 | 9 | 1.57 | 3 |
| Northern SW | Pulp | 14.2 | 3 | 1.24 | 6 | 1.74 | 4 |
| Southern (30 SW/70 HW) | Base sheet | 11.0 | 18 | 0.31 | 29 | 0.93 | 10 |
| 30 Southern SW/70 Eucalyptus | Base sheet | 8.3 | 7 | 0.47 | 26 | 0.77 | 16 |

For comparison, the "parent" or "stock" fibers of unfibrillated lyocell have a coarseness of 16.6 mg/100 m before fibrillation and a diameter of about 11 to about 12 μm.

The fibrils of fibrillated lyocell have a coarseness on the order of 0.001-0.008 mg/100 m. Thus, the fiber population can be dramatically increased at relatively low addition rates. Fiber length of the parent fiber is selectable, and fiber length of the fibrils can depend on the starting length and the degree of cutting during the fibrillation process.

The dimensions of the fibers passing the 200 mesh screen are on the order of 0.2 micron by 100 micron long. Using these dimensions, one calculates a fiber population of 200 billion fibers per gram. For perspective, southern pine might be three million fibers per gram and eucalyptus might be twenty million fibers per gram (See Table 2). It appears that these fibers are the fibrils that are broken away from the original unrefined fibers. Different fiber shapes with lyocell intended to readily fibrillate could result in 0.2 micron diameter fibers that are perhaps 1000 microns or more long, instead of 100. As noted above, fibrillated fibers of regenerated cellulose may be made by producing "stock" fibers having a diameter of 10 to 12 microns, or so, followed by fibrillating the parent fibers. Alternatively, fibrillated lyocell microfibers have recently become available from Engineered Fibers Technology (Shelton, Conn.) having suitable properties. Particularly preferred materials are more than 40% fiber that is finer than 14 mesh and exhibit a very low coarseness (low freeness). For ready reference, mesh sizes appear in Table 3, below.

TABLE 3

Mesh Size

| Sieve Mesh # | Inches | Microns |
|---|---|---|
| 14 | .0555 | 1400 |
| 28 | .028 | 700 |
| 60 | .0098 | 250 |
| 100 | .0059 | 150 |
| 200 | .0029 | 74 |

Details as to fractionation using the Bauer-McNett Classifier appear in Gooding et al., "Fractionation in a Bauer-McNett Classifier", *Journal of Pulp and Paper Science*, Vol. 27, No. 12, December 2001, the disclosure of which is incorporated herein by reference.

In connection with the present invention, an absorbent paper web is made by dispersing papermaking fibers into aqueous furnish (slurry) and depositing the aqueous furnish onto the forming wire of a papermaking machine. Any suitable forming scheme might be used. For example, an extensive, but non-exhaustive, list in addition to Fourdrinier formers includes a crescent former, a C-wrap twin wire former, an S-wrap twin wire former, or a suction breast roll former. The forming fabric can be any suitable foraminous member, including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808, all of which are incorporated herein by reference in their entireties. One forming fabric particularly useful with the present invention is Voith Fabrics Forming Fabric 2164 made by Voith Fabrics Corporation, Shreveport, La.

Foam-forming of the aqueous furnish on a forming wire or fabric may be employed as a means for forming sheets comprising fibers that are somewhat difficult to disperse in conventional aqueous furnishes. Foam-forming techniques are disclosed in U.S. Pat. Nos. 6,500,302; 6,413,368; 4,543,156 and Canadian Patent No. 2,053,505, the disclosures of which are incorporated herein by reference. The foamed fiber furnish is made up from an aqueous slurry of fibers mixed with a foamed liquid carrier just prior to its introduction to the headbox. The pulp slurry supplied to the system has a consistency in the range of from about 0.5 to about 7 weight % fibers, preferably, in the range of from about 2.5 to about 4.5 weight %. The pulp slurry is added to a foamed liquid comprising water, air and surfactant containing 50 to 80% air by volume, forming a foamed fiber furnish having a consistency in the range of from about 0.1 to about 3 weight % fiber by simple mixing from natural turbulence and mixing inherent in the process elements. The addition of the pulp as a low consistency slurry results in excess foamed liquid recovered from the forming wires. The excess foamed liquid is discharged from the system and may be used elsewhere or treated for recovery of surfactant therefrom.

The furnish will almost always contain chemical additives to alter the physical properties of the paper produced. These chemistries are well understood by the skilled artisan and may be used in any known combination. Such additives may be surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof, the chemicals optionally comprising polyols, starches, polypropylene glycol (PPG) esters, polyethylene glycol (PEG) esters, phospholipids, surfactants, polyamines, HMCP (Hydrophobically Modified Cationic Polymers), HMAP (Hydrophobically Modified Anionic Polymers), or the like.

The pulp can be mixed with strength adjusting agents, such as wet strength agents, dry strength agents, debonders/softeners, and so forth. Even though permanent wet strength is usually considered to be highly contra-indicated for bath tissue products, it is often included in many facial tissue products that are not intended to be flushable. Suitable wet strength agents are known to the skilled artisan. A comprehensive, but non-exhaustive, list of useful strength aids includes urea-formaldehyde resins, melamine formaldehyde resins, glyoxylated polyacrylamide resins, polyamide-epichlorohydrin resins, and the like. Thermosetting polyacrylamides are produced by reacting acrylamide with diallyl dimethyl ammonium chloride (DADMAC) to produce a cationic polyacrylamide copolymer that is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entireties. Resins of this type are commercially available under the trade name of PAREZ® 631NC by Bayer Corporation (Pittsburgh, Pa.). Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene® 557LX and Kymene® 557H by Hercules Incorporated of Wilmington, Del., and Amres® from Georgia-Pacific Resins, Inc. These resins and the processes for making the resins are described in U.S. Pat. No. 3,700,623 and U.S. Pat. No. 3,772,076, each of which is incorporated herein by reference in its entirety. An extensive description of polymeric-epihalohydrin resins is given in "Chapter 2: Alkaline-Curing Polymeric Amine-Epichlorohydrin" by Espy in *Wet Strength Resins and Their Application* (L. Chan, Editor, 1994), herein incorporated by reference in its entirety. A reasonably comprehensive list of wet strength resins is described by Westfelt in *Cellulose Chemistry and Technology* Volume 13, page 813, 1979, which is also incorporated herein by reference.

Suitable temporary wet strength agents for use in the practice of the present invention include aliphatic and aromatic aldehydes including glyoxal, malonic dialdehyde, succinic dialdehyde, glutaraldehyde and dialdehyde starches, as well as substituted or reacted starches, disaccharides, polysaccharides, chitosan, or other reacted polymeric reaction products of monomers or polymers having aldehyde groups, and optionally, nitrogen groups. Representative nitrogen containing polymers, which can suitably be reacted with the aldehyde containing monomers or polymers, include vinyl-amides, acrylamides and related nitrogen containing polymers. These polymers impart a positive charge to the aldehyde containing reaction product. In addition, other commercially available temporary wet strength agents, such as, PAREZ® FJ98, (low molecular weight slightly cationic glyoxalated polyacrylamide) manufactured by Kemira (Atlanta, Ga.) can be used, along with those disclosed, for example, in U.S. Pat. No. 4,605,702.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085, 736; 4,981,557; 5,008,344; 4,603,176; 4,983,748; 4,866,151; 4,804,769 and 5,217,576. Modified starches sold under the trademarks CO-BOND® 1000 and CO-BOND® 1000 Plus, by National Starch and Chemical Company of Bridgewater, N.J. may be used. Prior to use, the cationic aldehyde water soluble polymer can be prepared by preheating an aqueous slurry of approximately 5% solids maintained at a temperature of approximately 240° F. (116° C.) and a pH of about 2.7 for approximately 3.5 minutes. Finally, the slurry can be quenched and diluted by adding water to produce a mixture of approximately 1.0% solids at less than about 130° F. (54.4° C.).

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

To the extent that dry strength agents are added, suitable dry strength agents include starch, guar gum, polyacrylamides, carboxymethyl cellulose, and the like. Of particular utility is carboxymethyl cellulose, an example of which is sold under the trade name Hercules® CMC, by Hercules Incorporated of Wilmington, Del.

Suitable debonders are likewise known to the skilled artisan. Debonders or softeners may also be incorporated into the pulp or sprayed upon the web after its formation. The present invention may also be used with softener materials including, but not limited to, the class of amido amine salts derived from partially neutralized amines. Such materials are disclosed in U.S. Pat. No. 4,720,383. Evans, *Chemistry and Industry*, 5 Jul. 1969, pages 893-903; Egan, *J. Am. Oil Chemist's Soc.*, Vol. 55 (1978), pages 118-121; and Trivedi et al., *J. Am. Oil Chemist's Soc.*, June 1981, pages 754-756, incorporated by reference in their entireties, indicate that softeners are often available commercially only as complex mixtures rather than as single compounds. While the following discussion will focus on the predominant species, it should be understood that commercially available mixtures would generally be used in practice.

Hercules® TQ 218 or an equivalent is a suitable softener material, which may be derived by alkylating a condensation product of oleic acid and diethylenetriamine. Synthesis conditions using a deficiency of alkylation agent (e.g., diethyl sulfate) and only one alkylating step, followed by pH adjustment to protonate the non-ethylated species, result in a mixture consisting of cationic ethylated and cationic non-ethylated species. A minor proportion (e.g., about 10%) of the resulting amido amine cyclize to imidazoline compounds. Since only the imidazoline portions of these materials are quaternary ammonium compounds, the compositions as a whole are pH-sensitive. Therefore, in the practice of the present invention with this class of chemicals, the pH in the head box should be approximately 6 to 8, more preferably, from about 6 to about 7 and, most preferably, from about 6.5 to about 7.

Quaternary ammonium compounds, such as dialkyl dimethyl quaternary ammonium salts, are also suitable, particularly when the alkyl groups contain from about 10 to 24 carbon atoms. These compounds have the advantage of being relatively insensitive to pH.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entireties. Biodegradable ester quats are suitable. These softeners are biodegradable by virtue of hydrolyzable ester linkages and are usually made by esterifying ethanol amines (i.e., di- and tri-ethanolamines) with a fatty acid followed by quaternization with dimethyl sulfate, or, more popularly, because of safety, diethylsulfate. A methylated example of such an ester quat has the following structural formula:

$$\underset{R}{\overset{O}{\underset{\|}{C}}}-O-CH_2-CH_2-\overset{CH_3}{\underset{\underset{CH_2CH_2-O-\underset{\|}{C}-R}{|}}{\overset{|}{N^+}}}-CH_3 \quad Cl^-$$

wherein R can conveniently be either an oleyl group, $CH_2(CH_2)_6CH=CH(CH_2)_7CH_3$, or an erucyl group, $CH_2(CH_2)_{10}CH=CH(CH_2)_7CH_3$, as these can be derived from oleic and erucic acids. In some embodiments, a particularly preferred debonder composition includes a quaternary amine component as well as a nonionic surfactant.

The nascent web may be compactively dewatered on a papermaking felt. Any suitable felt may be used. For example, felts can have double-layer base weaves, triple-layer base weaves, or laminated base weaves. Preferred felts are those having a laminated base weave design. A wet-press-felt that may be particularly useful with the present invention is Vector 3 made by Voith Fabric (Appleton, Wis.). Background art in the press felt area includes U.S. Pat. Nos. 5,657,797; 5,368,696; 4,973,512; 5,023,132; 5,225,269; 5,182,164; 5,372,876; and 5,618,612. A differential pressing felt as is disclosed in U.S. Pat. No. 4,533,437 to Curran et al. may likewise be utilized.

The use of particular adhesives cooperates with a moderately moist web (25 to 70% consistency), to adhere it to the Yankee sufficiently, to allow for high velocity operation of the system and high jet velocity impingement air drying and subsequent peeling of the web from the Yankee. In this connection, a poly(vinyl alcohol)/polyamide adhesive composition as noted above is applied at any convenient location between cleaning doctor and the nip between the sheet and Yankee as needed, preferably, at a rate of less than about 40 mg/m² of sheet.

Preferred Embodiments

Figure 26:
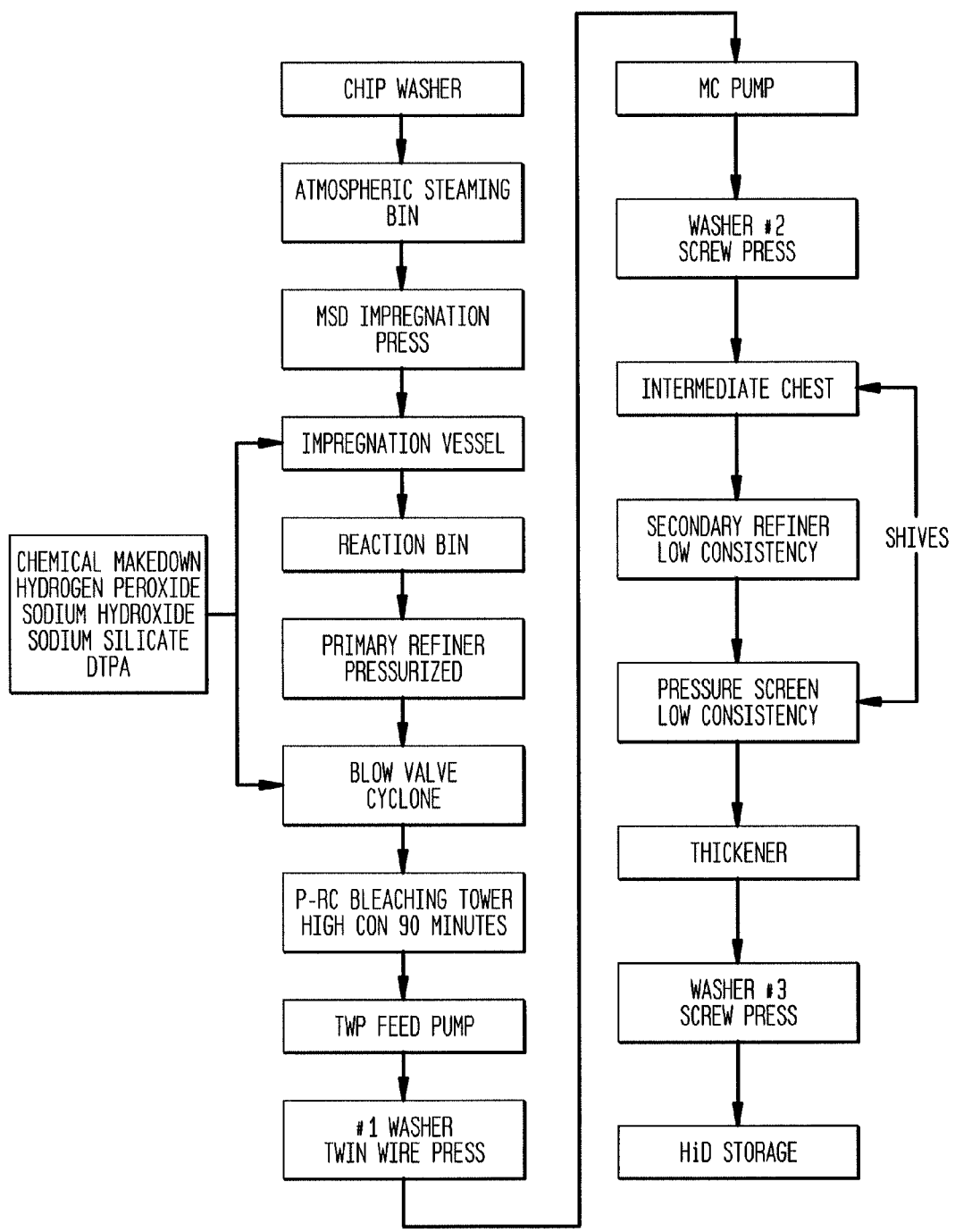
FIG. 26 is a schematic flow diagram of a process for alkaline peroxide bleaching of eucalyptus fibers for use with the present invention.

As illustrated in FIG. 26, the process of producing high lignin eucalyptus by pre-conditioning refiner chemical alkaline peroxide mechanical pulping (APMP) consists of five main process steps:

1. Impregnation: Wood chips (or plant fibers) are compressed in a large screw press and discharged into an inclined (atmospheric) impregnation vessel. The vessel contains a mixture of chelant, hydrogen peroxide and caustic. The chemicals soften the chips and begin the bleaching process.

2. High Consistency Pressurized Refining: The impregnated chips drain as they are lifted out of the impregnation vessel and are fed through a high consistency refiner. The refiner separates the chips into individual fibers and provides heat to drive the bleaching reactions. Hydrogen peroxide is injected into the refiner discharge to boost the brightness. The hot pulp is discharged into an atmospheric tank and achieves full brightness after 30 to 90 minutes of retention.

3. Low consistency secondary refining: A final refining pass is done at low consistency to develop the desired fiber properties and to complete fiberization of any shives.

4. Shive Screening: The pulp is screened to separate shives from the fully individualized fibers. The rejects are fed back into the low consistency refiner to complete separation into individual fibers.

5. Washing: A tissue grade system would use three stages of presses to separate residual bleaching chemicals and anionic trash formed in the process.

For further information concerning pre-conditioning refiner chemical alkaline peroxide mechanical pulping (APMP), see:

Xu, U.S. Patent Application Publication No. 2010/0263815 A1, "Multi-Stage AP Mechanical Pulping With Refiner Blow Line Treatment", Oct. 21, 2010, now U.S. Pat. No. 8,216,423; Herkel et al., U.S. Patent Application Publication No. 2010/0186910 A1, "Four Stage Alkaline Peroxide Mechanical Pulpings", Jul. 29, 2010, now U.S. Pat. No. 8,048,263; Sabourin, U.S. Patent Application Publication No. 2008/0066877 A1, "High Defiberization Pretreatment Process For Mechanical Refining", Mar. 20, 2008, now U.S. Pat. No. 7,758,720; Herkel, U.S. Patent Application Publication No. 2004/0200586 A1, "Four Stage Alkaline Peroxide Mechanical Pulping", Oct. 14, 2004; Sabourin, U.S. Pat. No. 7,892,400 B2, "High Defiberization Chip Pretreatment Apparatus", Feb. 22, 2011; Sabourin, U.S. Pat. No. 7,758,721 B2, "Pulping Process With High Defiberization Chip Pretreatment", Jul. 20, 2010; Sabourin, U.S. Pat. No. 7,300,541 B2, "High Defiberization Chip Pretreatment", Nov. 27, 2007; Sabourin, U.S. Pat. No. 6,899,791 B2, "Method Of Pretreating Lignocellulose Fiber-Containing Material In A Pulp Refining Process", May 31, 2005; Xu, U.S. Patent Application Publication No. 2004/0069427 A1, "Multi-Stage AP Mechanical Pulping With Refiner Blow Line Treatment", Apr. 15, 2004; and Xu et al., International Publication No. WO 03/008703 A1, "Four Stage Alkaline Peroxide Mechanical Pulping", Jan. 30, 2003.

Table 3A sets forth suitable process details for preparation of eucalyptus APMP from eucalyptus chips for use in the present invention.

TABLE 3A

| Processing Conditions for eucalyptus APMP | | | | | | | | | | | |
|---|---|---|---|---|---|---|---|---|---|---|---|
| SAMPLE | | A1 | A2 | A3 | A4 | A5 | A6 | A7 | A8 | A9 | A10 |
| FURNISH | | I1 | A1 | A1 | A1 | A1 | I1 | A6 | A6 | A6 | A6 |
| kWh/ODMT | PASS | 584 | 87 | 181 | 301 | 322 | 576 | 78 | 140 | 187 | 226 |
| APPLIED | Total | 655 | 742 | 836 | 1137 | 1158 | 647 | 725 | 787 | 974 | 1013 |
| Total Alkalinity % Impregnation | | 1.1 | 1.1 | 1.1 | 1.1 | 1.1 | 1.1 | 1.1 | 1.1 | 1.1 | 1.1 |
| Refiner | | 5.6 | 5.6 | 5.6 | 5.6 | 5.6 | 10 | 10 | 10 | 10 | 10 |
| Total Applied | | 6.7 | 6.7 | 6.7 | 6.7 | 6.7 | 11.1 | 11.1 | 11.1 | 11.1 | 11.1 |

TABLE 3A-continued

Processing Conditions for eucalyptus APMP

| SAMPLE | A1 | A2 | A3 | A4 | A5 | A6 | A7 | A8 | A9 | A10 |
|---|---|---|---|---|---|---|---|---|---|---|
| FURNISH | I1 | A1 | A1 | A1 | A1 | I1 | A6 | A6 | A6 | A6 |
| Residual | 0.47 | 0.47 | 0.47 | 0.47 | 0.51 | 2.01 | 2.01 | 2.01 | 2.01 | 2.94 |
| Net | 6.23 | 6.23 | 6.23 | 6.23 | 6.19 | 9.09 | 9.09 | 9.09 | 9.09 | 8.16 |
| Hydrogen Peroxide % Impregnation | 1.1 | 1.1 | 1.1 | 1.1 | 1.1 | 1.1 | 1.1 | 1.1 | 1.1 | 1.1 |
| Refiner | 9.6 | 9.6 | 9.6 | 9.6 | 9.6 | 11.9 | 11.9 | 11.9 | 11.9 | 11.9 |
| Total Applied | 10.7 | 10.7 | 10.7 | 10.7 | 10.7 | 13 | 13 | 13 | 13 | 13 |
| Residual | 4.57 | 4.57 | 4.57 | 4.57 | 3.33 | 0.92 | 0.92 | 0.92 | 0.92 | 0.74 |
| Net | 6.13 | 6.13 | 6.13 | 6.13 | 7.37 | 12.08 | 12.08 | 12.08 | 12.08 | 12.26 |
| FREENESS (CSF) | 577 | 474 | 427 | 344 | 335 | 541 | 448 | 396 | 317 | 307 |
| DENSITY | 0.27 | 0.3 | 0.27 | 0.34 | 0.36 | 0.36 | 0.38 | 0.41 | 0.46 | 0.47 |
| BULK ($cm^3/g$) | 3.69 | 3.28 | 3.68 | 2.92 | 2.81 | 2.78 | 2.62 | 2.43 | 2.15 | 2.11 |
| BURST INDEX ($kPa \cdot m^2/g$) | 0.59 | 0.84 | 1.07 | 1.47 | 1.44 | 1.1 | 1.6 | 1.99 | 2.38 | 2.73 |
| TEAR INDEX ($mN \cdot m^2/g$) | 3.7 | 4.5 | 4.7 | 4.8 | 4.9 | 5.9 | 6.6 | 6.1 | 6.1 | 6 |
| TENSILE INDEX ($N \cdot m/g$) | 16 | 23.7 | 28.3 | 34.6 | 38 | 28.7 | 36.7 | 42.2 | 52.6 | 55 |
| Breaking Length km | 1.6 | 2.4 | 2.9 | 3.5 | 3.9 | 2.9 | 3.7 | 4.3 | 5.4 | 5.6 |
| % STRETCH | 0.86 | 1.13 | 1.33 | 1.52 | 1.65 | 1.21 | 1.49 | 1.7 | 2.07 | 2.34 |
| TEA ($J/m^2$) | 4.81 | 9.33 | 13.38 | 19.04 | 22.92 | 12.56 | 19.47 | 25.92 | 39.63 | 49.01 |
| ABSORPTION COEFF. (m) | 0.21 | 0.2 | 0.2 | 0.21 | 0.22 | 0.28 | 0.27 | 0.23 | 0.25 | 0.25 |
| % OPACITY | 80.7 | 81.1 | 82.5 | 82.9 | 83.5 | 79.7 | 79.9 | 80.6 | 80.2 | 80.8 |
| SCATT. COEFF. ($m^2/kg$) | 47 | 48.2 | 52 | 52.8 | 54 | 42.7 | 45.3 | 46.7 | 45.8 | 46.2 |
| ISO BRIGHTNESS | 85.6 | 85.9 | 85.8 | 86 | 85.4 | 84.9 | 85.4 | 85.2 | 84.8 | 84.7 |
| % SHIVES (PULMAC-0.10 mm) | 12.34 | 6.98 | 4 | 0.78 | 0.68 | 11.84 | 5.54 | 2.68 | 1.08 | 0.78 |
| LENGTH WEIGHTED AVG LNG (mm) | 0.893 | 0.845 | 0.831 | 0.782 | 0.762 | 0.806 | 0.813 | 0.84 | 0.784 | 0.772 |
| ARITHMETIC AVG. LENGTH (mm) | 0.455 | 0.446 | 0.446 | 0.451 | 0.447 | 0.455 | 0.448 | 0.447 | 0.453 | 0.452 |
| WGT WEIGHTED AVG LNG (mm) | 1.87 | 1.57 | 1.54 | 1.22 | 1.12 | 1.3 | 1.37 | 1.65 | 1.19 | 1.2 |
| AVERAGE WIDTH (pm) | 32.7 | 31.91 | 31.23 | 29.46 | 29.15 | | 31.07 | 32.15 | 29.52 | 29.05 |
| SURFACE AREA ($m^2$) | 1155 | 1060 | 1305 | 1371 | 1592 | 1467 | 1277 | 1045 | 1629 | 1465 |
| FIBER CLASS % ON 14 MESH | 10.1 | 5.9 | 3.2 | 1.1 | 0.9 | 9.2 | 4.7 | 3.1 | 0.8 | 0.6 |
| % ON 28 MESH | 15.1 | 14.4 | 11.5 | 5.3 | 4.7 | 16 | 13 | 11.4 | 6.4 | 4.7 |
| % ON 48 MESH | 26.4 | 29.8 | 31.3 | 34.7 | 33.4 | 27.1 | 29.6 | 34 | 35.2 | 35.6 |
| % ON 100 MESH | 20.8 | 20.8 | 22 | 25.4 | 24.2 | 21.1 | 22 | 23.7 | 24.3 | 25 |
| % ON 200 MESH | 14 | 13.8 | 14.4 | 16.6 | 15.9 | 13.1 | 14.1 | 14.6 | 16.2 | 16.2 |
| % THRU 200 MESH | 13.6 | 15.3 | 17.6 | 16.9 | 20.9 | 13.5 | 16.6 | 13.2 | 17.1 | 17.9 |
| +28 MESH | 25.2 | 20.3 | 14.7 | 6.4 | 5.6 | 25.2 | 17.7 | 14.5 | 7.2 | 5.3 |

Wet strength tissues of the present invention are obtained by well known tissue making technologies including conventional wet press (CWP), through-air drying (TAD) and uncreped through-air drying (UCTAD) along with known variants thereof. Techniques in which the fibers are rearranged on a transfer surface to reorder the fiber orientation or to produce variable basis weight products are not required in the practice of the invention of this application, but are rather, the subject of a separate U.S. provisional patent application no. 61/457,991, filed on Jul. 28, 2011, entitled "High Softness, High Durability Bath Tissue with Temporary Wet Strength", Miller et al, which has been converted into U.S. patent application Ser. No. 13/548,600, filed on Jul. 13, 2012, and published as U.S. Patent Application Publication No. 2013/0029105.

Bath tissue of the present invention preferably comprises cellulosic fibers chosen from the group consisting of chemically pulped fibers and mechanically pulped fibers, and from about 5 to about 50% by weight of eucalyptus fibers having a lignin content of at least about 15% by weight, more preferably, from about 10 to about 50% by weight of eucalyptus fibers having a lignin content of at least about 20% by weight, more preferably, having a lignin content of at least about 21% by weight, and most preferably, from about 3 to about 10% by weight of regenerated cellulosic microfiber. Typically, paper making fibers useful in the present invention include cellulosic fibers commonly known as wood pulp fibers. Applicable wood pulps include chemical pulps, such as kraft, sulfite and sulfate pulps, as well as mechanical pulps including, groundwood, thermomechanical pulp, chemically modified, and the like. Chemical pulps may be used in tissue embodiments, since they are known to those of skill in the art to impart a superior tactile sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Additionally, fibers derived from wood pulp, such as cotton linters, bagasse, and the like, can be used. Additionally, fibers derived from recycled paper, which may contain any of all of the categories, as well as other non-fibrous materials, such as fillers and adhesives used to manufacture the original paper product may be used in the present web.

In one embodiment, particularly, if a two-ply structure is being formed, the plies of the multi-ply fibrous structure may be the same basesheet formulation or the plies may comprise differing basesheets combined to create desired consumer benefits. In one embodiment, the fibrous structures comprise two plies of substantially identical tissue basesheets. In a preferred embodiment, the fibrous structure comprises a first ply, a second ply, and at least one inner ply, as shown in FIG. 4 hereof. A particularly preferred construction is that shown U.S. Patent Application Publication No. 2009/0297781 in the name of Richard D. Huss et al., now U.S. Pat. No. 8,287,986, entitled "Ultra Premium Bath Tissue", published Dec. 3, 2009. In many embodiments of the present invention, the web has a plurality of embossments formed therein. In one embodiment, the embossment pattern is applied only to two plies that are bonded either by knurling or glue lamination to a third ply that is either unembossed, or far more lightly embossed than the other two. In such structures, the points of the embossed structure of the two embossed sheets are usually in contact with the unembossed or lightly embossed backing sheet, as shown in Dwiggins, et al., U.S. Pat. No. 6,896,768 discussed below. Often, such structures are referred to as having "points to the inside". In another embodiment, the fibrous structure product is a two-ply product wherein both plies comprise a plurality of embossments, either in a nested structure or a point to point structure. Nested products are disclosed in U.S. Pat. No. 6,413,614 to Giesler et al., "High Softness Embossed Tissue" issued Jul. 2, 2002. Variation or combination of the rigid-to-resilient and/or rigid-to-rigid embossing processes are well understood by the skilled artisan and could be appropriately used in conjunction with the present invention. For example, nested embossing, point-to-point embossing, and multi-nip embossing processes are also within those configurations appropriate for use with the present invention. See, for example, U.S. Pat. Nos. 5,093,068; 5,091,032; 5,269,983 and 5,030,081 to Galyn A. Schulz.

In one embodiment, the fibrous structure product comprises two or more plies of fibrous structure wherein at least one of the plies has a plurality of embossments thereon comprising an embossment height from about 600 μm to about 1,200 μm, in another embodiment, from about 700 μm to about 1,100 μm, and the backing roll is either lightly embossed or unembossed, as disclosed in U.S. Pat. No. 6,896,768 to Dwiggins et al., entitled "Soft Bulky Multi-Ply Product and Method of Making Same", issued May 24, 2005. The multi-ply fibrous structure product may be in roll form. When in roll form, the multi-ply fibrous structure product may be wound about a core or may be wound without a core.

A particular advantage to the use of eucalyptus APMP is the high brightness attainable therewith. In another preferred embodiment of the present invention, the eucalyptus fibers will both have a lignin content of at least about 23% and exhibit an ISO brightness of at least about 82. In yet another preferred embodiment of the present invention, the eucalyptus fibers will both have a lignin content of at least about 21% and exhibit an ISO brightness of at least about 80. This makes it possible to obtain outstanding brightness of the tissue product itself which is, of course, what the customer sees. When using a recycle pulp that has been properly de-inked, the tissue roll itself can exhibit an ISO brightness of:

$$0.82 \times (\% \text{ Virgin chemical pulp}) + 0.795 \times (\% \text{ recycle fiber})^{0.98} + 0.84 \times (\% \text{ APMP Euc}).$$

Another aspect of the present invention concerns an improved method of manufacturing bath tissue or facial tissue by depositing a furnish comprising cellulosic fibers on a translating foraminous support to form a nascent web that is thereafter dewatered and dried, wherein the cellulosic furnish comprises from 50% to 90% cellulosic papermaking fibers chosen from the group consisting of chemically pulped fibers and mechanically pulped fibers, from about 3 to about 30% by weight of regenerated cellulosic microfiber, and from about 10% to about 50% high lignin eucalyptus fibers, the high lignin eucalyptus fibers having a lignin content of at least about 20%, an ISO brightness of at least about 84, a Canadian standard freeness (CSF) freeness of at least about 400 ml, a bulk of between 2.2 and 4.2 cc/g, and a breaking length of between about 1.2 and 4.7 km. In a more preferred embodiment, a particularly well performing mid-grade bath tissue can be prepared from a furnish comprising from 50% to 90% cellulosic papermaking fibers chosen from the group consisting of chemically pulped fibers and mechanically pulped fibers and from about 5% to about 50% high lignin eucalyptus fibers, the high lignin eucalyptus fibers having a lignin content of at least about 23%, an ISO brightness of at least about 83, a CSF of at least about 400 ml, a bulk of between 2.2 and 4.2 cc/g, and a breaking length of between about 1.2 and 4.7 km.

A preferred wet strength bath tissue comprises from 50% to 90% cellulosic papermaking fibers chosen from the group consisting of chemically pulped fibers and mechanically pulped fibers, from about 3 to about 30% by weight of regenerated cellulosic microfiber and from about 10% to about 50% high lignin eucalyptus fibers having a Kappa number of at least about 150. A preferred wet strength tissue of the present invention incorporating a fair amount of recycle tissue and having a basis weight of from about 10 to about 17 lbs per ply per 3000 sq ft ream, a specific geometric mean tensile of between about 35 and 45 g/3 in. per pound of basis weight and a specific eight sheet caliper of between about 3 to about 3.5 mils per ply per 8 sheets per pound of basis weight will comprise about 40 to 55% recycle fiber, from about 25 to about 40% eucalyptus kraft fiber, from about 3 to about 30% by weight of regenerated cellulosic microfiber and about 15-30% high lignin eucalyptus fibers, the high lignin eucalyptus fibers having a lignin content of at least about 20.

An even more preferred wet strength bath tissue, having a basis weight of from about 11 to about 17 lbs per 3000 sq ft ream, a specific geometric mean tensile of between about 35 and 45 g/3 in. per pound of basis weight and a specific eight sheet caliper of between about 3 to about 3.5 mils per 8 sheets per pound of basis weight, comprises about 25 to about 40% softwood kraft fiber, from about 40 to about 60% hardwood kraft fiber, from about 3 to about 10% by weight of regenerated cellulosic microfiber, and about 15 to about 30% high lignin eucalyptus fibers having a lignin content of at least about 20%. In many cases, this wet strength bath tissue will have an MD stretch of between about 20 and 30%.

A mid- or an economy-grade bath tissue of the present invention will comprise from at least about 10% to about 90% by weight of recycled pulp fibers and from about 10% to about 40% by weight of never-dried alkaline peroxide bleached eucalyptus fibers having a coarseness of at least about 9.0 mg/100 m, a Kappa number of at least about 80 and an ISO brightness of at least about 82, the cellulosic tissue having a geometric mean breaking modulus of no more than about 75 g/%, a basis weight of least about 22 lbs per 3000 sq ft ream and an MD stretch of at least about 11. An even higher performing tissue will substitute kraft fiber for the recycle fiber, either entirely or in part. Preferably, the eucalyptus fiber is prepared from eucalyptus chips by alkaline peroxide mechanical pulping (APMP), even more preferably, the eucalyptus fiber will be prepared from eucalyptus chips by pre-conditioning refiner chemical alkaline peroxide mechanical pulping and, more preferably, will have a lignin content of at least about 20%, an ISO brightness of at least about 84, a CSF freeness of at least about 400 ml, a bulk of between 2.2 and 4.2 cc/g, and a breaking length of between about 1.2 and 4.7 km.

Comparative Example 1

For purposes of comparison, base sheets having the compositions and properties as set out in Table 4 were manufactured on a low speed pilot machine using conventional wet press technology, then converted as set forth in Table 5 into multi-ply products having physical properties, as set forth in Table 6.

TABLE 4 basesheet

| Sample | Desc. | Marathon | CMF | FJ98, lb/ton | Varisoft GP-C debonder, lb/t | Caliper 8 Sheet mils/ 8 sht | Basis Weight lb/3000 ft$^2$ | MD Tensile g/3 in. | MD Stretch % | CD Tensile g/3 in. |
|---|---|---|---|---|---|---|---|---|---|---|
| 30.1 | 4882-28 | 50 | 50 | 20 | 0 | 29.5 | 9.1 | 2024 | 28.5 | 831 |
| 31-1 | 4882-29 | 50 | 50 | 20 | 3 | 26.5 | 9.3 | 2045 | 27.6 | 744 |
| 32-1 | 4882-30 | 50 | 50 | 20 | 3 | 27.4 | 9.8 | 2284 | 29.5 | 851 |
| 33-1 | 4882-31 | 50 | 50 | 20 | 3 | 29.0 | 10.1 | 2248 | 28.3 | 927 |
| 34-1 base | 4882-32 | 50 | 50 | 20 | 6 | 26.7 | 8.1 | 1487 | 27.1 | 573 |
| 35-1 base | 4882-33 | 50 | 50 | 20 | 6 | 26.4 | 8.9 | 1659 | 28.9 | 604 |
| 36-1 base | 4882-34 | 50 | 50 | 20 | 6 | 27.7 | 9.5 | 1787 | 27.2 | 706 |
| 37.1 base | 4882-35 | 50 | 50 | 23 | 7 | 22.8 | 7.0 | 882 | 25.7 | 462 |
| 38-1 base | 4882-36 | 50 | 50 | 23 | 7 | 23.4 | 7.0 | 1036 | 27.2 | 444 |
| 39.1 base | 4882-37 | 50 | 50 | 23 | 7 | 24.7 | 7.0 | 989 | 27.8 | 444 |

| Sample | CD Stretch % | GM Tensile g/3 in. | CD Wet Tensile Finch Cured- g/3 in. | GM Break Modulus g/% | CD TEA mm-g/ mm$^2$ | MD TEA mm-g/ mm$^2$ | CD Break Mod. g/% | MD Break Mod. g/% | Wet/Dry |
|---|---|---|---|---|---|---|---|---|---|
| 30.1 | 7.7 | 1296 | 164 | 91 | 0.503 | 2.772 | 111 | 74 | 0.20 |
| 31-1 | 7.1 | 1233 | 180 | 88 | 0.420 | 2.305 | 104 | 74 | 0.24 |
| 32-1 | 6.8 | 1393 | 216 | 100 | 0.442 | 2.669 | 127 | 79 | 0.25 |
| 33-1 | 7.9 | 1444 | 235 | 97 | 0.568 | 2.591 | 118 | 80 | 0.25 |
| 34-1 base | 7.4 | 921 | 154 | 67 | 0.327 | 1.803 | BO | 56 | 0.27 |
| 35-1 base | 8.0 | 1000 | 177 | 68 | 0.379 | 1.876 | BO | 59 | 0.29 |
| 36-1 base | 8.2 | 1121 | 157 | 73 | 0.472 | 2.062 | 82 | 65 | 0.22 |
| 37.1 base | 8.1 | 649 | 125 | 44 | 0.314 | 1.215 | 58 | 34 | 0.26 |
| 38-1 base | 7.5 | 677 | 114 | 48 | 0.250 | 1.329 | 59 | 39 | 0.26 |
| 39.1 base | 8.8 | 662 | 105 | 42 | 0.315 | 1.265 | 51 | 35 | 0.24 |

Varisoft GP-C is an imidazolinium type softener.

TABLE 5

Data for Basesheet incorporated into Converted Product

| | Description | 8 Sheet Caliper mils/8 sht | Basis Weight lb/3000 ft$^2$ | MD Tensile g/3 in. | MD Stretch % | CD Tensile g/3 in. | CD Stretch % | GM Tensile g/3 in. | CD Wet Tensile g/3 in. | GM Break Modulus g/% | FQA Fiber Count Number |
|---|---|---|---|---|---|---|---|---|---|---|---|
| Condition 1 | 4882-32 | 26.7 | 8.1 | 1487 | 27.1 | 573 | 7.4 | 921 | 206 | 66.8 | 435 |
| | 4882-33 | 26.3 | 8.9 | 1659 | 28.9 | 604 | 8.0 | 1000 | 165 | 68.4 | 494 |
| | 4882-34 | 27.7 | 9.5 | 1787 | 27.2 | 706 | 8.2 | 1121 | 201 | 72.8 | 468 |
| Average | | 26.9 | 8.8 | 1644 | 27.7 | 627 | 7.9 | 1014 | 190 | 69.3 | 466 |
| Condition 2 | 4882-35 | 22.8 | 7.0 | 882 | 25.7 | 482 | 8.1 | 649 | 138 | 44.0 | 383 |
| | 4882-36 | 23.4 | 7.0 | 1036 | 27.2 | 444 | 7.5 | 677 | 123 | 47.9 | 363 |
| | 4882-37 | 24.7 | 7.00 | 989 | 27.8 | 444 | 8.8 | 662 | 132 | 42.3 | 305 |
| Average | | 23.6 | 7.0 | 969 | 26.9 | 456 | 8.1 | 663 | 131 | 44.7 | 350 |

When tested for physical properties, Dry Linting and Wet Abrasion Resistance, as set forth above, the results set forth in Table 6 were obtained:

TABLE 6

|  | Base Sheet Condition 1 | | Base Sheet Condition 2 | |
| --- | --- | --- | --- | --- |
| Description | Cell 1 2-Ply | Cell 2 3-Ply | Cell 3 2-Ply | Cell 4 3-Ply |
| Basis Weight (lbs/ream) | 17.14 | 26.11 | 13.93 | 20.45 |
| Caliper (mils/8 sheets) | 60.28 | 108.00 | 55.58 | 88.41 |
| MD Dry Tensile (g/3 in.) | 2198 | 3528 | 1384 | 2507 |
| CD Dry Tensile (g/3 in.) | 1069 | 1662 | 793 | 1133 |
| Geometric Mean Tensile (g/3 in.) | 1533 | 2420 | 1047 | 1683 |
| MD Stretch (%) | 16.70 | 19.14 | 16.74 | 18.94 |
| CD Stretch (%) | 7.43 | 7.47 | 7.59 | 8.35 |
| Perforation Tensile (g/3 in.) | 866 | 1380 | 652 | 972 |
| Wet Tensile (g/3 in.) | 311 | 477 | 213 | 332 |
| GM Break Modulus (g/% strain) | 137.56 | 202.50 | 93.92 | 134.23 |
| MB 3100 Brightness (%) | 92.12 | 92.25 | 92.15 | 91.71 |
| MB 3100 b* | 2.26 | 2.35 | 2.06 | 2.34 |
| Opacity | 73.98 | 82.39 | 67.12 | 76.09 |
| Wet Abrasion FQA Lint Count | 500 | 495 | 346 | 444 |
| Dry Lint L* Difference | −0.26 | −0.37 | −0.43 | −0.43 |
| TMI Fric GMMMD 4 Scan-W Unitless | 0.47 | 0.49 | 0.38 | 0.49 |
| Sensory Softness | 17.22 | 17.61 | 18.29 | 18.47 |

Dry Lint: No data is shown in Table 4 for dry linting of the base sheets as the finished product. Dry-lint metrics as shown in Table 6 are all negative, indicating that the lint on the black felt was under the non-detect limit of the scanner. If it is taken that no dry lint was observed for the finished product, then it is extremely likely that the lint from the base sheets would similarly be under the detection limit.

Comparative Example 2

Based upon the results from Example 1, it was determined to evaluate whether product designs satisfying the criteria of low lint, high softness, and dispersibility could be achieved using 20 to 50% CMF, 3 to 7 lb/t FJ98, and 7 to 8.5 lb/ream basis weight.

It was further determined that three-ply glue lamination was an unexpectedly good converting configuration for CMF sheets, as unexpectedly high caliper was obtained out of low basis weight sheets. Accordingly, basesheets were made having the properties set forth in Table 7 using CWP technology. When converted into finished three-ply glue laminated rolls as set forth in Table 8, the products had the physical properties set forth in Table 9. While these products achieve significantly improved levels of softness, strength and resistance to linting, whether wet or dry, it can be appreciated that none of those presented so far has met the ultimate goal of producing a tissue that is as soft as the softest available commercial tissues, but has sufficient resistance to wet linting to be usable pre-moistened.

TABLE 7

Basesheet Properties

| Cell | Roll | Cell | CMF | FJ98 | BW | SW | 8 Sheet Caliper mils/8 sht | BW lb/3000 ft² | MD Tensile g/3 in. | MD Stretch | CD Tensile g/3 in. | CD Stretch | Cured-Wet Tensile Finch CD g/3 in. | Disp. # of Shakes | GM Tensile g/3 in. | GM Break Modulus g/% |
| --- | --- | --- | --- | --- | --- | --- | --- | --- | --- | --- | --- | --- | --- | --- | --- | --- |
| 3 | 4885-12 | 4 | 25 | 4 | 9 | 50 | 30.0 | 9.2 | 775 | 26.5 | 384 | 5.3 | 98 | 800 | 545 | 47 |
|  | 4885-13 | 4 | 25 | 4 | 9 | 50 | 31.5 | 9.4 | 834 | 23.2 | 384 | 4.9 | 104 | 800 | 563 | 53 |
|  | 4885-14 | 4 | 25 | 4 | 9 | 50 | 28.7 | 8.7 | 716 | 24.8 | 340 | 5.8 | 95 | 800 | 493 | 41 |
|  | Average |  |  |  |  |  | 30.1 | 9.1 | 775 | 24.8 | 369 | 5.3 | 99 | 800 | 534 | 47 |
| 4 | 4885-33 | 7 | 50 | 4 | 9 | 50 | 27.8 | 8.06 | 658 | 25.3 | 349 | 6.8 | 76 |  | 479 | 37 |
|  | 4885-34 | 7 | 50 | 4 | 9 | 50 | 29.9 | 8.74 | 905 | 27.8 | 386 | 6.8 | 83 | 500 | 591 | 42 |
|  | 4885-35 | 7 | 50 | 4 | 9 | 50 | 32.6 | 9.76 | 1074 | 27.6 | 423 | 6.1 | 95 | 600 | 673 | 51 |
|  | Average |  |  |  |  |  | 30.1 | 8.9 | 879 | 26.9 | 386 | 6.6 | 84 | 550 | 581 | 43 |

TABLE 8

| Cell | Front Roll | Middle Roll | Back Roll |
| --- | --- | --- | --- |
| 3 | 4885-12 | 4885-13 | 4885-14 |
| 4 | 4885-34 | 4885-33 | 4885-35 |

TABLE 9

Converted Product

| Description | Softness Panel | Dispersibility # of Shakes | Lint Black Felt Unitless | Basis Weight lb/3000 ft² | Caliper mils/8 sht | MD Tensile g/3 in. | CD Tensile g/3 in. | MD Stretch % | CD Stretch % | CD Wet Tensile Finch g/3 in. | Break Modulus GM g/% |
|---|---|---|---|---|---|---|---|---|---|---|---|
| Cell 3, 3-ply | 18.7 | 713 | 1.92 | 24.9 | 164 | 1011 | 672 | 11.8 | 7.0 | 140 | 92 |
| Cell 3, 3-ply | 18.7 | 663 | 1.73 | 25.1 | 158 | 1063 | 651 | 13.0 | 6.5 | 149 | 90 |
| Cell 4, 3-ply | 18.6 | 788 | 0.35 | 24.4 | 160 | 1645 | 848 | 15.2 | 9.3 | 156 | 100 |
| Cell 4, 3-ply | 18.6 | 800 | 0.12 | 23.4 | 154 | 1478 | 844 | 15.6 | 9.1 | 157 | 97 |
| Cell 3 Average | 18.7 | 688 | 1.83 | 25.0 | 161 | 1037 | 662 | 12.4 | 6.8 | 144 | 91 |
| Cell 4 Average | 18.6 | 794 | 0.24 | 23.9 | 157 | 1561 | 846 | 15.4 | 9.2 | 156 | 98 |

Table 9 cont. Converted Product

| Description | Opacity MacBeth Opacity Units | TMI Ply Bond. g | Void Volume Wt Inc % | Break Modulus MD g/% | Break Modulus CD g/% | Void Volume Ratio | TEA MD mm-gm/mm² | TEA CD mm-gm/mm² | FQA Fiber Count Number | FQA Fiber Length $L_w$ mm | FQA Fine Length $L_w$ % |
|---|---|---|---|---|---|---|---|---|---|---|---|
| Cell 3, 3-ply | 79 | 10.9 | 1,353 | 88 | 97 | 7.2 | 0.76 | 0.37 | 2408 | 0.80 | 9.0 |
| Cell 3, 3-ply | 80 | 6.5 | 1,399 | 82 | 99 | 7.4 | 0.94 | 0.33 | 2011 | 0.79 | 9.1 |
| Cell 4, 3-ply | 82 | 7.6 | 1,399 | 108 | 93 | 6.9 | 1.65 | 0.61 | 1563 | 0.64 | 17.7 |
| Cell 4, 3-ply | 82 | 9.5 | 1,373 | 98 | 95 | 7.3 | 1.21 | 0.60 | 2985 | 0.78 | 10.4 |
| Cell 3 Average | 79 | 8.7 | 1376 | 85 | 98 | 7.3 | 0.85 | 0.35 | 2209 | 0.80 | 9.0 |
| Cell 4 Average | 82 | 8.5 | 1386 | 103 | 94 | 7.1 | 1.43 | 0.60 | 2274 | 0.71 | 14.0 |

Table 10 shows a comparison of converted low-lint CWP CMF containing products with an ultra-premium retail tissue, Assignees's Quilted Northern Ultra Plush® and a competitive product, Charmin® Ultra Strong. Three-ply CWP products with CMF were able to at least slightly surpass the performance of Charmin® Ultra Strong in several ways: higher bulk, higher wet strength. higher opacity, and much lower lint achieving these advantages at equal weight and softness. The softness difference, however, is not sufficiently large that it is entirely certain that the difference could be replicated in subsequent panels testing the same products. It is clear, however, that the softness of the CMF containing protocepts was significantly inferior to that of Quilted Northern Ultra Plush® even though their bulk, wet and dry strength, opacity and linting were improved.

TABLE 10

Comparison of Converted Product

| | Quilted Northern Ultra Plush® | Charmin® Ultra Strong | Previous low-lint protocept Comparative Example 1 | Current 25% CMF Protocept | Current 50% CMF Protocept |
|---|---|---|---|---|---|
| CMF, % | | | 50 | 25 | 50 |
| SW, % | | | 50 | 37.5 | 25 |
| Euc, % | | | 0 | 37.5 | 25 |
| FJ98, lb/t | | | 20 | 4 | 4 |
| Basesheet BW, lb/Ream | 12-12.5 | | 7 | 9 | 9 |
| Emboss | | | HVS-9 knurl | HVS-9 | HVS-9 |
| Caliper mils/8 sheet | 144 | 140 | 88 | 161 | 157 |
| Caliper, cc/g | 7.8 | 11.4 | 8.4 | 12.6 | 12.9 |
| Void Volume, % increase | | 1,301 | | 1,376 | 1,386 |
| Basis Weight, lb/3000 ft² | 36 | 23.9 | 20.4 | 25.0 | 23.9 |
| MDDT, g/3 in. | 1200 | 1,373 | 2507 | 1,037 | 1561 |
| MD str, % | | 16.56 | 18.9 | 12.4 | 15.4 |
| CDDT, g/3 in. | 450 | 699 | 1133 | 662 | 846 |
| CD Str, % | | 11.1 | 8.4 | 6.8 | 9.2 |
| CDWT, g/3 in. | 40 | 79 | 332 | 144 | 156 |
| GMT, g/3 in. | 735 | 980 | 1685 | 828 | 1149 |
| GM Break Modulus, | 59 | 73 | 134 | 91 | 98 |
| Opacity | 77 | 67 | | 79 | 82 |
| Softness | 20.0 | 18.6 | 18.5 | 18.7 | 18.6 |
| Dispersibility, # of Shakes | <700 | | 2000+ | 688 | 794 |
| Dry Lint (Delta L*) | 10.2 | 3.0 | −0.4 | 1.8 | 0.24 |
| Wet Lint (Fiber Count) | 15000 | 8,480 | 444 | 2209 | 2274 |

Example 1

We have found that we can get surprisingly good softness, bulk and wet properties using eucalyptus APMP, either without, or in conjunction with, relatively low contents of CMF, even in CWP products. Accordingly, it is evident that eucalyptus APMP can be substituted into the formulations described elsewhere in this application to provide significant benefit.

Pulps were distributed from tanks according to Table 11. The strategy for the outer plies was to make a Yankee layer with kraft pulp and good durability with a layer of high-bulk APMP or other integrated furnish. The middle ply was homogeneously formed with a high (65%) percentage of APMP to maximize bulk or 100% southern kraft. P6 high bulk APMP was used for outer plies, and P3 APMP was used for the middle ply. Marathon NBSK was unrefined. The source of eucalyptus was Votorantin Celulose e Papel (VCP) aka Fibria, Sao Paolo, Brazil.

TABLE 11

| | | Stratified | | | |
|---|---|---|---|---|---|
| | Tank 1, Air layer | | Tank 3, Yankee layer | Total | |
| Cell | B.W. | Pulp | B.W Pulp | BW | Purpose |
| 1 | 3.9 | P6 APMP | 7.1 50/50 Mar./Euc. | 11 | Outer plies |
| 2 | 4.4 | P6 APMP | 8.2 50/50 Mar./Euc. | 12.6 | Outer plies |
| 3 | 4.5 | P6 APMP | 6.5 18/41/41 CMF/Mar./Euc. | 11 | Outer plies |
| 7 | 3.9 | 40/60 P3 APMP/Fibria | 7.1 15/42/43 CMF/Mar./Euc. | 11 | Outer plies |
| 8 | 5.5 | 50/50 SSWK/SHWK | 7.1 15/42/43 CMF/Mar./Euc. | 12.6 | Outer plies |
| 9 | 6.2 | 50/50 SSWK/SHWK | 6.2 20% CMF/80% Euc. Kraft | 12.4 | Outer plies |

| | | Homogeneous | |
|---|---|---|---|
| Cell | B.W. | Pulp | Purpose |
| 4 | 12.6 | 65/35 P3 APMP/Mar. | Middle ply |
| 5 | 11 | 65/35 P3 APMP/Mar. | Middle ply |
| 6 | 12.6 | 50/50 SSWK/SHWK | Middle ply |
| 10 | | 50/50 SSWK/SHWK | Middle ply, No FJ 98 |

Mar. = Marathon NBSK

Nalkat® 2020 was added as an "anionic trash killer" at 5 lb/ton APMP. This was done to prevent trash from poorly washed pilot APMP from interfering with retention of temporary wet strength. GP-C debonder was added to the static mixer at 3 lb/ton APMP. The pH of each of tanks T1 and T3 was adjusted to 5.0 to 5.5 with sulfuric acid to optimize retention of temporary wet strength. FJ98 (temporary wet strength) was added into the pump suction at 6 lb/ton kraft pulp. GP-C was added at 3 lb/ton of APMP eucalyptus in the Yankee layer just before the fan pump.

All sheets for outer plies were calendered and had a GMT target of 350 g/3 in. and a cross-direction wet tensile (CDWT) target of 40 g/3 in. Sheets for middle plies were uncalendered and creped with a 10 degree bevel blade. Tensile control was achieved by increasing FJ98 or increasing debonder as necessary. 25% reel crepe was used for all basesheets. A 15° crepe blade was used for outer plies. In some cases, use of creping adhesive was unnecessary, so water alone could be applied through the Yankee spray as sufficient adhesion for satisfactory creping was provided by FJ98 and the hemicellulose remaining in the eucalyptus APMP. In other cases when debonder in the sheet interfered with adhesion, it was desirable to apply about 0.25 to 0.5 lb/ton PAE coating to the Yankee. A sheet temperature 230° F. was targeted. Only Yankee steam (no hood) was necessary for drying.

Method of Analysis

Results set forth in Table 12 were obtained when converted into finished product and evaluated for basis weight, caliper, wet and dry tensiles, softness, wet and dry lint and dispersibility. FIG. 4 sets forth a desirable design for a three ply bath tissue 4-10 product utilizing eucalyptus APMP, in which upper ply 4-12, comprising two strata 4-14 and 4-16, in which upper stratum 4-14 comprising 50% Northern Bleached softwood kraft fiber and 50% by weight of Eucalyptus kraft has a basis weight of about 7.1 lbs per 3000 sq ft ream, lower stratum 4-16, comprising 100% P6 eucalyptus APMP, has a basis weight of 3.9 lbs per 3000 sq ft ream, while interior ply 4-18, comprising 65% P3 APMP and 35% by weight of northern bleached softwood kraft, has a basis weight of 11 lbs/ream, while lower ply 4-20, comprising two strata 4-22 and 4-24, in which lower stratum 4-24, comprising 50% northern bleached softwood kraft fiber and 50% by weight of eucalyptus kraft, has a basis weight of about 7.1 lbs per 3000 sq ft ream, and upper stratum 4-22, comprising 100% P6 eucalyptus APMP, has a basis weight of 3.9 lbs per 3000 sq ft ream. In many cases, it will be preferable to substitute furnishes comprising about 20% CMF, 40% eucalyptus kraft and 40% northern bleached softwood kraft fiber, for 50% northern bleached softwood kraft fiber and 50% by weight of eucalyptus kraft in the above. It can be observed that upper ply 4-12 and interior ply 4-18 have been embossed together, while lower ply 4-20 is relatively planar and is preferably unembossed.

Table 12 summarizes the properties of CWP prototypes made having a structure like that illustrated in FIG. 4. When "knurl" is indicated in the converting column, interior ply 4-18 was joined to lower ply 4-20 by knurling in a meandering path. When "glue" is indicated in the converting column, the plies were joined to each other by glue lamination. Note that the last two rows provide a comparison to Quilted Northern Ultra Plush® bath tissue and prototypes made using a newer technology in which a nascent web is creped off of a transfer cylinder at between 30 and 60% consistency. Table 13 sets forth details concerning the structure of each glue laminated product, while Tables 13A to 13G set forth further details of the physical properties of the finished products and basesheets, the finished product composition, the converting parameters used for of each of the finished glue laminated products. Tables 14A to 14D do the same for the knurled products. Tables 15 to 17 delineate the properties and construction of CWP sheets made using a high bulk birch pulp, somewhat similar to APMP Eucalyptus.

TABLE 12

Summary of CWP prototypes.

| Item | Description | Basis weight, lb/3000 ft² | Caliper, mil/8 sht | GMT, g/3 in. | Softness | CD Wet, g/3 in. | Dry Lint, ΔL* | Wet lint, mm² | Dispersibility, #shakes | Converting |
|---|---|---|---|---|---|---|---|---|---|---|
| 1 | High-bulk mechanical HW w/CMF | 27.0 | 131 | 888 | 19.7 | 193 | 0.4 | | | 2-ply, HVS9 knurl |
| 2 | High-bulk mechanical HW w/CMF | 37.7 | 174 | 899 | 20.0 | 192 | −0.1 | | | 2-ply, HVS9 knurl |
| 3 | High durable no cmf | 27.0 | 101 | 2405 | 17.5 | 342 | 0.2 | 1 | | 3-ply, U19 lines, glue |
| 4 | Med durable no cmf | 28.1 | 95 | 2076 | 18.1 | 267 | 0.9 | 7 | | 3-ply, U19 lines, glue |
| 5 | Less durable no cmf | 28.4 | 105 | 1495 | 18.5 | 193 | 1.9 | 12 | | 3-ply, U19 lines, glue |
| 6 | Less durable 20% cmf | 26.7 | 95 | 2034 | 17.8 | 229 | 0.8 | 3 | | 3-ply, U19 lines, glue |
| 7 | High durable 20% cmf | 27.2 | 96 | 2633 | 17.2 | 382 | 0.2 | 1 | | 3-ply, U19 lines, glue |
| 8 | Euc APMP 33% | 38.5 | 145 | 902 | 19.1 | 85 | 6.0 | 19 | | 3-ply, U19 lines, glue |
| 9 | Euc APMP 50% | 30.5 | 112 | 731 | 18.9 | 59 | 5.6 | 28 | | 2-ply, U19 lines, glue |
| 10 | Euc APMP 60% | 38.8 | 145 | 850 | 18.2 | 60 | 5.9 | 24 | | 2-ply, U19 lines, glue |
| 11 | Euc APMP 44% | 33.7 | 152 | 982 | 19.3 | 90 | 2.1 | 11 | 688 | 3-ply, U19 , glue |
| 12 | Euc APMP 44% | 36.3 | 160 | 1018 | 19.4 | 116 | 4.3 | 15 | 1450 | 3-ply, U19 , glue |
| 13 | Euc APMP 49%, 7% CMF | 32.7 | 148 | 835 | 19.3 | 92 | 2.6 | 4 | 575 | 3-ply, U19 , glue |
| 14 | Euc APMP 49%, 7% CMF | 32.5 | 146 | 1035 | 19.1 | 130 | 0.6 | 2 | 838 | 3-ply, U19, glue |
| 15 | Euc APMP 31%, 6% CMF | 32.4 | 139 | 1005 | 19.1 | 108 | 1.7 | 6 | 975 | 3-ply, U19, glue |
| 16 | Southern 62%, 6% CMF | 36.7 | 147 | 1165 | 19.3 | 101 | 1.5 | 6 | 2000 | 3-ply, U19, glue |
| 17 | Integrated 57% | 34.3 | 154 | 737 | 20.0 | 72 | 2.4 | 66 | 875 | 3-ply, HVS9 knurl |
| 18 | Integrated 57% | 35.1 | 160 | 619 | 20.4 | 73 | 5.0 | 22 | 1000 | 3-ply, HVS9 knurl |
| 19 | Euc APMP 49%, 7% CMF | 31.0 | 146 | 765 | 19.8 | 100 | 1.1 | 18 | 850 | 3-ply, HVS9 knurl |
| 20 | Euc APMP 49%, 7% CMF | 32.1 | 148 | 953 | 19.8 | 126 | 0.7 | 3 | 1450 | 3-ply, HVS9 knurl |
| 21 | Euc APMP 33%, 6% CMF | 32.7 | 143 | 888 | 19.6 | 100 | 2.0 | 10 | 1025 | 3-ply, HVS9 knurl |
| 22 | Southern 63%, 6% CMF | 36.7 | 148 | 954 | 19.8 | 99 | 1.9 | 8 | 2000 | 3-ply, HVS9 knurl |
| 23 | Southern 65%, 7% Pilot CMF | 35.8 | 150 | 788 | 20.1 | 68 | 3.8 | 13 | 2000 | 3-ply, HVS9 knurl |
| 24 | Southern 65%, 7% Pilot CMF | 35.0 | 150 | 823 | 20.1 | 89 | 2.7 | 11 | 2000 | 3-ply, HVS9 knurl |
| Comparatives | | | | | | | | | | |
| | FRBC/Belt 171 P3403G | 26.3 | 145 | 932 | 19.3 | 113 | 5.4 | 30 | 600 | |
| | Quilted Northern UltraPlush ® | 37.0 | 148 | 773 | 20.0 | 40 | | | | 3-ply, HVS9 knurl |

TABLE 13

Basesheet data for 3 Ply U19/glue lamination prototypes

| Sample | Conv. Cell | PM cell | Basesheet Description | Caliper 8 Sheet mils/8 sht | Basis Weight lb/3000 ft² | MD Tensile g/3 in. | MD Stretch % | CD Tensile g/3 in. | CD Stretch % | GM Tensile g/3 in. | CD Wet Tensile Finch Cured g/3 in. | GM Break Modulus gms/% | CD Break Modulus gms/% | MD Break Modulus gms/% |
|---|---|---|---|---|---|---|---|---|---|---|---|---|---|---|
| 4-1 | 1 | 1 | 0110-4 | 49.1 | 11.4 | 386 | 28.5 | 284 | 4.7 | 331 | 23 | 29 | 60 | 14 |
| 32-1 | 1 | 5 | 0110-31 | 64.6 | 11.5 | 476 | 31.1 | 260 | 4.3 | 351 | 54 | 29 | 55 | 16 |
| 5-1 | 1 | 1 | 0110-5 | 47.3 | 11.4 | 351 | 26.9 | 277 | 4.4 | 311 | 27 | 28 | 65 | 12 |
| | | | | 160.9 | 34.3 | 1214 | 28.8 | 821' | 4.45 | 993 | 104 | 29 | 60 | 14 |
| 10-1 | 2 | 2 | 0110-9 | 50.1 | 12.5 | 410 | 29.6 | 327 | 4.4 | 365 | 42 | 32 | 72 | 14 |
| 27-1 | 2 | 4 | 0110-26 | 65.9 | 117 | 629 | 29.7 | 372 | 4.2 | 482 | 62 | 49 | 108 | 22 |
| 11-1 | 2 | 2 | 0110-10 | 53.2 | 12.6 | 331 | 28.7 | 253 | 4.7 | 289 | 35 | 25 | 54 | 12 |
| | | | | 169.2 | 37.8 | 1369 | 29.3 | 952 | 4.45 | 1136 | 139 | 35 | 78 | 16 |
| 15-1 | 3 | 3A | 0110-14 | 46.1 | 11.2 | 483 | 32.2 | 316 | 5.1 | 391 | 44 | 32 | 69 | 15 |

TABLE 13-continued

Basesheet data for 3 Ply U19/glue lamination prototypes

| Sample | Conv. Cell | PM cell | Basesheet Description | Caliper 8 Sheet mils/ 8 sht | Basis Weight lb/3000 ft² | MD Tensile g/3 in. | MD Stretch % | CD Tensile g/3 in. | CD Stretch % | GM Tensile g/3 in. | CD Wet Tensile Finch Cured g/3 in. | GM Break Modulus gms/% | CD Break Modulus gms/% | MD Break Modulus gms/% |
|---|---|---|---|---|---|---|---|---|---|---|---|---|---|---|
| 31-1 | 3 | 5 | 0110-30 | 62.2 | 11.6 | 552 | 30.2 | 312 | 3.9 | 415 | 48 | 38 | 80 | 18 |
| 16-1 | 3 | 3A | 0110-15 | 48.5 | 110 | 381 | 30.9 | 264 | 4.7 | 317 | 34 | 27 | 60 | 12 |
|  |  |  |  | 156.8 | 33.8 | 1416 | 31.1 | 893 | 4.54 | 1123 | 127 | 32 | 70 | 15 |
| 19-1 | 4 | 3B | 0110-18 | 45.8 | 10.9 | 472 | 29.8 | 365 | 4.9 | 415 | 66 | 34 | 74 | 16 |
| 26-1 | 4 | 4 | 0110-25 | 65.4 | 13.1 | 757 | 29.3 | 435 | 3.8 | 574 | 74 | 56 | 120 | 26 |
| 20-1 | 4 | 3B | 0110-19 | 46.0 | 10.9 | 491 | 30.8 | 356 | 5.0 | 417 | 63 | 33 | 73 | 15 |
|  |  |  |  | 157.2 | 34.9 | 1719 | 29.9 | 1157 | 4.59 | 1406 | 202 | 41 | 89 | 19 |
| 39-1 | 5 | 7 | 0110-38 | 43.7 | 11.7 | 462 | 29.8 | 313 | 5.8 | 380 | 47 | 28 | 50 | 15 |
| 30-1 | 5 | 5 | 0110-29 | 62.0 | 11.4 | 604 | 28.1 | 330 | 4.1 | 443 | 33 | 41 | 72 | 23 |
| 40-1 | 5 | 7 | 0110-39 | 41.1 | 10.8 | 383 | 29.3 | 285 | 5.1 | 330 | 42 | 27 | 56 | 13 |
|  |  |  |  | 146.8 | 33.9 | 1449 | 29.1 | 928 | 4.99 | 1154 | 123 | 32 | 59 | 17 |
| 46-1 | 6 | 8 | 0110-45 | 45.0 | 12.5 | 539 | 28.9 | 318 | 5.6 | 413 | 39 | 32 | 57 | 18 |
| 35-1 | 6 | 6 | 0110-34 | 63.0 | 12.8 | 322 | 35.9 | 268 | 5.5 | 293 | 31 | 21 | 47 | 9 |
| 47-1 | 6 | 8 | 0110-46 | 44.8 | 12.9 | 575 | 28.7 | 355 | 5.7 | 452 | 42 | 35 | 61 | 20 |
|  |  |  |  | 152.8 | 38.2 | 1436 | 31.1 | 941 | 5.58 | 1157 | 112 | 29 | 55 | 15 |

TABLE 13A

Basesheet data for 3 Ply U19/glue lamination prototypes

| 11.2011-0039 Sample | Conv. Cell | PM cell | Basesheet Description | Caliper 8 Sheet mils/ 8 sht | Basis Weight lb/3000 ft² | Tensile MD g/3 in. | Stretch MD % | Tensile CD g/3 in. | Stretch CD % | Tensile GM g/3 in. | Wet Tensile Finch Cured- CD g/3 in. | Break Modulus GM gms/% | Break Modulus CD gms/% | Break Modulus MD gms/% |
|---|---|---|---|---|---|---|---|---|---|---|---|---|---|---|
| 4-1 | 1 | 1 | 0110-4 | 49.1 | 11.4 | 386 | 28.5 | 284 | 4.7 | 331 | 23 | 29 | 60 | 14 |
| 32-1 | 1 | 5 | 0110-31 | 64.6 | 11.5 | 476 | 31.1 | 260 | 4.3 | 351 | 54 | 29 | 55 | 16 |
| 5-1 | 1 | 1 | 0110-5 | 47.3 | 11.4 | 351 | 26.9 | 277 | 4.4 | 311 | 27 | 28 | 65 | 12 |
|  |  |  |  | 160.9 | 34.3 | 1214 | 28.8 | 821' | 4.45 | 993 | 104 | 29 | 60 | 14 |
| 10-1 | 2 | 2 | 0110-9 | 50.1 | 12.5 | 410 | 29.6 | 327 | 4.4 | 365 | 42 | 32 | 72 | 14 |
| 27-1 | 2 | 4 | 0110-26 | 65.9 | 117 | 629 | 29.7 | 372 | 4.2 | 482 | 62 | 49 | 108 | 22 |
| 11-1 | 2 | 2 | 0110-10 | 53.2 | 12.6 | 331 | 28.7 | 253 | 4.7 | 289 | 35 | 25 | 54 | 12 |
|  |  |  |  | 169.2 | 37.8 | 1369 | 29.3 | 952 | 4.45 | 1136 | 139 | 35 | 78 | 16 |
| 15-1 | 3 | 3A | 0110-14 | 46.1 | 11.2 | 483 | 32.2 | 316 | 5.1 | 391 | 44 | 32 | 69 | 15 |
| 31-1 | 3 | 5 | 0110-30 | 62.2 | 11.6 | 552 | 30.2 | 312 | 3.9 | 415 | 48 | 38 | 80 | 18 |
| 16-1 | 3 | 3A | 0110-15 | 48.5 | 110 | 381 | 30.9 | 264 | 4.7 | 317 | 34 | 27 | 60 | 12 |
|  |  |  |  | 156.8 | 33.8 | 1416 | 31.1 | 893 | 4.54 | 1123 | 127 | 32 | 70 | 15 |
| 19-1 | 4 | 3B | 0110-18 | 45.8 | 10.9 | 472 | 29.8 | 365 | 4.9 | 415 | 66 | 34 | 74 | 16 |
| 26-1 | 4 | 4 | 0110-25 | 65.4 | 13.1 | 757 | 29.3 | 435 | 3.8 | 574 | 74 | 56 | 120 | 26 |
| 20-1 | 4 | 3B | 0110-19 | 46.0 | 10.9 | 491 | 30.8 | 356 | 5.0 | 417 | 63 | 33 | 73 | 15 |
|  |  |  |  | 157.2 | 34.9 | 1719 | 29.9 | 1157 | 4.59 | 1406 | 202 | 41 | 89 | 19 |
| 39-1 | 5 | 7 | 0110-38 | 43.7 | 11.7 | 462 | 29.8 | 313 | 5.8 | 380 | 47 | 28 | 50 | 15 |
| 30-1 | 5 | 5 | 0110-29 | 62.0 | 11.4 | 604 | 28.1 | 330 | 4.1 | 443 | 33 | 41 | 72 | 23 |
| 40-1 | 5 | 7 | 0110-39 | 41.1 | 10.8 | 383 | 29.3 | 285 | 5.1 | 330 | 42 | 27 | 56 | 13 |
|  |  |  |  | 146.8 | 33.9 | 1449 | 29.1 | 928 | 4.99 | 1154 | 123 | 32 | 59 | 17 |
| 46-1 | 6 | 8 | 0110-45 | 45.0 | 12.5 | 539 | 28.9 | 318 | 5.6 | 413 | 39 | 32 | 57 | 18 |
| 35-1 | 6 | 6 | 0110-34 | 63.0 | 12.8 | 322 | 35.9 | 268 | 5.5 | 293 | 31 | 21 | 47 | 9 |
| 47-1 | 6 | 8 | 0110-46 | 44.8 | 12.9 | 575 | 28.7 | 355 | 5.7 | 452 | 42 | 35 | 61 | 20 |
|  |  |  |  | 152.8 | 38.2 | 1436 | 31.1 | 941 | 5.58 | 1157 | 112 | 29 | 55 | 15 |

TABLE 13B

Finished product composition.

|  | Euc APMP | SBHK | SBSK | NBSK | Euc Kraft | CMF |
|---|---|---|---|---|---|---|
| 1 | 44.4 | 0.0 | 0.0 | 33.7 | 21.9 | 0.0 |
| 2 | 44.4 | 0.0 | 0.0 | 33.7 | 21.9 | 0.0 |
| 3 | 48.6 | 0.0 | 0.0 | 28.1 | 16.1 | 7.2 |
| 4 | 49.4 | 0.0 | 0.0 | 28.4 | 15.3 | 6.9 |
| 5 | 31.3 | 0.0 | 0.0 | 29.8 | 32.6 | 6.4 |
| 6A | 0.0 | 31.2 | 31.2 | 15.8 | 16.1 | 5.6 |
| 6B | 0.0 | 31.2 | 31.2 | 15.8 | 16.1 | 5.6 |

TABLE 13C

Converting Parameters (U19/Glue)
Emboss Sleeves: U19 300-0436.2 HVS
Plybond Adhesive: TT 3005, 5% solids
Perf Blades: 1866 × 0.040
Sheet Length: 4.09
Sheet Count: 200

| Cell ID | Emboss Pen. | Front Roll # | Middle Roll # Embossed | Back Roll # Embossed | Many Roll Nip Open/Closed | # of logs/Rolls | Notes |
|---|---|---|---|---|---|---|---|
| 1 | 0.052 | Cell 1-4 | Cell 5-31 | Cell 1-5 | 16 mm | 12/24 | |
| 2 | 0.052 | Cell 2-9 | Cell 4-26 | Cell 2-10 | 16 mm | 6/12 | |
| 3 | 0.055 | Cell 3A-14 | Cell 5-30 | Cell 3A-15 | 16 mm | 13/26 | |
| 4 | 0.055 | Cell 3B-18 | Cell 4-25 | Cell 3B-19 | | 16/32 | Decreased marry roll nip width |
| 5 | 0.052 | Cell 7-38 | Cell 5-29 | Cell 7-39 | | 16/32 | |
| 6A | 0.052 | Cell 8-45 | Cell 6-34 | Cell 8-46 | | 6/12 | |
| 6B | 0.045 | Cell 8-45 | Cell 6-34 | Cell 8-46 | | 10/20 | |

TABLE 13D

Glue Laminated Finished product-Physical Properties (pt. 1)

| | Table 23 ref | Description | Softness panel | Wet Abrasion, mm² | Lint Black Felt Unitless | Basis Weight lb/3000 ft² | Caliper 8 Sheet mils/8 sht | MD Tensile g/3 in. | CD Tensile g/3 in. | GM Tensile g/3 in. | MD Stretch % | CD Stretch % | CD Wet Tensile Finch g/3 in. |
|---|---|---|---|---|---|---|---|---|---|---|---|---|---|
| 1 | 3 | High durable no cmf | 17.5 | 1 | 0.2 | 27.0 | 101 | 3,242 | 1,790 | 2,405 | 28.0 | 5.1 | 342 |
| 2 | 4 | med durable no cmf | 18.1 | 7 | 0.9 | 28.1 | 95 | 2,688 | 1,604 | 2,076 | 27.7 | 5.6 | 267 |
| 3 | 5 | less durable no cmf | 18.5 | 12 | 1.9 | 28.4 | 105 | 1,888 | 1,185 | 1,495 | 26.1 | 5.2 | 193 |
| 4 | 6 | less durable 20% cmf | 17.8 | 3 | 0.8 | 26.7 | 95 | 2,899 | 1,428 | 2,034 | 28.1 | 6.3 | 229 |
| 5 | 7 | High durable 20% cmf | 17.2 | 1 | 0.2 | 27.2 | 96 | 3,727 | 1,862 | 2,633 | 28.9 | 6.2 | 382 |
| 6 | 8 | 33% AP MP (P6) | 19.1 | 19 | 6.0 | 38.5 | 145 | 1,105 | 738 | 902 | 19.8 | 4.7 | 85 |
| 7 | 9 | 50% AP MP (P6) | 18.9 | 28 | 5.6 | 30.5 | 112 | 878 | 610 | 731 | 20.5 | 5.2 | 59 |
| 8 | 10 | 60% AP MP (P6) | 18.2 | 24 | 5.9 | 38.8 | 145 | 1,040 | 698 | 850 | 19.0 | 4.7 | 60 |

TABLE 13E

Glue Laminated Finished product-Physical Properties (pt. 2)

| | Table 23 ref | Description | GM Break Modulus g/% | Brtness MacBeth UV-C % | MacBeth Opacity Units | Roll Diameter in | Roll Compress Value % | TMI Ply Bond g | MD Break Modulus g/% | CD Break Modulus g/% | MD TEA mm-g/mm² | CD TEA mm-g/mm² |
|---|---|---|---|---|---|---|---|---|---|---|---|---|
| 1 | 3 | High durable no cmf | 203 | 89.7 | 72 | 4.80 | 29.29 | 4.65 | 116 | 355 | 4.20 | 0.59 |
| 2 | 4 | med durable no cmf | 166 | 89.8 | 72 | 4.32 | 19.10 | 5.14 | 96 | 287 | 3.66 | 0.59 |
| 3 | 5 | less durable no cmf | 129 | 89.8 | 73 | 4.55 | 19.33 | 20.69 | 73 | 230 | 2.61 | 0.40 |
| 4 | 6 | less durable 20% cmf | 151 | 91.6 | 80 | 4.26 | 17.84 | 8.63 | 104 | 220 | 3.44 | 0.60 |
| 5 | 7 | High durable 20% cmf | 196 | 91.3 | 79 | 4.38 | 17.93 | 3.98 | 128 | 300 | 4.27 | 0.80 |
| 6 | 8 | 33% AP MP (P6) | 92 | 87.8 | 82 | 4.91 | 21.40 | 9.54 | 56 | 153 | 1.46 | 0.23 |
| 7 | 9 | 50% AP MP (P6) | 71 | 87.8 | 77 | 4.12 | 13.73 | 11.80 | 43 | 118 | 1.24 | 0.22 |
| 8 | 10 | 60% AP MP (P6) | 89 | 86.6 | 83 | 4.71 | 16.88 | 10.96 | 55 | 145 | 1.37 | 0.23 |

TABLE 13F

Finished product composition for CWP sheets

| | NBSK | VCP Eucalyptus Kraft | Euc APMP P6 | CMF |
|---|---|---|---|---|
| 1 | 50 | 50 | 0 | 0 |
| 2 | 50 | 50 | 0 | 0 |
| 3 | 50 | 50 | 0 | 0 |
| 4 | 40 | 40 | 0 | 20 |
| 5 | 40 | 40 | 0 | 20 |
| 6 | 40 | 27 | 33 | 0 |
| 7 | 30 | 20 | 50 | 0 |
| 8 | 24 | 16 | 60 | 0 |

TABLE 13G

| | | | | | | | | | | | | |
|---|---|---|---|---|---|---|---|---|---|---|---|---|
| Glue Laminated Finished product-Physical Properties (pt. 1) | | | | | | | | | | | | |
| Description | Table 23 ref | Softness Panel | Dispersibility, #shakes | Wet Abrasion Tissue mm² | Lint Black Felt Unitless | Basis Weight lb/3000 ft² | 8 Sheet Caliper mils/8 sht | MD Tensile g/3 in. | CD Tensile g/3 in. | GM Tensile g/3 in. | MD Stretch % | ileStretch % |
| 1 | 11 | 19.33 | 688 | 11.0 | 2.1 | 33.7 | 152 | 1,280 | 756 | 982 | 22.2 | 5.1 |
| 2 | 12 | 19.35 | 1450 | 15.1 | 4.3 | 36.3 | 160 | 1,169 | 886 | 1,018 | 21.7 | 4.9 |
| 3 | 13 | 19.31 | 575 | 3.9 | 2.6 | 32.7 | 148 | 1,019 | 688 | 835 | 20.3 | 5.2 |
| 4 | 14 | 19.05 | 838 | 1.7 | 0.6 | 32.5 | 146 | 1,314 | 818 | 1,035 | 20.6 | 5.3 |
| 5 | 15 | 19.11 | 975 | 6.3 | 1.7 | 32.4 | 139 | 1,315 | 769 | 1,005 | 22.2 | 5.1 |
| 6A | 16 | 19.29 | 2000 | 5.9 | 1.5 | 36.7 | 147 | 1,468 | 926 | 1,165 | 25.5 | 5.9 |
| 6B | — | 19.31 | 2000 | 5.4 | 1.3 | 36.8 | 143 | 1,464 | 971 | 1,190 | 26.6 | 5.8 |

| | | | | | | | | | | | |
|---|---|---|---|---|---|---|---|---|---|---|---|
| Glue Laminated Finished product-Physical Properties (pt. 2) | | | | | | | | | | | |
| Description | Table 23 ref | Perf Tensile g/3 in, | Finch CD g/3 in. | Modulus GM gms/% | Roll Diameter in | Compress Value % | TMI Ply Bond g | Modulus MD g/% | Modulus CD g/% | mm-gm/mm² | mm-gm/mm² |
| 1 | 11 | 377 | 90 | 94 | 5.06 | 21.9 | 9.0 | 58 | 153 | 1.65 | 0.28 |
| 2 | 12 | 412 | 116 | 100 | 5.13 | 21.2 | 7.5 | 55 | 182 | 1.60 | 0.32 |
| 3 | 13 | 336 | 92 | 81 | 5.13 | 26.5 | 8.8 | 50 | 130 | 1.27 | 0.25 |
| 4 | 14 | 448 | 130 | 100 | 4.95 | 22.6 | 8.0 | 64 | 156 | 1.55 | 0.31 |
| 5 | 15 | 397 | 108 | 94 | 4.98 | 27.8 | 11.1 | 60 | 150 | 1.62 | 0.29 |
| 6A | 16 | 441 | 101 | 95 | 4.91 | 22.5 | 15.3 | 57 | 158 | 1.96 | 0.40 |
| 6B | — | 421 | 106 | 97 | 5.04 | 28.4 | 14.6 | 56 | 168 | 2.04 | 0.42 |

TABLE 14A

Construction data for HVS9/knurl prototypes w/Basesheet data.

| Sample | Converting Cell | PM cell | Description | 8 Sheet Caliper mils/8 sht | Basis Weight lb/3000 ft² | MD Tensile g/3 in. | MD Stretch % | Tensile CD g/3 in. | Stretch CD % | Tensile GM g/3 in. | CD Wet Tens Finch Cured g/3 in. | GM Break Modulus g/% |
|---|---|---|---|---|---|---|---|---|---|---|---|---|
| 6-1 | 1 | 1 | 0110-6 | 46.9 | 11.1 | 365 | 28.8 | 280 | 4.5 | 320 | 26 | 29 |
| 37-1 | 1 | 6 | 0110-36 | 57.7 | 12.1 | 407 | 35.0 | 361 | 5.3 | 383 | 49 | 29 |
| 7-1 | 1 | 1 | 0110-7 | 47.4 | 11.3 | 369 | 28.7 | 294 | 4.6 | 329 | 27 | 29 |
| | | | | 152.0 | 34.5 | 1141 | 30.8 | 935 | 4.8 | 1031 | 102 | 29 |
| 12-1 | 2 | 2 | 0110-11 | 56.0 | 12.7 | 335 | 29.9 | 290 | 4.5 | 311 | 33 | 26 |
| 34-1 | 2 | 6 | 0110-33 | 63.5 | 13.0 | 357 | 38.7 | 274 | 5.4 | 312 | 30 | 23 |
| 13-1 | 2 | 2 | 0110-12 | 52.2 | 12.3 | 326 | 29.1 | 250 | 5.3 | 285 | 34 | 22 |
| | | | | 171.7 | 37.9 | 1018 | 32.6 | 815 | 5.1 | 908 | 96 | 24 |
| 17-1 | 3 | 3A | 0110-16 | 46.9 | 10.9 | 417 | 30.3 | 341 | 5.0 | 376 | 49 | 31 |
| 29-1 | 3 | 5 | 0110-28 | 62.8 | 11.8 | 453 | 30.4 | 363 | 4.4 | 405 | 45 | 35 |
| 18-1 | 3 | 3A | 0110-17 | 45.8 | 10.5 | 382 | 29.3 | 301 | 5.2 | 338 | 43 | 27 |
| | | | | 155.4 | 33.2 | 1252 | 30.0 | 1005 | 4.9 | 1119 | 137 | 31 |
| 21-1 | 4 | 3B | 0110-20 | 45.8 | 11.0 | 475 | 31.3 | 344 | 5.0 | 404 | 59 | 32 |
| 25-1 | 4 | 4 | 0110-24 | 63.8 | 12.3 | 708 | 30.0 | 374 | 4.1 | 514 | 47 | 46 |
| 22-1 | 4 | 3B | 0110-21 | 45.8 | 10.5 | 393 | 29.9 | 311 | 6.2 | 350 | 59 | 24 |
| | | | | 155.3 | 33.7 | 1576 | 30.4 | 1029 | 5.1 | 1268 | 165 | 34 |
| 41-1 | 5 | 7 | 0110-40 | 41.6 | 10.8 | 365 | 27.9 | 274 | 5.2 | 316 | 42 | 27 |
| 28-1 | 5 | 4 | 0110-27 | 65.8 | 13.0 | 734 | 29.3 | 419 | 4.2 | 554 | 72 | 49 |
| 42-1 | 5 | 7 | 0110-41 | 41.2 | 10.8 | 363 | 30.4 | 284 | 5.3 | 321 | 39 | 25 |
| | | | | 148.6 | 34.6 | 1462 | 29.2 | 977 | 4.9 | 1191 | 153 | 34 |
| | | | | 162.9 | | 1097 | | 733 | | 893 | 115 | |
| 48-1 | 6 | 8 | 0110-47 | 46.1 | 12.7 | 606 | 31.3 | 357 | 5.2 | 465 | 45 | 37 |
| 36-1 | 6 | 6 | 0110-35 | 63.7 | 13.6 | 390 | 35.3 | 312 | 5.0 | 345 | 43 | 27 |
| 49-1 | 6 | 8 | 0110-48 | 45.7 | 12.5 | 484 | 28.1 | 293 | 5.6 | 376 | 38 | 31 |
| | | | | 155.4 | 38.8 | 1480 | 31.6 | 962 | 5.3 | 1186 | 126 | 32 |
| | | | | 170.4 | | 1110 | | 721 | | 890 | 94 | |
| 56-1 | 7 | 9 | 0216-7 | 46.3 | 12.6 | 404 | 30.9 | 336 | 5.3 | 368 | 35 | 29 |
| 66-1 | 7 | 10 | 0216-16 | 66.6 | 12.7 | 323 | 36.9 | 238 | 5.8 | 277 | 6 | 19 |
| 57-1 | 7 | 9 | 0216-8 | 47.6 | 12.5 | 477 | 32.7 | 362 | 5.2 | 415 | 35 | 31 |
| | | | | 160.5 | 37.9 | 1203 | 33.5 | 936 | 5.4 | 1060 | 75 | 26 |
| 58-1 | 8 | 9 | 0216-9 | 46.0 | 12.5 | 442 | 30.5 | 331 | 4.9 | 382 | 39 | 32 |

TABLE 14A-continued

Construction data for HVS9/knurl prototypes w/Basesheet data.

| Sample | Converting Cell | PM cell | Description | 8 Sheet Caliper mils/8 sht | Basis Weight lb/3000 ft² | MD Tensile g/3 in. | MD Stretch % | Tensile CD g/3 in. | Stretch CD % | Tensile GM g/3 in. | CD Wet Tens Finch Cured g/3 in. | GM Break Modulus g/% |
|---|---|---|---|---|---|---|---|---|---|---|---|---|
| 63-1 | 8 | 6 | 0216-13 | 64.8 | 12.5 | 390 | 35.8 | 332 | 5.8 | 359 | 45 | 24 |
| 59-1 | 8 | 9 | 0216-10 | 46.8 | 12.7 | 451 | 31.0 | 369 | 5.0 | 408 | 39 | 34 |
|  |  |  |  | 157.6 | 37.7 | 1284 | 32.4 | 1032 | 5.2 | 1149 | 124 | 30 |

TABLE 14B

Finished product composition for HVS 9 Knurl Products.

|  | EUCAPMP | SBHK | SBSK | NBSK | Euc Kraft | CMF |
|---|---|---|---|---|---|---|
| 1 | 22 | 17 | 17 | 21 | 21 | 0 |
| 2 | 22 | 17 | 17 | 22 | 22 | 0 |
| 3 | 49 | 0 | 0 | 28 | 16 | 7.1 |
| 4 | 49 | 0 | 0 | 28 | 16 | 7.0 |
| 5 | 33 | 0 | 0 | 30 | 31 | 6.0 |
| 6 | 0 | 32 | 32 | 15 | 16 | 5.5 |
| 7 | 0 | 32 | 32 | 0 | 28 | 7.0 |
| 8 | 0 | 32 | 32 | 0 | 28 | 7.1 |

TABLE 14C

HVS9/knurl finished product Physical Properties (pt. 1)

| Description | Table 23 desc. | Softness Panel | Dispersibility # of Shakes | Wet Abrasion Tissue mm² | Lint Black felt Unitless | Basis Weight lb/3000 ft² | Caliper 8 Sheet mils/8 Sheet | Tensile MD g/3 in. | Tensile GM g/3 in. | Stretch MD g/3 in. | Stretch CD % |
|---|---|---|---|---|---|---|---|---|---|---|---|
| 5-1 | 17 | 20.02 | 875 | 66 | 2.4 | 34.3 | 154 | 910 | 599 | 18.1 | 4.8 |
| 5-2 | 18 | 20.36 | 1000 | 22 | 5.0 | 35.1 | 160 | 762 | 505 | 17.8 | 5.1 |
| 5-3 | 19 | 19.84 | 850 | 18 | 1.1 | 31.0 | 146 | 1,008 | 583 | 17.4 | 5.2 |
| 5-4 | 20 | 19.79 | 1450 | 3 | 0.7 | 32.1 | 148 | 1,230 | 740 | 18.4 | 5.0 |
| 5-5 | 21 | 19.56 | 1025 | 10 | 2.0 | 32.7 | 143 | 1,225 | 645 | 18.7 | 5.0 |
| 5-6 | 22 | 19.79 | 2000 | 8 | 1.9 | 36.7 | 148 | 1,292 | 705 | 21.5 | 5.6 |
| 5-7 | 23 | 20.10 | 2000 | 13 | 3.8 | 35.8 | 150 | 918 | 679 | 20.3 | 5.1 |
| 5-8 | 24 | 20.08 | 2000 | 11 | 2.7 | 35.0 | 150 | 946 | 718 | 18.9 | 5.0 |

HVS9/knurl finished product Physical Properties (pt. 2)

| Description | Table 23 desc. | Perf-Tensile g/3 in. | Wet Tens Finch CD g/3 in. | Break Modulus GM g/% | Roll Diameter in | Roll Compress Value % | TMI Ply Bond g | Break Modulus MD g/% | Break Modulus CD g/% | TEA MD mm-g/mm² | TEA CD mm-g/mm² |
|---|---|---|---|---|---|---|---|---|---|---|---|
| 5-1 | 17 | 389 | 72 | 80 | 4.96 | 21 | 7.9 | 51.7 | 124.6 | 1.02 | 0.19 |
| 5-2 | 18 | 354 | 73 | 64 | 4.83 | 23 | 5.7 | 43.1 | 94.3 | 0.86 | 0.17 |
| 5-3 | 19 | 343 | 100 | 80 | 5.00 | 24 | 3.2 | 57.3 | 112.1 | 1.03 | 0.20 |
| 5-4 | 20 | 456 | 126 | 100 | 5.04 | 23 | 4.4 | 67.4 | 148.0 | 1.31 | 0.24 |
| 5-5 | 21 | 431 | 100 | 93 | 4.92 | 22 | 6.8 | 66.5 | 130.1 | 1.28 | 0.21 |
| 5-6 | 22 | 518 | 99 | 87 | 5.03 | 24 | 8.7 | 60.5 | 125.3 | 1.51 | 0.26 |
| 5-7 | 23 | 358 | 68 | 78 | 4.91 | 20 | 6.9 | 45.6 | 132.4 | 1.13 | 0.22 |
| 5-8 | 24 | 352 | 89 | 85 | 5.07 | 25 | 7.7 | 49.9 | 146.4 | 1.07 | 0.23 |

TABLE 14D

Converting parameters Sheet Length 4.09" Sheet Width 4.05"

| Cell No. | #1 Unwind Base Sheet | #2 Unwind Base Sheet | #3 Unwind Base Sheet | Lower Emboss Pattern # | Converting Process | Lower Emboss Depth | Feed-roll Calender | Mach. Speed FPM | Unwind Tension #1 | Unwind Tension #2 | Unwind Tension #3 | Ply-bond Air Pressure | Draw Tension | Winding Tension | Sheet Count | Finished Roll Diameter |
|---|---|---|---|---|---|---|---|---|---|---|---|---|---|---|---|---|
| 1 | 110-6 | 110-36 | 110-7 | 300-107.1 | 3 ply HVS | 0.090 | open | 130 | 0.5 | 0.5 | 0.5 | 23 psi | float | 0.8 | 200 | 4.92 |
| 2 | 110-12 | 110-33 | 110-11 | 300-107.1 | 3 ply HVS | 0.090 | open | 130 | 0.5 | 0.5 | 0.5 | 23 psi | float | 0.6 | 176 | 4.84 |
| 8 | 216-10 | 216-13 | 216-9 | 300-107.1 | 3 ply HVS | 0.090 | open | 130 | 0.5 | 0.5 | 0.5 | 23 psi | float | 0.5 | 200 | 4.94 |
| 6 | 110-48 | 110-35 | 110-47 | 300-107.1 | 3 ply HVS | 0.090 | open | 130 | 0.5 | 0.5 | 0.5 | 23 psi | float | 0.7 | 200 | 4.90 |

TABLE 14D-continued

Converting parameters Sheet Length 4.09" Sheet Width 4.05"

| Cell No. | #1 Unwind Base Sheet | #2 Unwind Base Sheet | #3 Unwind Base Sheet | Lower Emboss Pattern # | Converting Process | Lower Emboss Depth | Feed-roll Cal-ender | Mach. Speed FPM | Un-wind Ten-sion #1 | Un-wind Ten-sion #2 | Un-wind Ten-sion #3 | Ply-bond Air Pres-sure | Draw Ten-sion | Wind-ing Ten-sion | Sheet Count | Finished Roll Diam-eter |
|---|---|---|---|---|---|---|---|---|---|---|---|---|---|---|---|---|
| 3 | 0110-17 | 0110-28 | 0110-16 | 300-107.1 | 3 ply HVS | 0.090 | open | 130 | 0.5 | 0.5 | 0.5 | 23 psi | float | 0.8 | 200 | 4.89 |
| 4 | 0110-21 | 0110-24 | 0110-30 | 300-107.1 | 3 ply HVS | 0.090 | open | 130 | 0.5 | 0.5 | 0.5 | 23 psi | float | 0.9 | 200 | 4.95 |
| 5 | 0110-41 | 0110-27 | 0110-40 | 300-107.1 | 3 ply HVS | 0.090 | open | 130 | 0.5 | 0.5 | 0.5 | 23 psi | float | 0.8 | 200 | 4.89 |
| 7 | 216-8 | 216-16 | 216-7 | 300-107.1 | 3 ply HVS | 0.090 | open | 130 | 0.5 | 0.5 | 0.5 | 23 psi | float | 0.7 | 200 | 4.92 |

TABLE 15

Physical Properties of two-ply, high-bulk tissue with Tembec birch APMP (pt. 1).

| Description | Caliper 8 Sheet mils/8 sht | Basis Weight lb/3000 ft$^2$ | MD Tensile g/3 in. | MD Stretch % | CD Tensile g/3 in. | CD Stretch % | GM Tensile g/3 in. | CD Wet Tens Finch Cured-g/3 in. |
|---|---|---|---|---|---|---|---|---|
| 0302-2 | 62 | 14.1 | 879 | 28.1 | 595 | 5.1 | 723 | 172 |
| 0302-3 | 64 | 14.5 | 988 | 30.3 | 546 | 5.4 | 734 | 163 |
| 0302-4 | 88 | 19.9 | 868 | 28.1 | 587 | 5.0 | 714 | 154 |
| 0302-5 | 84 | 19.7 | 884 | 28.4 | 701 | 5.0 | 786 | 183 |

Physical Properties of two-ply, high-bulk tissue with Tembec birch APMP (pt. 2).

| Description | GM Break Modulus gms/% | SAT Capacity g/m$^2$ | SAT Rate g/s$^{0.5}$ | SAT Time s | CD TEA mm-gm/mm$^2$ | MD TEA mm-gm/mm$^2$ | CD Break Modulus gms/% | MD Break Modulus gms/% |
|---|---|---|---|---|---|---|---|---|
| 0302-2 | 61 | 337 | 0.0613 | 124.9 | 0.21 | 0.96 | 117 | 32 |
| 0302-3 | 58 | 350 | 0.0667 | 112.6 | 0.21 | 1.12 | 102 | 33 |
| 0302-4 | 58 | 548 | 0.1047 | 141.4 | 0.20 | 1.01 | 109 | 31 |
| 0302-5 | 63 | 532 | 0.1043 | 146.6 | 0.25 | 1.03 | 137 | 29 |

TABLE 16

Overall Composition of 3 Ply prototypes* using Tembec Birch APMP for bulky inner layer.

| | Mar. NBSK | VCP Euc | CMF | Birch APMP |
|---|---|---|---|---|
| 1 | 32% | 7% | 10% | 51% |
| 2 | 23% | 5% | 7% | 65% |

Summary of Results

Table 12 illustrates several rather surprising results in that three-ply bath tissues incorporating eucalyptus APMP exceeded Quilted Northern Ultra Plush® caliper without unduly degrading softness. This is considered quite surprising for a bath tissue comprising such large quantities of high yield pulp.

TABLE 17

Physical Properties of 3 Ply prototypes* using Tembec Birch APMP for bulky inner layer (pt. 1).

| Description | Softness Panel | Lint Black Felt Unitless | Basis Weight lb/3000 ft$^2$ | Caliper 8 Sheet mils/8 sht | Tensile MD g/3 in. | Tensile CD g/3 in. | Tensile GM g/3 in. | Stretch MD % | Stretch CD % | Wet Tens Finch CD g/3 in. |
|---|---|---|---|---|---|---|---|---|---|---|
| 1 | 19.7 | 0.4 | 27.0 | 131 | 1,141 | 696 | 888 | 17.0 | 5.1 | 193 |
| 2 | 20.0 | -0.1 | 37.7 | 174 | 1,143 | 713 | 899 | 18.7 | 4.7 | 192 |

Physical Properties of 3 Ply prototypes using Tembec Birch APMP for bulky inner layer (pt. 2).

| Description | Break Modulus GM gms/% | Brtness MacBeth UV-C % | Opacity MacBeth Opacity Units | Roll Diameter in | Roll Compress Value % | TMI Ply Bond g | Break Modulus MD gms/% | Break Modulus CD gms/% | TEA MD mm-gm/mm$^2$ | TEA CD mm-gm/mm$^2$ |
|---|---|---|---|---|---|---|---|---|---|---|
| 1 | 95.0 | 85.9 | 78.5 | 4.6 | 22.3 | 0.5 | 64.3 | 141.0 | 1.0 | 0.2 |
| 2 | 97.3 | 84.9 | 84.2 | 5.2 | 22.8 | 0.6 | 62.0 | 154.4 | 1.1 | 0.2 |

Even with products with excellent resistance to pilling, linting and shredding, it was possible to achieve softness panel ratings greater than 19, while reducing wet lint up to 96% versus Charmin® Ultra Strong. It can also be observed that in those products comprising rather small amounts of CMF, even further reductions in wet lint values were obtained. This was especially true of sheets containing CMF at 6 to 7% of furnish, wherein the CMF was concentrated in the surface strata of the outer plies by stratification without CMF in the inner ply. This is considered especially significant as, currently, CMF is substantially more expensive than most papermaking fibers, so it is particularly important both to reduce the amount needed and to obtain the easily perceptible benefit of the CMF. Products without CMF, however, particularly, those made with glue lamination, exhibited reduced wet lint relative to products where the plies were joined by knurling, thus making it possible to achieve excellent results without the use of CMF.

It is clear that applicants have succeeded in manufacturing a bath tissue that is usable prewetted, yet fully achieves a softness that is not merely comparable to premium and super premium bath tissue, but is at full parity and is arguably even softer, although, the improvement is most likely not significant enough to be noticed reliably by most users. This is a dramatic reversal of previous wet strength bath tissues in which it was hoped that the deficit in softness was not large enough to be reliably noticeable by most users. The softness panel rating of 20.1 achieved with furnish comprising 7% pilot CMF, 65% southern softwood kraft, and 28% eucalyptus kraft is considered to be landmark improvement in wet strength bath tissue.

High basis-weight CWP prototypes comprising less than 30% southern pine with large amounts of eucalyptus APMP were fully dispersible, passing the test described above in under 1500 shakes. Surprisingly, high basis-weight CWP product with an excess of 30% southern pine did not pass the dispersibility test after 2000 shakes as, despite appearing disintegrated, the slurry did not drain with the requisite speed. It appears that dispersibility may be helped by the inclusion of short, eucalyptus APMP fibers relative to longer southern pine kraft fibers.

Between comparable prototypes, products having plies joined by knurling had a slight edge in softness over glue laminated prototypes.

As expected, however, CWP products were at a disadvantage to those products produced by creping a nascent web at 30 to 60% consistency off of a transfer cylinder.

Two-ply bath tissue made with a furnish including tembec birch APMP achieved a softness rating of 20 at 176 mil/8 sheet caliper, exhibiting considerable dusting along with knurled ply bonding, which was poor, suggesting that mechanical hardwood APMP other than eucalyptus may achieve a similar bulk result as eucalyptus if used in the interior ply of a three-ply product, but is likely rather weak for use in the exterior plies.

These results, however, also demonstrate that the current best practice for making soft tissue does not optimize the properties of tissues to be used wet. In particular, the current best practice for dry tissue uses about ⅓ northern softwood kraft and ⅔ eucalyptus kraft with the softwood providing network integrity, while the eucalyptus provides smoothness and opacity. When a stratified headbox is available, in a refinement of this approach, the eucalyptus is stratified in the Yankee side of the sheet and spray softeners are applied up to about the limit at which they begin to interfere with creping. The stronger air layer with softwood provides strength, while the eucalyptus layer becomes very smooth and velvety, but, as mentioned, not only can spray softeners act as release agents interfering with effective creping of the sheet, and thus, interfering with realization of the full softness potential of the sheet, but surfaces comprised of 100% eucalyptus kraft often have increased tendency to shed lint. Thus, it can be appreciated that a premium softness wet or dry bath tissue product does not necessarily result from merely adding temporary wet strength agents to traditional premium bath tissue products intended for dry use.

A different strategy is needed for wet-durable tissue to reduce the linting tendency for both dry and wet use. CMF and northern softwood are incorporated in the Yankee layer, while a temporary wet strength agent is concentrated in the Yankee layer, to provide durability. Thus, the Yankee layer provides wet tensile and surface strength to reduce pilling. The air layer contains integrated furnish that is debonded, as much as tolerable, with little or no temporary wet strength, as shown in the representative tissue structure of FIG. 4. In this approach to providing a premium softness wet or dry bath tissue, the outer plies are stratified with softness and integrity, providing premium fibers in the Yankee layer and lower cost furnish in the air layer, to provide bulk and overall strength. The middle ply is homogeneously formed APMP and softwood kraft. Alternatively, the middle ply can be made with integrated furnish, such as southern kraft. The middle ply is creped with a relatively closed pocket to create bulk through coarser crepe and uncalendered to preserve the bulk adding by the coarse creping. In this approach, stratification to provide a strong coherent Yankee layer of low weight with a debonded air layer combine to produce a finely creped, but coherent facial tissue on the surface.

Table 12 summarizes CWP prototype properties made using the general strategy shown in FIG. 4, with the exception of prototypes 3 to 7.

Product 18 is an example of using integrated furnish to lower cost through cheaper and bulkier fiber, while maintaining softness. The 176 count roll has a 4.83 inch diameter and a 23% roll compression. Alternatively, basis weight can be taken out of the 160 caliper product to keep 200 sheets, as in, for example, the 31 lb/ream Product 19.

Product 24 is a CMF containing prototype, offsetting the high cost CMF in the Yankee stratum, by low cost integrated furnish away from the surface, to produce a tissue achieving an extremely high softness rating of 20 when tested by a trained softness panel. Product 24 is made with an outer ply comprising a 6.7 lb/ream Yankee layer with 20% pilot CMF and 80% eucalyptus kraft, with the remaining 6 lb/ream air layer being made with 50% southern softwood kraft and 50% southern hardwood kraft. The middle ply is an uncalendered sheet with 50% southern softwood and 50% southern hardwood kraft, the finished product content nets out to only 7% CMF, 28% eucalyptus kraft, and 65% southern kraft for a product that is potentially economically feasible in view of the benefits resulting from the use of the CMF.

Figure 5:
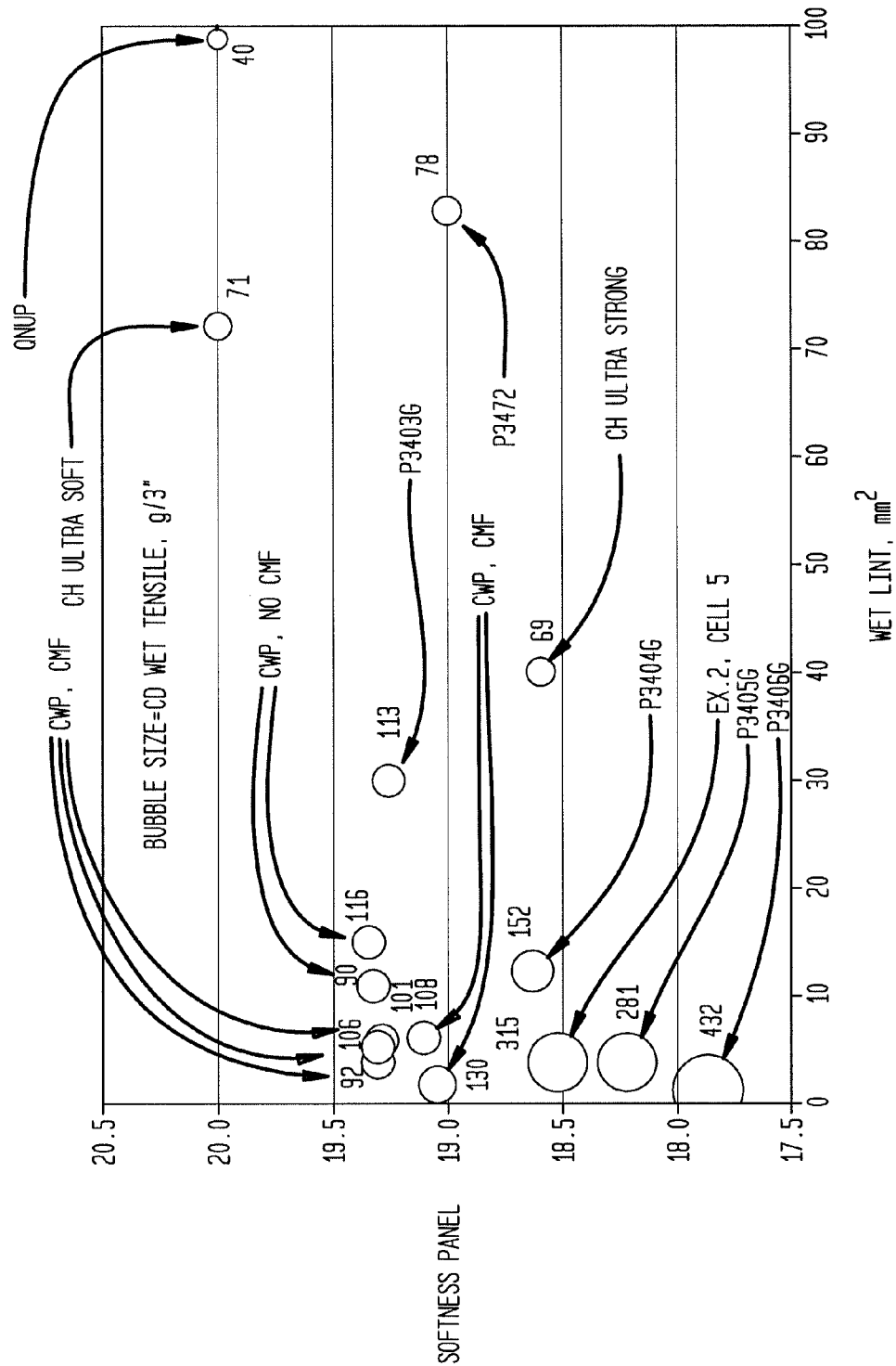

FIGS. 5 and 5A show plots of softness versus wet lint with the bubble size representing CD wet tensile. Softness greater than 19 was achieved for most CWP prototypes, whether glue laminated or knurled. Wet lint was very low and wet tensile was generally less than the P3403G product, but greater than Charmin® Ultra Strong (69 g/3 in. CDWT). Many prototypes exhibited a highly desirable combination of softness, low lint, and durability. It can also be appreciated that prototypes with CMF have less wet lint than comparable prototypes with only wood pulp. Prototypes with just wood pulp, however, have substantially reduced lint relative to other retail products, so they may provide the most economical way of delivering low lint.

Another comparison to highlight is the lower wet lint achieved with glue lamination relative to knurling, particularly, in products without CMF. One of the knurled products had higher lint attributable to the surface ply failing, while other knurled products were both soft and durable. The difference between these two products was a higher basis weight and strength in the product that did not fail. While all glued products had low lint, most knurled prototypes performed nearly as well.

Figure 6:
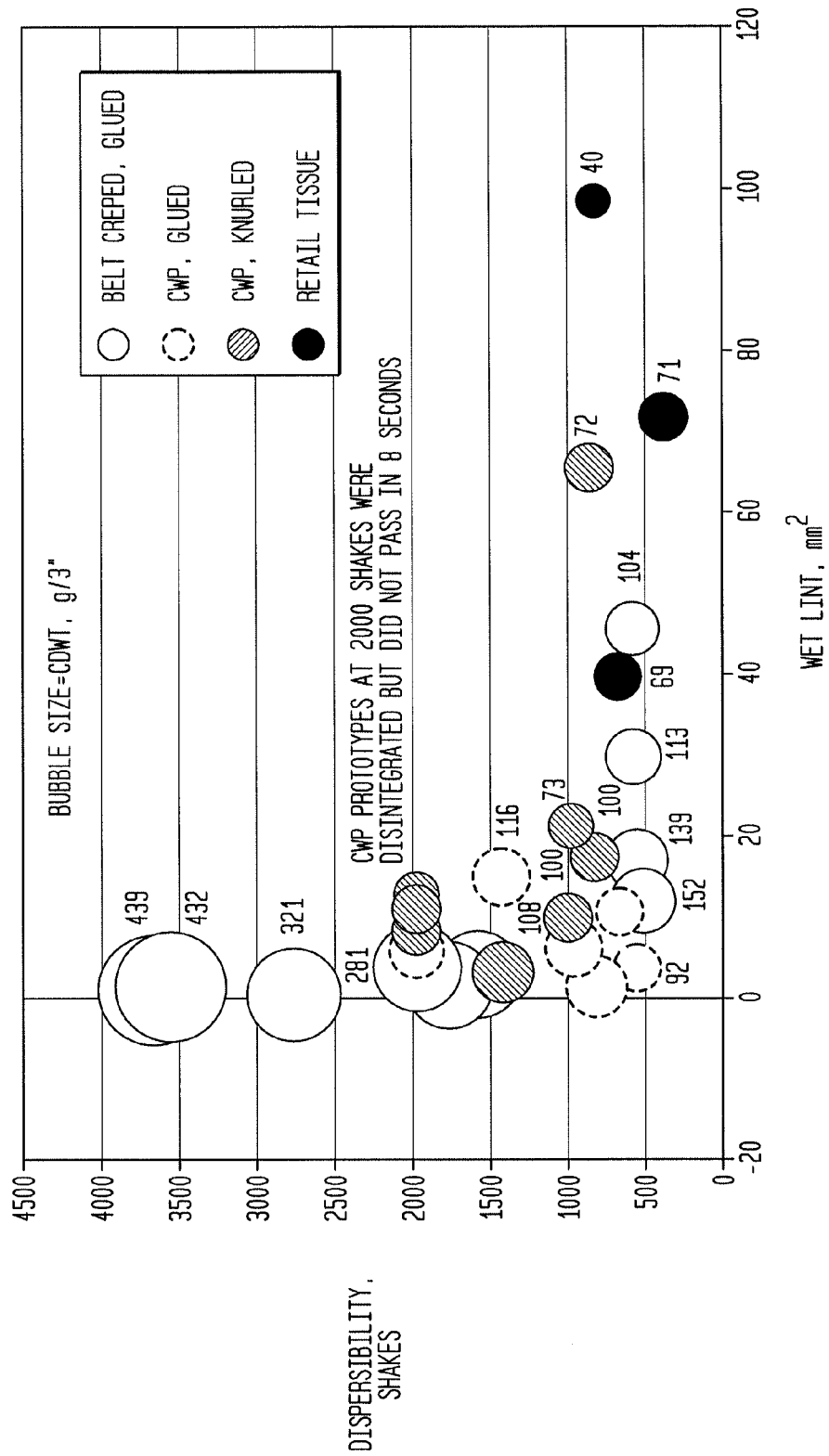
FIG. 6 is a bubble graph illustrating the inter-relationship among dispersibility, CD wet strength and resistance to wet linting of several prototype products.

FIG. 6 compares the dispersibility of previous FRBC prototypes with current CWP. Many CWP products have both dispersibility and low lint, while others fail dispersibility, despite being less durable than FRFC prototypes. This difference between FRBC and CWP can be explained mostly by basis weight, but the data also suggest a fiber composition contribution. CWP prototypes with a value of 2000 shakes were terminated without passing. The samples were observed to be largely disintegrated, but too floccy to pass the small bottle opening in 8 seconds per the procedure. Higher softwood contents will increase the flocciness of the disintegrated tissue, and this effect was often seen when the product was made with a middle ply with 50% southern pine. On the other hand, sheets with more eucalyptus APMP exhibited satisfactory dispersability. Minimizing softwood content, particularly southern pine, can benefit dispersibility, particularly in high basis weight tissue with more durability. Desirably, softwood content will be kept to less than about 40%, more preferably, to less than about 35%, still more preferably, between about 20% and about 35%, and most preferably, to between about 25% and about 35%.

Figure 7:
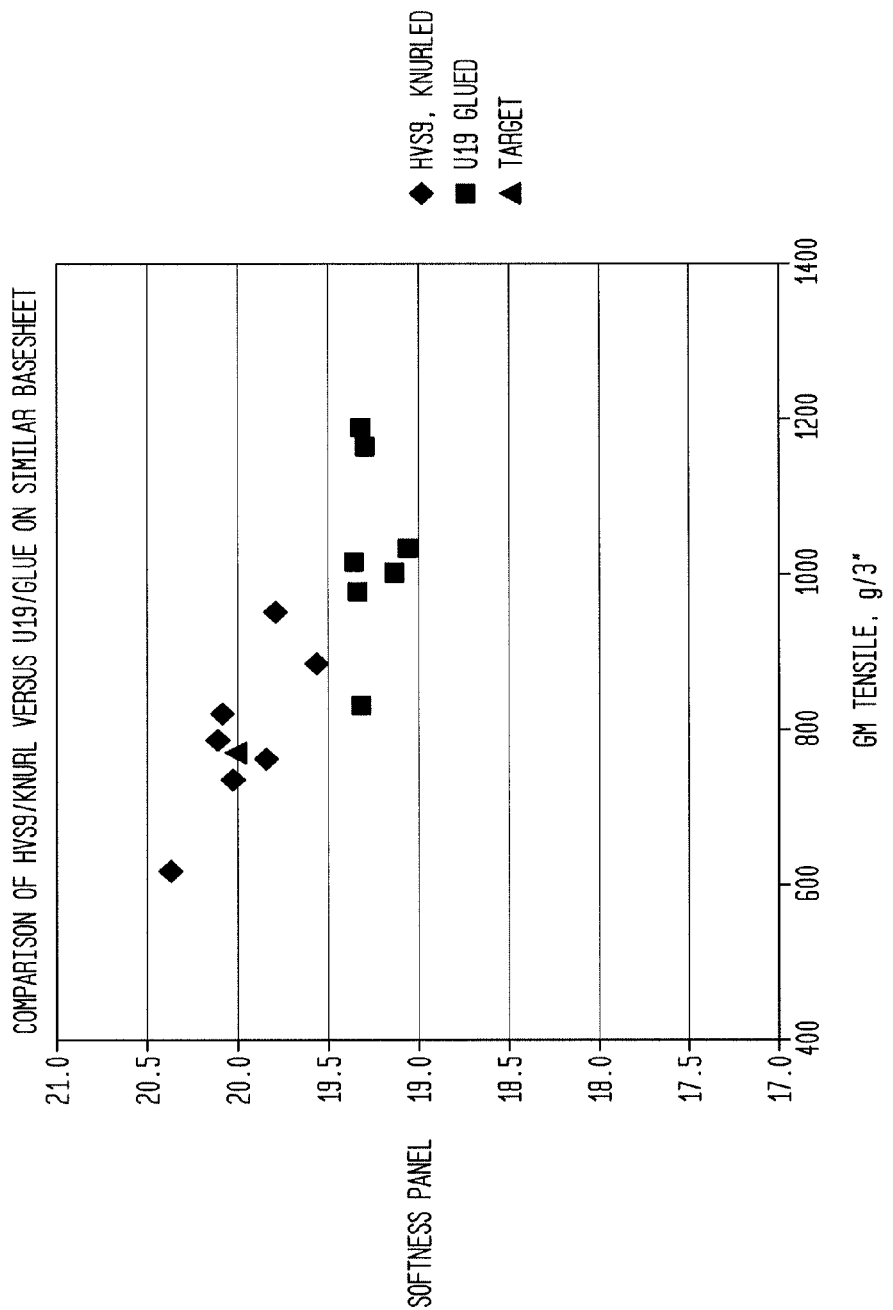
FIG. 7 illustrates the dry tensile strength and softness of several prototype tissue products.

FIG. 7 shows that embossing with pattern HVS 9 (FIGS. 30, 30-1, 30-2, 30-A to 30-H and 30-J), then ply bonding by knurling, resulted in softer product on similar sheets than embossing with pattern U 19 (FIGS. 29, 29A-29F, 29H and 29T) glue. The HVS 9 microemboss reduced basesheet tensile on the order of 25%, while there was almost no tensile breakdown with the emboss penetration used in U 19.

Figure 8:
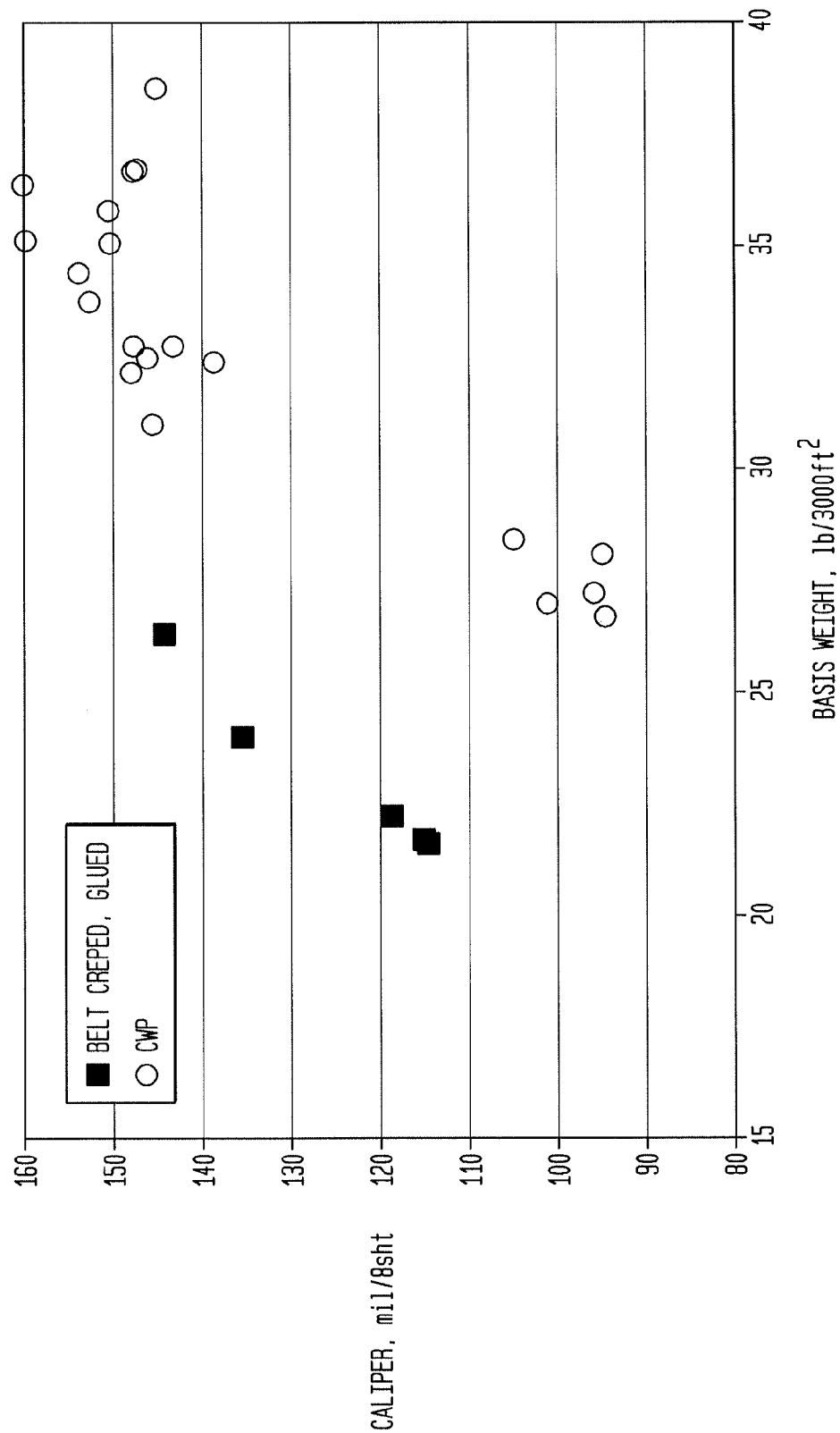
FIG. 8 illustrates the caliper and basis weight of CWP prototype tissue products in comparison with those of fiber reorienting fabric creped ("FRFC"), i.e., belt creped, prototypes.
Figure 9:
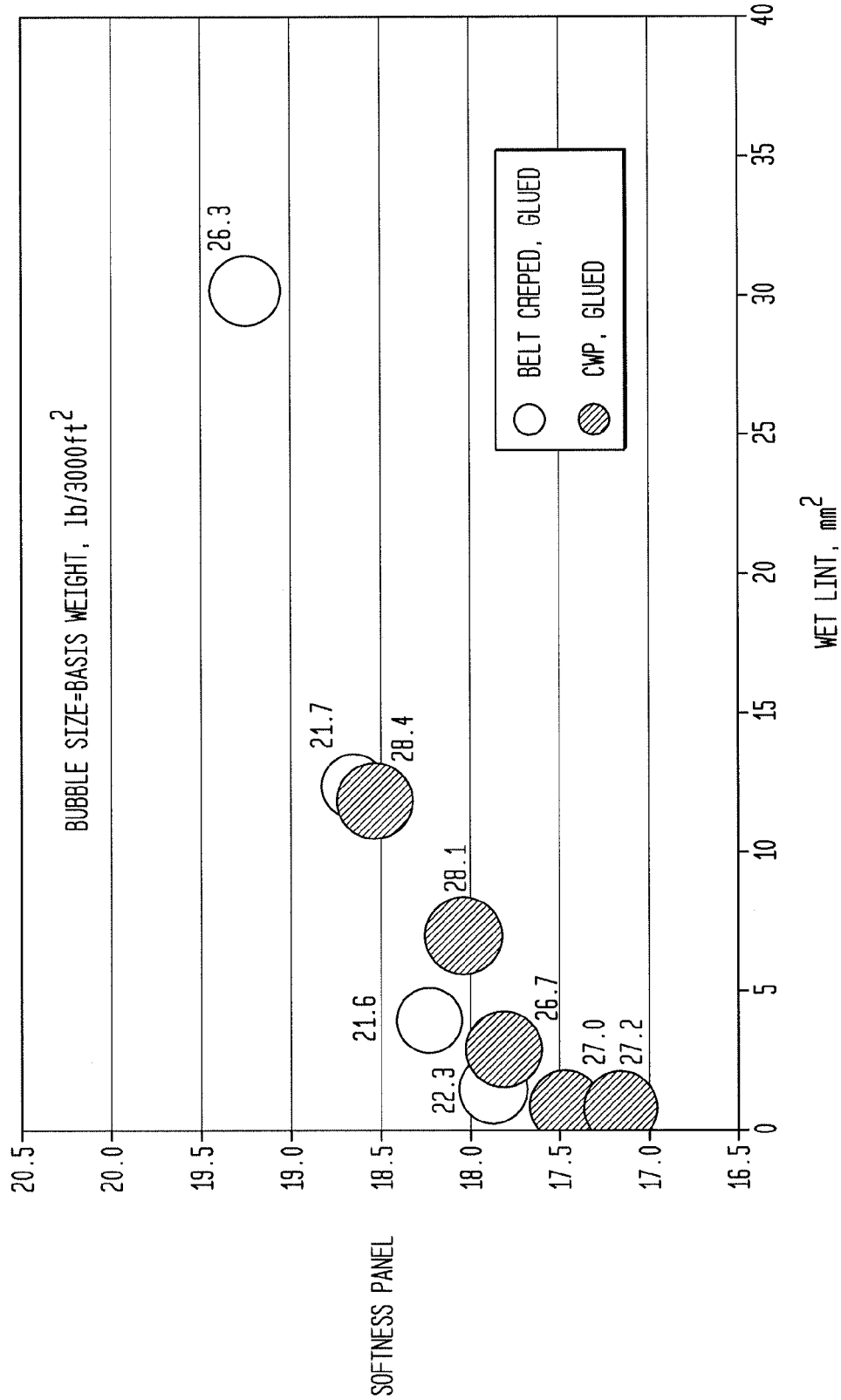
FIG. 9 illustrates the softness and wet lint resistance of CWP prototype tissue products in comparison with those of FRFC prototypes, with basis weight being indicated by bubble size.

FIGS. 8 and 9 compare the attribute of bath tissue made using FRBC technology to tissue made using CWP. In particular, while both FRFC and FRBC clearly have striking advantages in terms of bulk generation (FIG. 8), the difference in softness is considerably less substantial (FIG. 9).

Referring back to Table 12, Products 1 and 2 are early prototypes that used birch APMP for the bulky inner layer. It appears that other APMP hardwood pulps can be substituted for eucalyptus APMP in the interior plies of three-ply products to provide the bulk benefit of the eucalyptus APMP. The sheets, however, are weak and subject to considerable dusting, suggesting that they are not all that desirable for exterior plies.

In contrast, the preceding Examples demonstrate that low cost eucalyptus APMP furnish can be incorporated into premium three-ply bath tissue without sacrificing softness or the attributes of quality while adding bulk. Three-ply CWP can be an acceptable format for a premium quality wet or dry bath tissue. As shown below, Table 18 sets forth an overview of the product data for the CWP products, along with their basesheet data. Cells 1 to 3 provide high durable, medium durable, and less durable CWP products, respectively, with no CMF added. Cells 4 and 5 provide less durable and high durable CWP products, respectively, with 20% CMF added. Finally, Cells 6 to 8 provide high bulk CWP products with 33%, 50%, and 60% APMP incorporated therein.

TABLE 18

Product data for low-weight CWP durable product. Basesheet data.

| Cell | Roll ID | | 8 Sheet Caliper Mils/8 sht | Basis Weight Lb/300 ft² | MD Tensile g/3 in. | MD Stretch % | CD Tensile g/3 in. | CD Stretch % | GM Tensile g/3 in. | CD Wet Tensile Cured g/3 in. | GM Break Modulus gms/% |
|---|---|---|---|---|---|---|---|---|---|---|---|
| 1 | 1130-4 | High durable | 27.0 | 9.2 | 1259 | 31.3 | 870 | 4.7 | 1045 | 171 | 87 |
|  | 1130-5 | No CMF | 27.3 | 9.2 | 1112 | 31.9 | 712 | 4.4 | 888 | 149 | 75 |
|  | 1130-6 |  | 27.8 | 8.8 | 1330 | 33.2 | 859 | 4.4 | 1067 | 127 | 87 |
| 2 | 1130-7 | Med durable | 29.5 | 9.6 | 1092 | 33.0 | 562 | 4.0 | 782 | 90 | 67 |
|  | 1130-8 | No CMF | 29.1 | 9.7 | 990 | 32.4 | 665 | 4.6 | 811 | 92 | 71 |
|  | 1130-9 |  | 27.0 | 8.9 | 1091 | 34.8 | 575 | 4.7 | 791 | 99 | 61 |
| 3 | 1130-16 | Less durable | 31.7 | 9.1 | 461 | 31.1 | 380 | 5.2 | 418 | 49 | 32 |
|  | 1130-17 | No CMF | 32.7 | 9.9 | 632 | 34.3 | 494 | 5.2 | 559 | 64 | 43 |
|  | 1130-18 |  | 30.8 | 9.2 | 572 | 31.6 | 392 | 4.9 | 471 | 64 | 38 |
| 4 | 1130-20 | Less durable | 30.1 | 9.2 | 972 | 33.3 | 509 | 6.1 | 703 | 70 | 47 |
|  | 1130-21 | 20% CMF | 30.8 | 9.5 | 1029 | 33.5 | 506 | 6.6 | 721 | 71 | 45 |
|  | 1130-22 |  | 29.5 | 9.1 | 852 | 33.1 | 501 | 6.4 | 653 | 58 | 48 |
| 5 | 1130-24 | High durable | 29.6 | 9.6 | 1201 | 34.9 | 705 | 5.6 | 920 | 118 | 72 |
|  | 1130-25 | 20% CMF | 28.5 | 9.3 | 1198 | 32.3 | 625 | 6.4 | 865 | 115 | 58 |
|  | 1130-26 |  | 26.1 | 8.4 | 889 | 30.3 | 550 | 6.1 | 699 | 126 | 51 |
| 6 | 4905-57 | High bulk | 52.1 | 13.1 | 379 | 27.6 | 301 | 5.1 | 337 | 36 | 29 |
|  | 4905-58 | 33% APMP | 48.5 | 12.6 | 409 | 25.9 | 298 | 4.8 | 348 | 31 | 32 |
|  | 4905-59 |  | 49.2 | 12.9 | 391 | 27.7 | 306 | 5.7 | 345 | 31 | 27 |
| 7 | 4905-60 | High bulk | 61.4 | 16.1 | 460 | 28.5 | 381 | 5.3 | 417 | 36 | 35 |
|  | 4905-61 | 50% APMP | 61.5 | 15.9 | 492 | 28.0 | 339 | 5.1 | 408 | 39 | 33 |
| 8 | 4905-62 | High bulk | 81.7 | 20.3 | 508 | 26.6 | 434 | 5.0 | 469 | 38 | 41 |
|  | 4905-63 | 60% APMP | 80.1 | 20.6 | 633 | 28.0 | 459 | 5.3 | 539 | 40 | 45 |

Example 2

Four different fiber variants of eucalyptus pre-conditioning refiner chemical alkaline peroxide mechanical pulp (P-RC APMP) ("APMP") having a brightness of 85 to 88 ISO, bulk between 2.0 and 3.9 cm³/g and breaking length between 1.4 and 4.0 km. as set forth in Table 19.

TABLE 19

Summary of trial pulp blends

| | P3 High Strength | P4 High Strength | P5 High Bulk | P6 High Bulk |
|---|---|---|---|---|
| Optical | | | | |
| Brightness, UV-C | 87.7 | 88.6 | 85.1 | 85.0 |
| L* | 97.6 | 97.8 | 97.0 | 96.8 |
| a* | −2.1 | −1.9 | −2.0 | −1.8 |
| b* | 4.9 | 4.5 | 5.7 | 5.5 |
| Whiteness | 71.8 | 73.9 | 66.3 | 66.8 |
| Opacity | 82.8 | 82.0 | 83.1 | 85.2 |
| Morphology | | | | |
| Ln, mm | 0.38 | 0.37 | 0.37 | 0.36 |
| Lw, mm | 0.71 | 0.67 | 0.71 | 0.69 |
| Lz, mm | 0.92 | 0.83 | 0.96 | 0.95 |
| Coarseness, mg/100 m | 10.7 | 9.5 | 12.4 | 10.6 |
| Fines(w), % | 11.6 | 11.2 | 11.6 | 12.1 |
| Curl Index(w) | 0.03 | 0.03 | 0.03 | 0.03 |
| Shives, % | 1.6 | 0.4 | 6.1 | 1.9 |
| Handsheets | | | | |
| Tensile, km | 2.9 | 3.9 | 0.9 | 1.4 |
| Bulk, cc/a | 2.5 | 2.0 | 3.9 | 3.4 |
| Other | | | | |
| Kappa | 148 | 155 | 135 | 148 |
| Fiber Charge, meq/100 g | −9.7 | −14.0 | −11.9 | −10.1 |
| Total Charge, meq/100 g | −26.1 | −25.7 | −19.6 | −19.5 |
| Freeness, ml | 534 | 422 | 594 | 492 |

Preliminarily, a variety of handsheets using the fiber variants along with more conventional papermaking fibers were produced as set forth in Table 20 as follows:

TABLE 20

Conditions for TAPPI handsheets with trial pulps (P3-P6)

| Cell | DIP | SSWK | SHWK | P3 | P4 | P5 | P6 | Amres ®, lb/t | CMC, lb/t |
|---|---|---|---|---|---|---|---|---|---|
| 1 | 100 | | | | | | | | |
| 2 | 100 | | | | | | | 12 | |
| 3 | 100 | | | | | | | 30 | 8 |
| 4 | 80 | | | 20 | | | | | |
| 5 | 60 | | | 40 | | | | | |
| 6 | | | | 100 | | | | | |
| 7 | 80 | | | | 20 | | | | |
| 8 | 60 | | | | 40 | | | | |
| 9 | | | | | 100 | | | | |
| 10 | | | | | | 20 | | | |
| 11 | | | | | | 40 | | | |
| 12 | | | | | | 100 | | | |
| 13 | 80 | | | | | | 20 | 0 | |
| 14 | 80 | | | | | | 20 | 12 | |
| 15 | 80 | | | | | | 20 | 30 | |
| 16 | 80 | | | | | | 20 | 30 | |
| 17 | 60 | | | | | | 40 | 0 | |
| 18 | 60 | | | | | | 40 | 12 | |
| 19 | 60 | | | | | | 40 | 30 | |
| 20 | | | | | | | 100 | | |
| 21 | | 60 | 40 | | | | | | |
| 22 | | 60 | 40 | | | | | 12 | |
| 23 | | 60 | 40 | | | | | 30 | 8 |
| 24 | | 48 | 32 | 20 | | | | | |
| 25 | | 36 | 24 | 40 | | | | | |
| 26 | | 48 | 32 | 20 | | | | 0 | |
| 27 | | 48 | 32 | 20 | | | | 12 | |
| 28 | | 48 | 32 | 20 | | | | 30 | |
| 29 | | 48 | 32 | 20 | | | | 30 | |
| 30 | | 36 | 24 | 40 | | | | 0 | |
| 31 | | 36 | 24 | 40 | | | | 12 | |
| 32 | | 36 | 24 | 40 | | | | 30 | |
| 33 | | 48 | 32 | | 20 | | | | |
| 34 | | 36 | 24 | | 40 | | | | |
| 35 | | 48 | 32 | | | 20 | | | |
| 36 | | 36 | 24 | | | 40 | | | |

DIP = deinked wet lap from recycle paper;
CMC = carboxymethylcellulose,
AmRes ® = Amres ® HP100 high solids polyamide wet strength resin Based on the results obtained with the handsheets, tissue was produced on a pilot scale, CWP paper machine using the four different variants (P3, P4, P5, P6) along with conventional tissue making fibers. Surprisingly, basesheet for bath tissue produced with eucalyptus APMP achieved parity to commercially produced basesheet for bath tissue using a furnish of 60% deinked recycled pulp ("DIP") and 40% virgin pulp.

A variety of prototypes was produced, as set forth in Table 21 as follows:

TABLE 21

Pilot Paper Machine Trial Cells

| Cell | Product | FRF | SSWK | SHW | Eucaly | P3 | P4 | P5 | P6 | Amres ® | CMC |
|---|---|---|---|---|---|---|---|---|---|---|---|
| 4 | Towel | 60 | 40 | | | | | | | 10 | |
| 5 | Towel | 48 | 32 | | | 20 | | | | 20 | |

TABLE 21-continued

Pilot Paper Machine Trial Cells

| Cell | Product | FRF | SSWK | SHW | Eucaly | P3 | P4 | P5 | P6 | Amres ® | CMC |
|---|---|---|---|---|---|---|---|---|---|---|---|
| 6 | Towel | 36 | 24 | | | | 40 | | | 20 | |
| 6A | Towel | 36 | 24 | | | | 40 | | | 10 | |
| 10 | Towel | | 60 | 40 | | | | | | 10 | |
| 11 | Towel | | 48 | 32 | | 20 | | | | 10 | |
| 12 | Towel | | 36 | 24 | | | 40 | | | 20 | |
| 12A | Towel | | 36 | 24 | | | 40 | | | 30 | |
| 1 | Bath Tissue | 60 | | | 40 | | | | | | |
| 2 | Bath Tissue | 48 | | | 32 | 20 | | | | | |
| 3 | Bath Tissue | 54 | | | 36 | | | 10 | | | |
| 3B | Bath Tissue | 48 | | | 32 | | | 20 | | | |
| 7 | Bath Tissue | | 40 | 60 | | | | | | | |
| 8 | Bath Tissue | | 36 | 54 | | 10 | | | | | |
| 9 | Bath Tissue | | 32 | 48 | | | | | 20 | | |
| 13 | Towel | | 60 | 40 | | | | | | 20 | 4 |
| 14 | Towel | | 48 | 32 | | 20 | | | | 20 | |
| 15 | Towel | | 48 | 32 | | 20 | | | | 30 | |
| 16 | Towel | | 36 | 24 | | | 40 | | | 30 | |

FRF = deinked wet lap from recycled paper

Discussion of Results

One unique characteristic of APMP pulping is the ability to manipulate fiber properties by adjusting the chemical application and refining energy as set forth above. This is different than kraft pulping in which the finished fiber properties are essentially set by the wood source and pulping and bleaching technology. The ability to manipulate the fiber properties is both a challenge and an opportunity. The opportunity in a production setting is to allow significant fine tuning of the fiber properties and balancing the energy and chemical costs.

Figure 10:
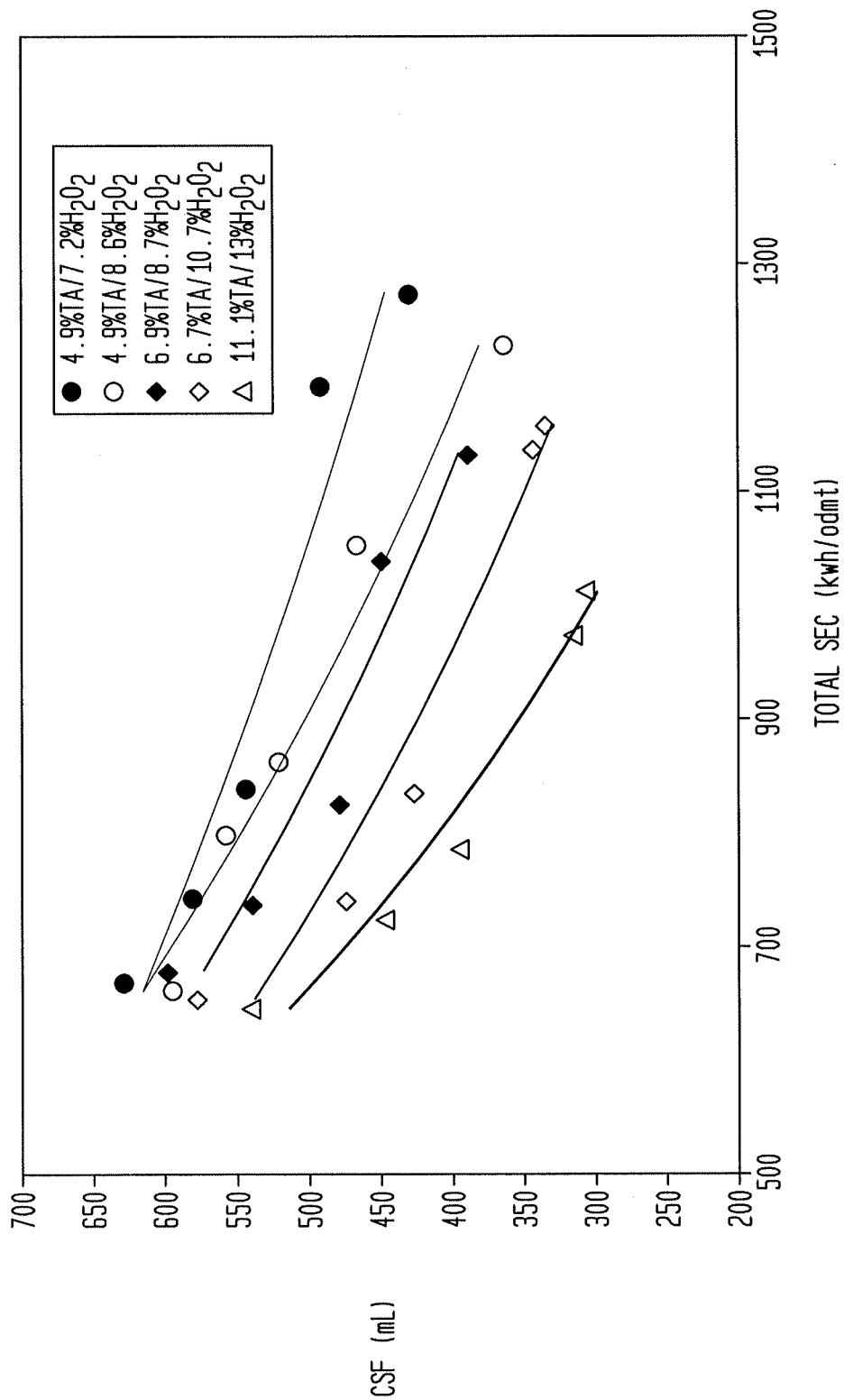
FIG. 10 illustrates the effect of refining on the freeness of several eucalyptus APMP pulps subjected to varying pulping procedures.

In FIG. 10, there is plotted the relationship between energy and freeness for the five alkalinity levels run in the trial. The expected relationship within each alkalinity level is seen where freeness decreases with increasing refining energy. The freeness also decreases with increasing alkalinity level. A range of alkalinity and energy levels can be selected to achieve the target freeness level.

Figure 11:
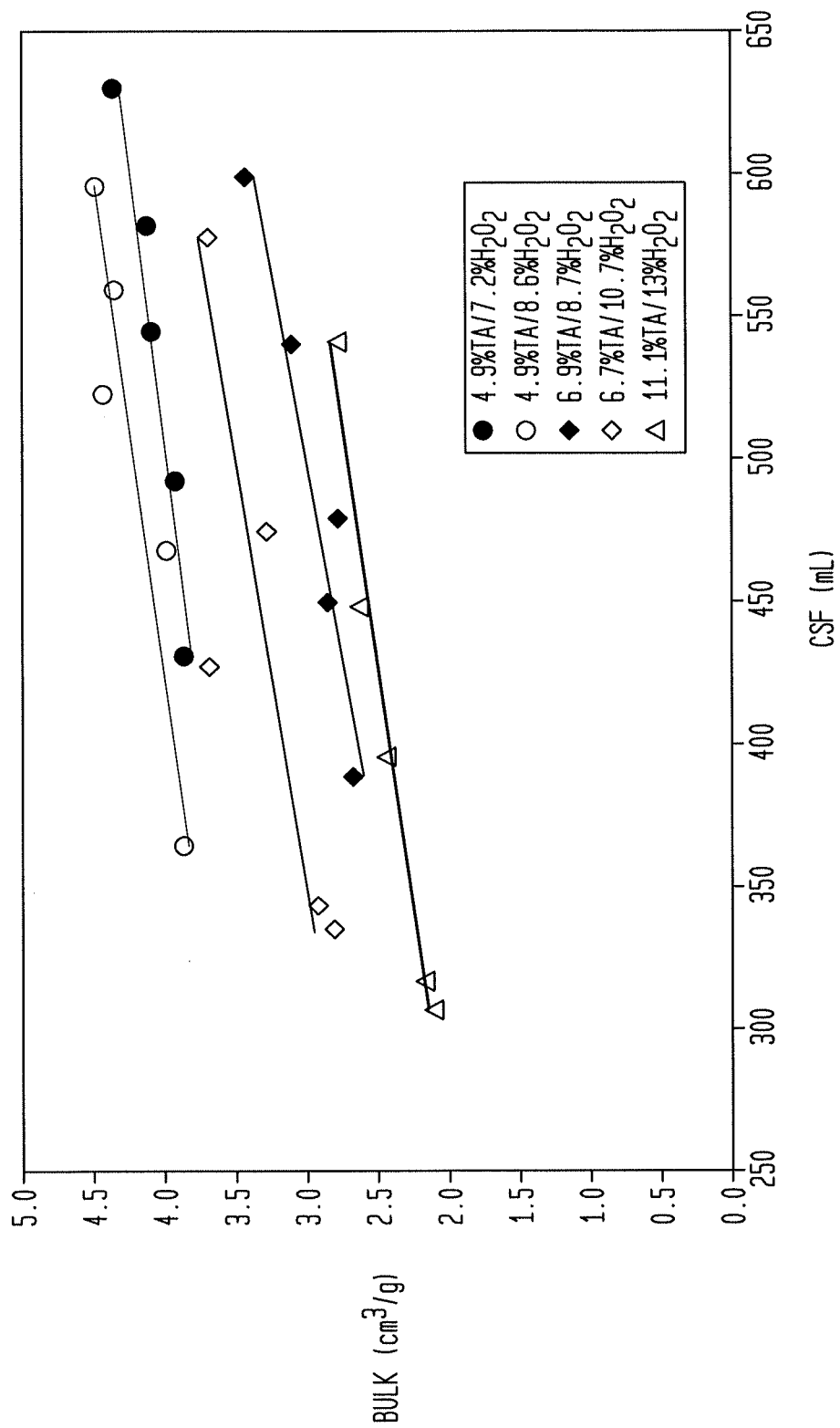
FIG. 11 illustrates the inter-relationship between bulk and freeness of several eucalyptus pulps produced under varying pulping procedures.

In FIG. 11, there is plotted the freeness bulk relationships. There is no single bulk freeness relationship, but rather, the bulk is a function of the alkalinity level. High alkalinity results in lower bulk.

Figure 12:
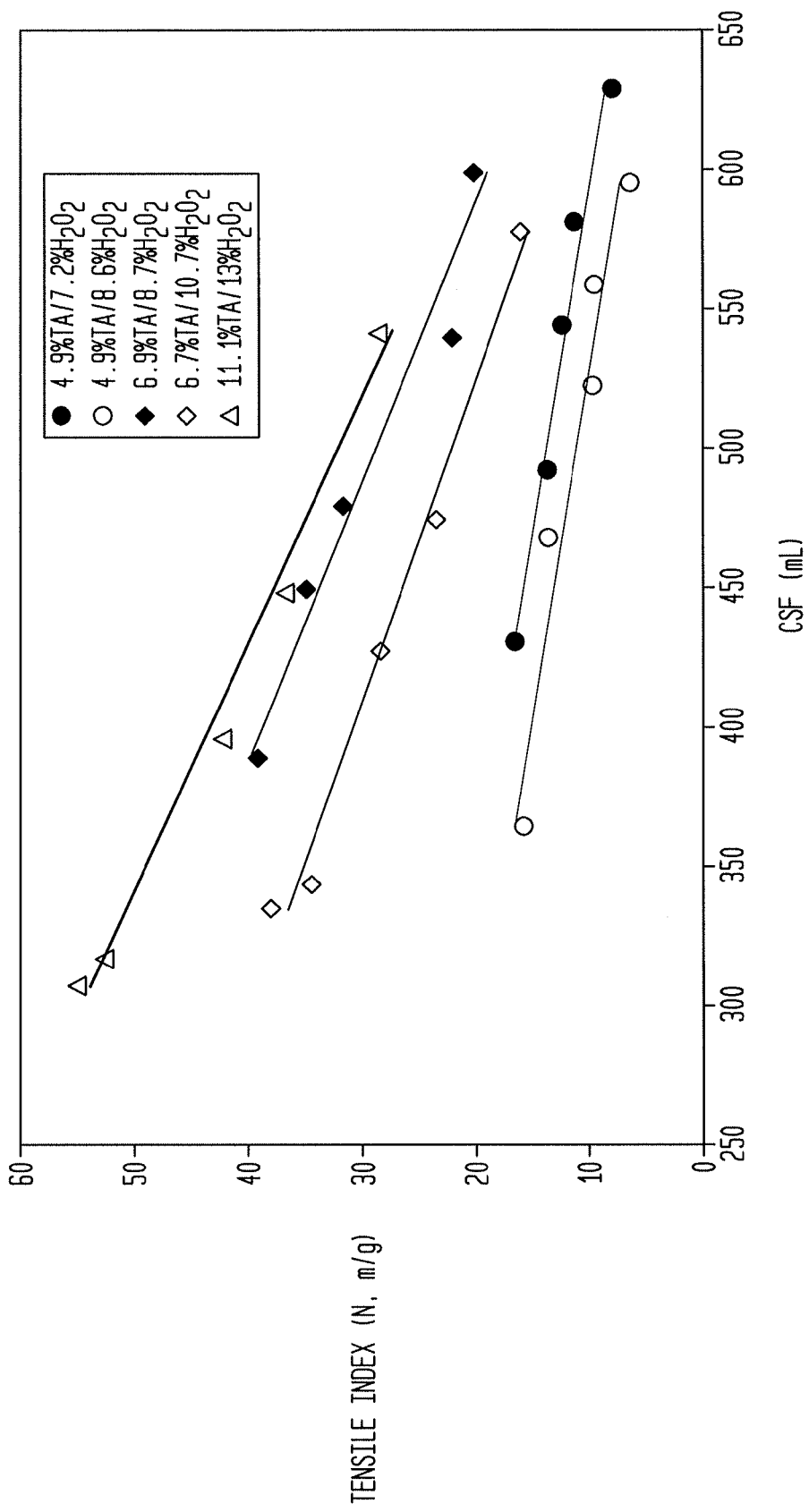
FIG. 12 illustrates the inter-relationship between strength and freeness of several eucalyptus pulps produced under varying pulping procedures.

FIG. 12 shows the relationship between freeness and tensile index. Again, alkalinity has a significant impact on strength at a given freeness level.

Figure 13:
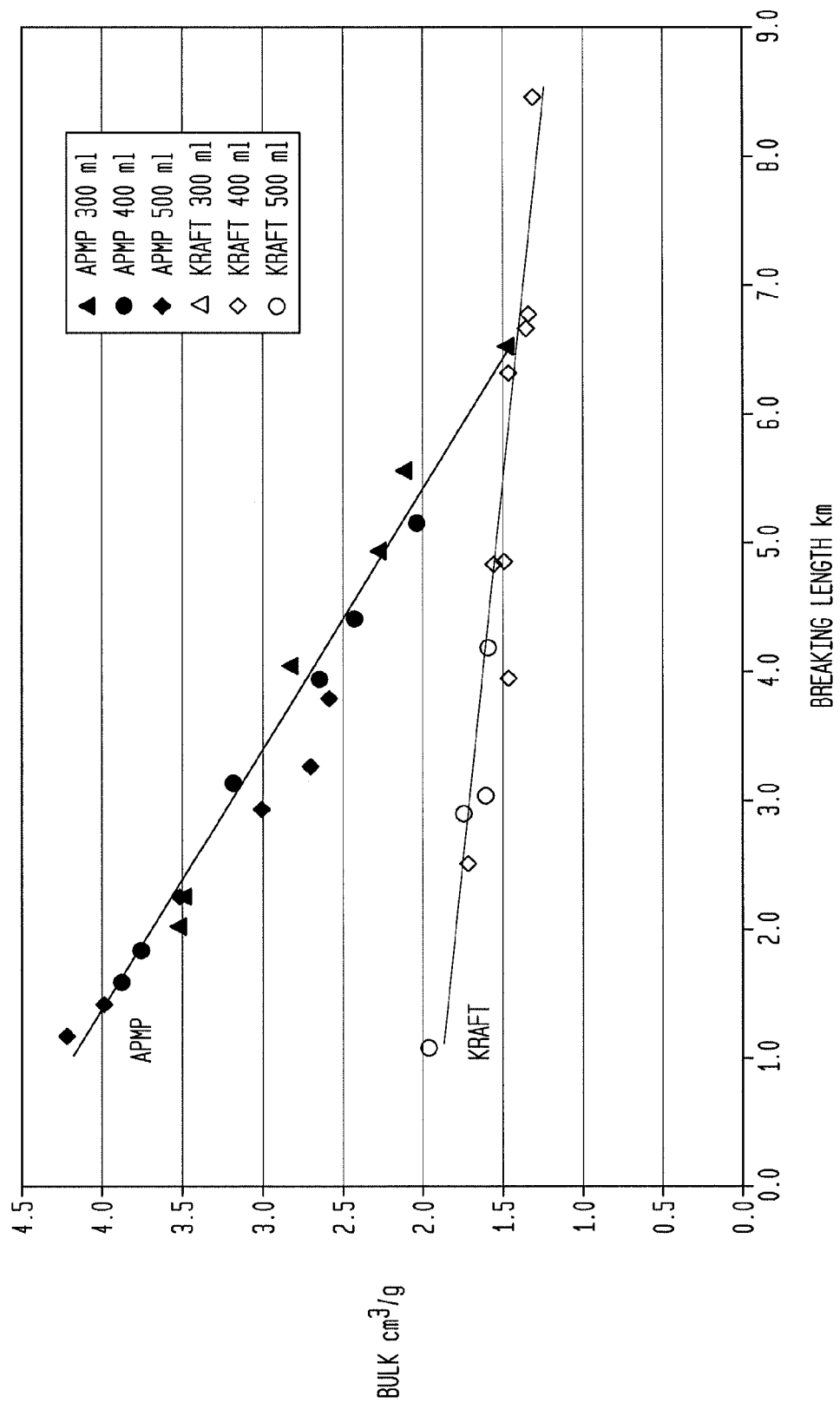
FIG. 13 illustrates the surprisingly high level of bulk that it is possible to generate with eucalyptus APMP at desirably low levels of strength.

Freeness and bulk are a function of both total alkalinity and refining energy. Increasing the alkalinity will result in higher tensile strength, lower bulk and lower freeness at a given energy level. Neither alkalinity nor refining energy, however, impact the fundamental bulk and strength relationship. In FIG. 13 is plotted a bulk tensile curve for APMP and kraft eucalyptus pulps. The alkalinity curves for each pulp were plotted and the bulk and breaking length at 300, 400 and 500 mls freeness were calculated. A similar calculation was completed for five market kraft eucalyptus pulps. APMP has a much steeper slope than kraft, and APMP pulp has significantly higher bulk than kraft pulp at low breaking length. Note the relatively flat slope of the kraft pulps. The curves intersect at about 6.5 km and 1.5 cm$^3$/g, suggesting that there is little difference between the pulps at very high strength level.

Brightness Development

Figure 14A:
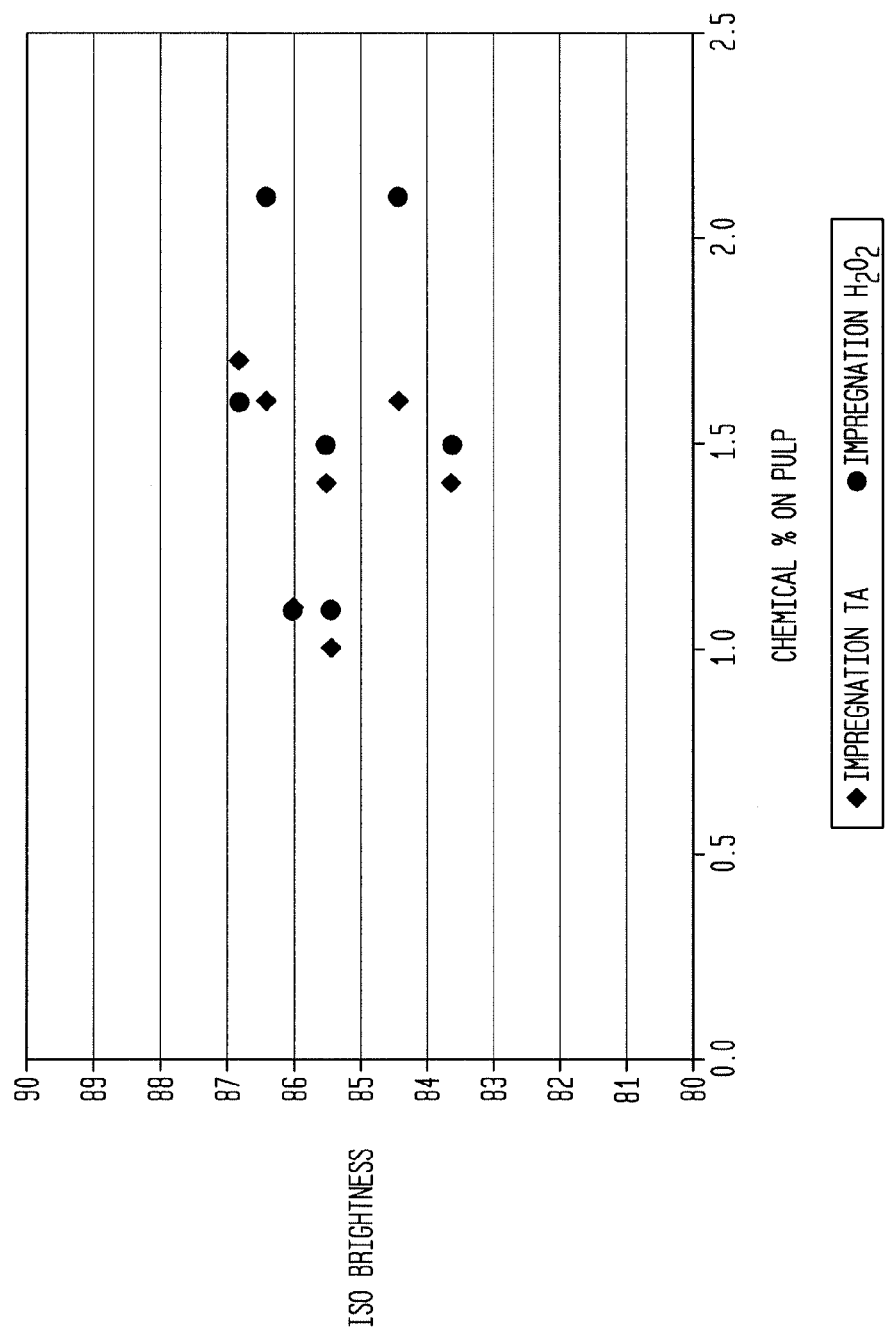
FIG. 14A illustrates the effect of varying levels of total alkalinity and peroxide on the brightness of eucalyptus APMP pulps when applied in the refiner.
Figure 14B:
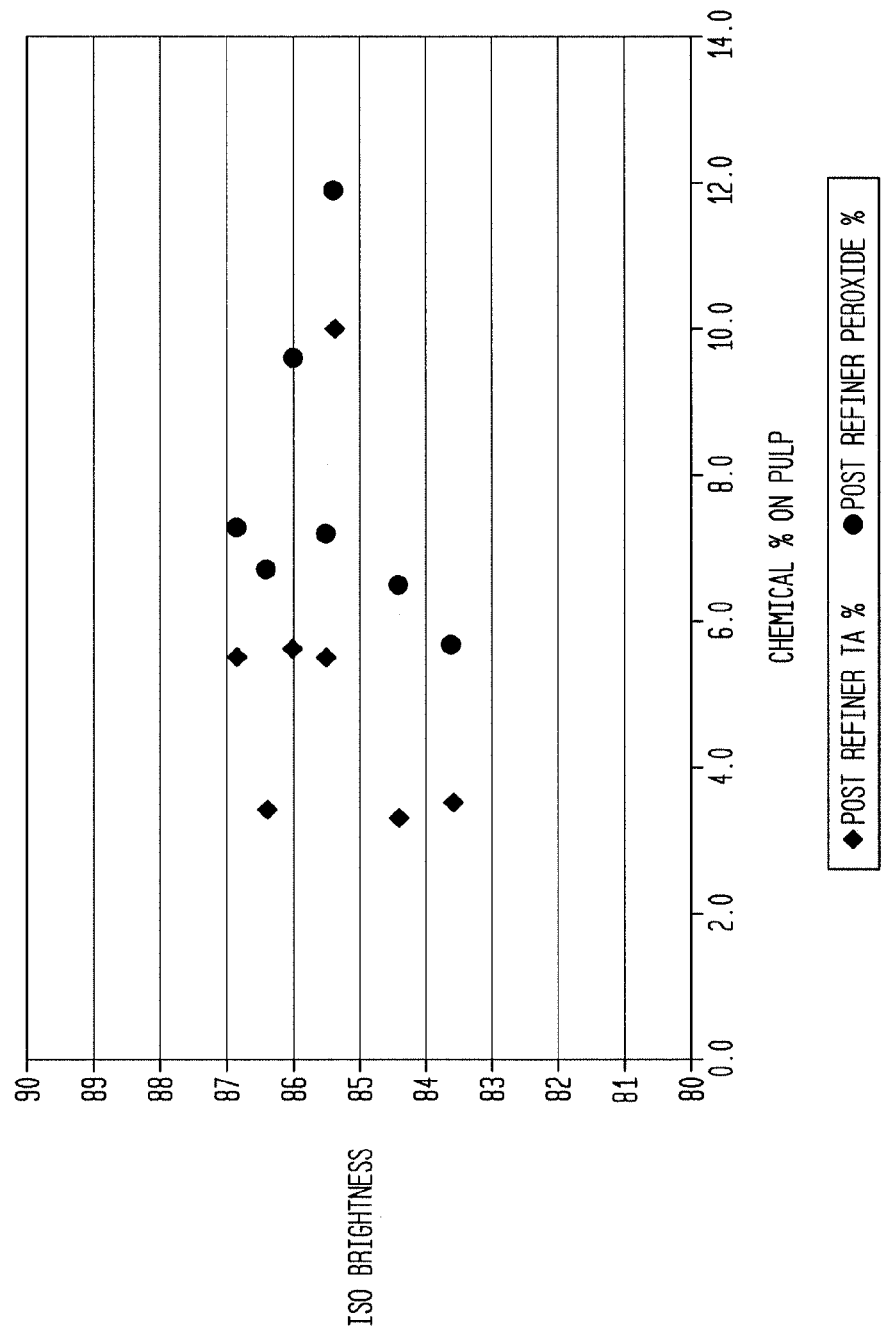
FIG. 14B illustrates the effect of varying levels of total alkalinity and peroxide on the brightness of eucalyptus APMP pulps when applied after the refiner.

Post-refiner brightness ran between 83 and 87 ISO. Good brightness development was seen for all runs. On the high alkalinity run, 12, significant peroxide decomposition was seen. High peroxide consumption is usually due to high metals content of the wood, so chelant addition was increased for subsequent runs which eliminated the issue. In FIG. 14A, the consumption of impregnation chemicals is plotted (peroxide and total alkalinity—TA) compared to the peak brightness for the series. No relationship between impregnation chemicals and brightness is seen for the range of chemical application in the trial. FIG. 14B shows the post refiner chemical addition and peak brightness. This graph shows that peak brightness development occurred around 7% chemical applied on pulp and not much correlation with alkalinity.

Figure 15:
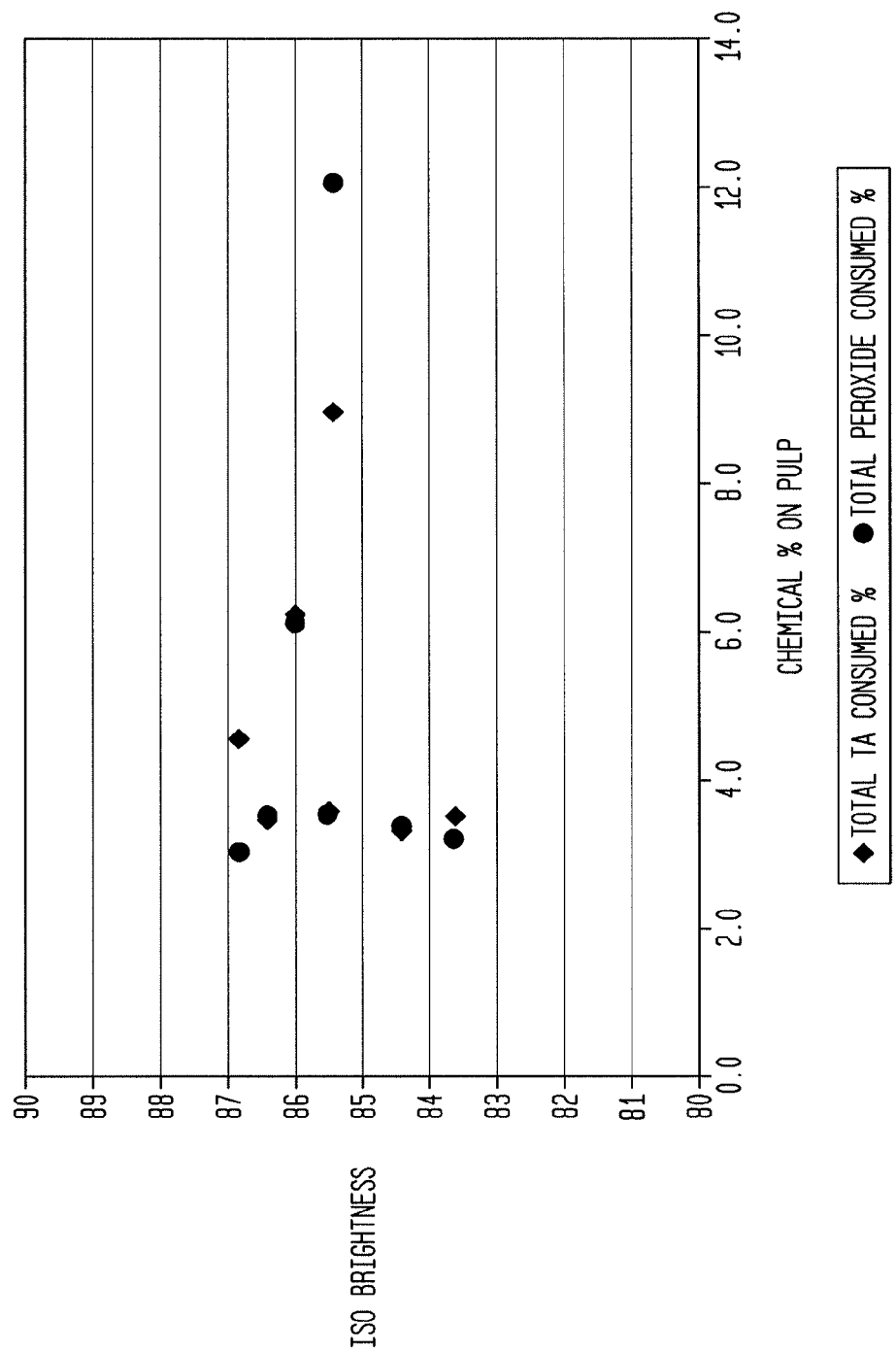
FIG. 15 illustrates the very high levels of brightness obtainable from eucalyptus APMP with relatively low consumption of caustic and peroxide.

FIG. 15 shows the net total chemical consumed in both impregnation and post refining, along with the brightness development. This graph shows there was very little correlation between chemicals consumed and brightness development. Taken with FIGS. 14A and 14B above, an estimated peroxide demand for a commercial installation will be between 3.5 and 4.5% on pulp. Surprisingly, total alkalinity does not have a significant impact on brightness and, therefore, can be adjusted to achieve pulp properties and balance refiner energy—see discussion below.

Based on the apparent refiner brightness ceiling of 87, samples of the P3 pulp were laboratory bleached to establish the absolute brightness ceiling. All bleaches were completed at medium consistency. The conditions for the laboratory bleaches were:

1% on pulp NaOH 1, 2 and 3% $H_2O_2$ on pulp 0.25% on pulp DTPA

85° C.

2 hours retention

12% consistency.

The lab results are shown in Table 22. All lab bleaches resulted in a 91 to 92 MacBeth brightness and showed relatively low peroxide consumption indicating that 92 is the brightness ceiling for this wood supply.

TABLE 22

Laboratory Bleaching Results

| Bleach Number | Temperature C. | Retention Minutes | Consistency % | Chemicals % on pulp | | | Final pH | Peroxide | | Final Brightness |
|---|---|---|---|---|---|---|---|---|---|---|
| | | | | $H_2O_2$ | NaOH | Chelant | | Res W1 | Consumed | |
| 1 | 85 | 120 | 12 | 1 | 1 | 0.25 | 10.4 | 0.18 | 85% | 91.1 |
| 2 | 85 | 120 | 12 | 2 | 1 | 0.25 | 10.3 | 0.82 | 67% | 92.0 |
| 3 | 85 | 120 | 12 | 3 | 1 | 0.25 | 10 | 2.42 | 35% | 92.1 |

Handsheets

Figure 16:
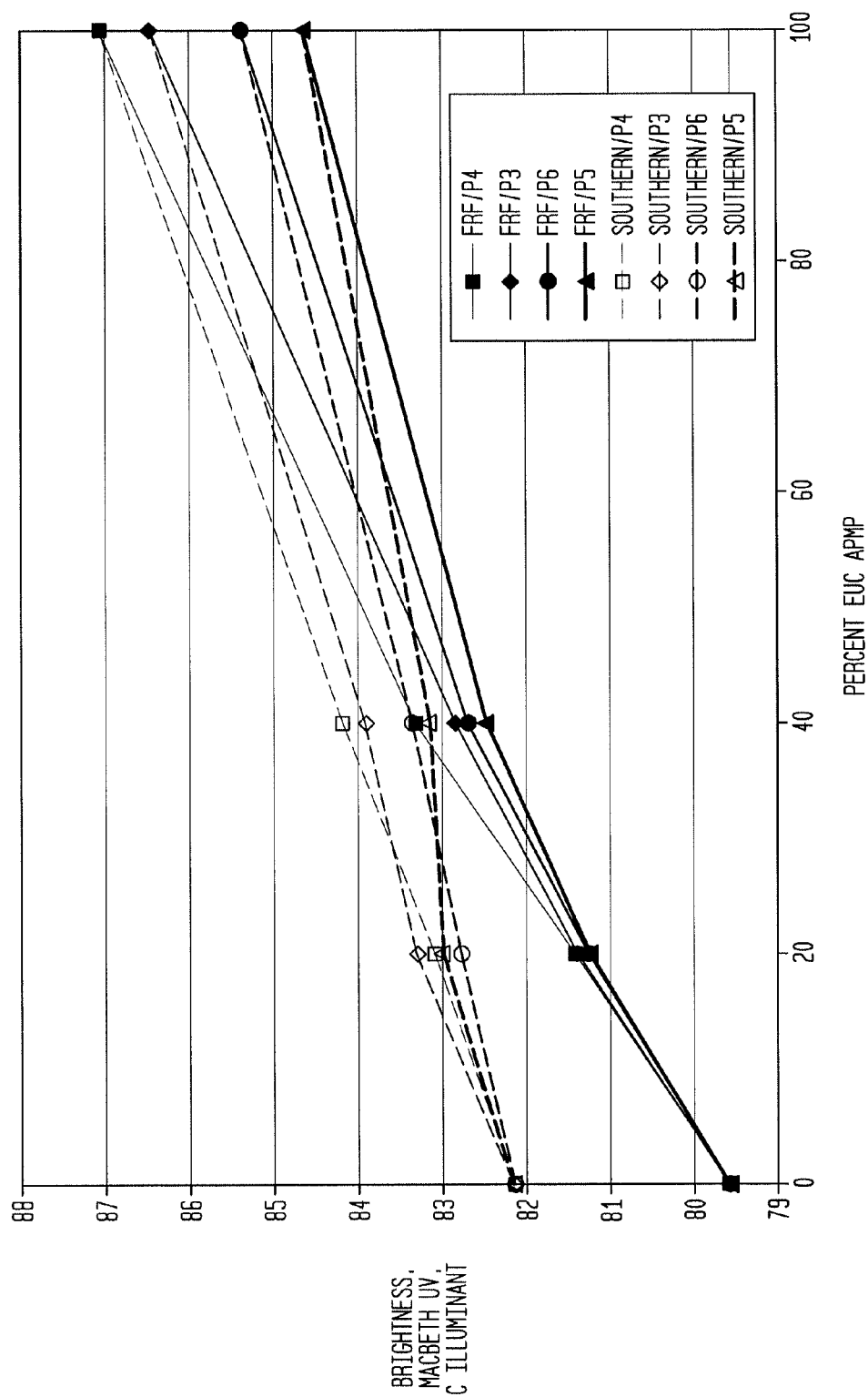
FIG. 16 compares the brightness obtained with blends of eucalyptus APMP with de-inked waste paper as compared to the brightness obtained with blends of eucalyptus APMP with kraft furnishes.
Figure 17:
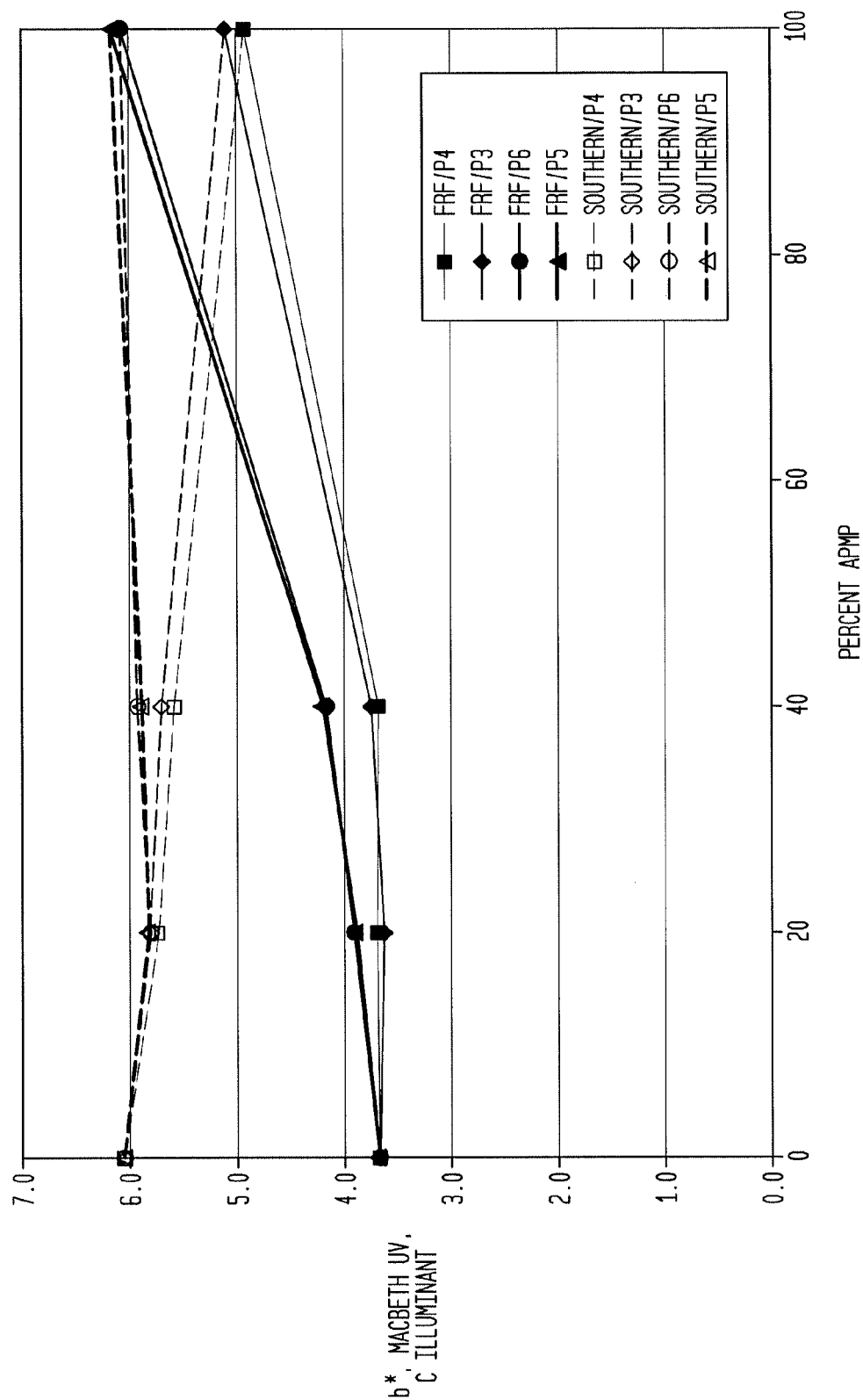
FIG. 17 compares the b* value (yellowness/blueness) obtained with blends of eucalyptus APMP with de-inked waste paper as compared to the brightness obtained with blends of eucalyptus APMP with kraft furnishes.
Figure 18:
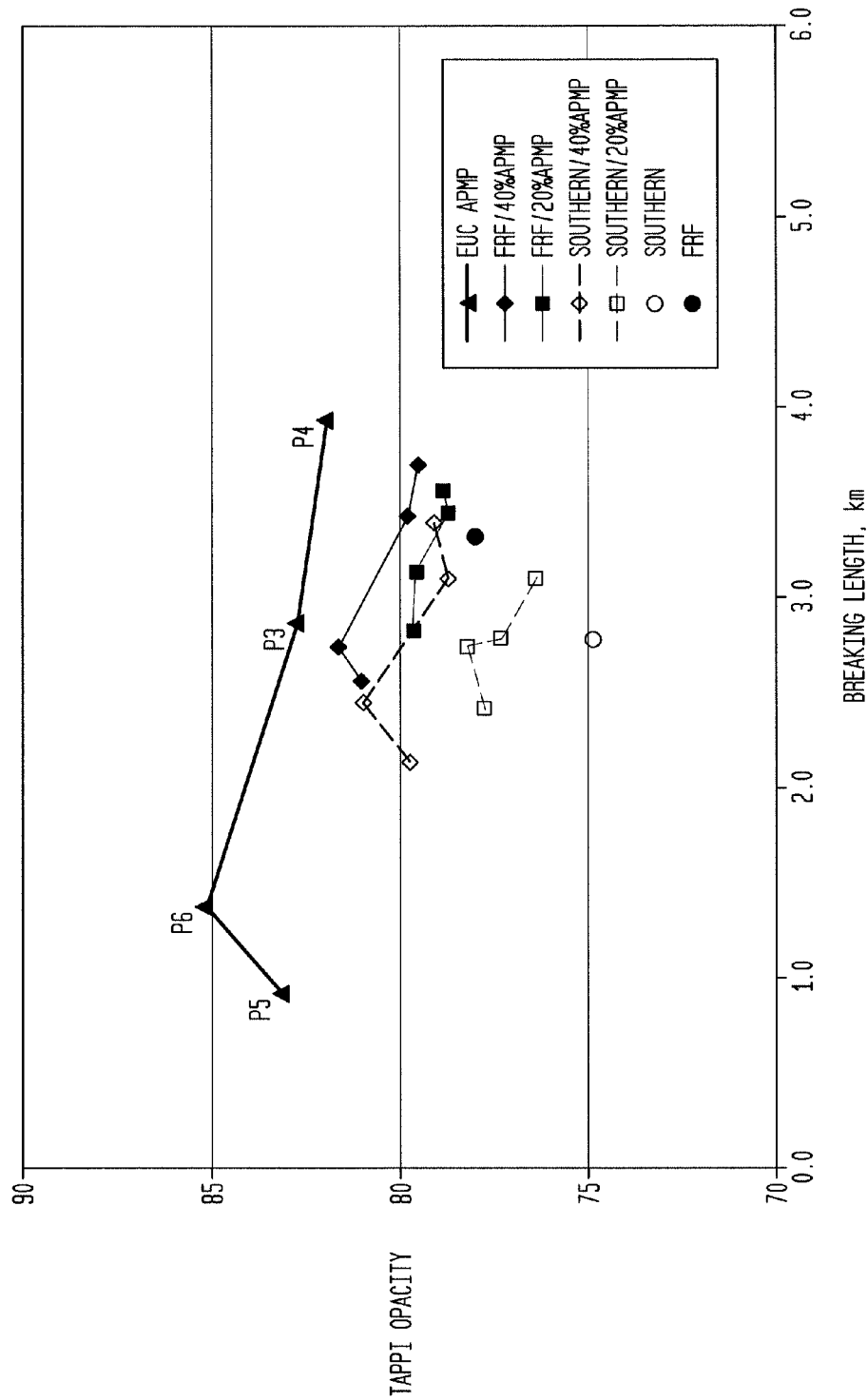
FIG. 18 illustrates the very high opacity attainable with eucalyptus APMP and blends thereof as compared to kraft and de-inked recycled furnishes.
Figure 19:
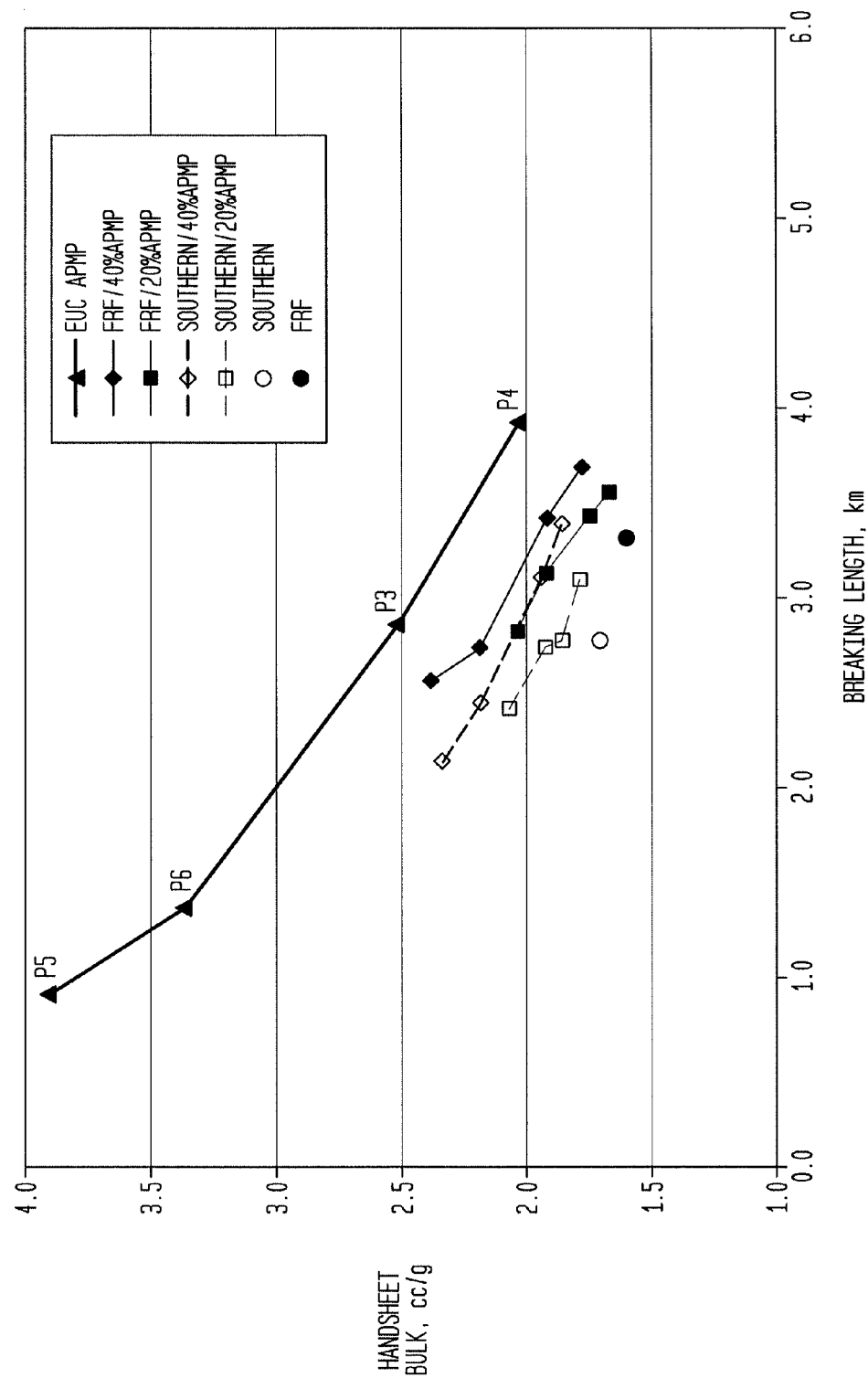
FIG. 19 is another illustration of the very high levels of bulk attainable with APMP eucalyptus blends at desirably low strengths for tissue making.

FIGS. 16, 17, and 18 show the effect of eucalyptus APMP on optical properties of handsheets. In either de-inked or virgin southern furnish, APMP increases brightness and opacity, while being neutral on b* (yellowness) up to 40% APMP. FIG. 19 shows how APMP increases the bulk/strength curve at 20 and 40% addition rates.

Figure 20:
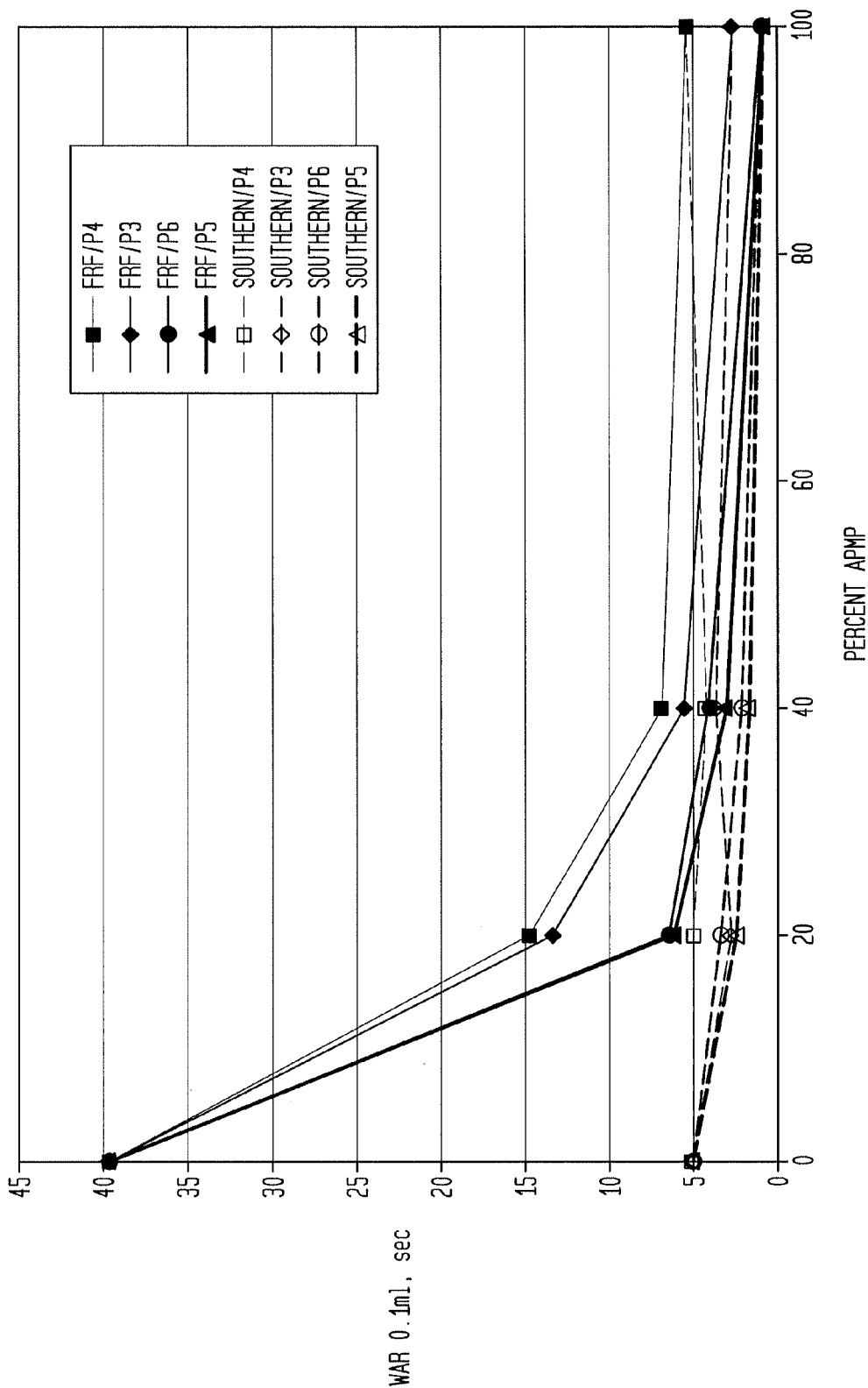
FIG. 20 illustrates the reduction in WAR (water absorption rate) attainable with blends of eucalyptus APMP with de-inked recycled pulp.
Figure 21:
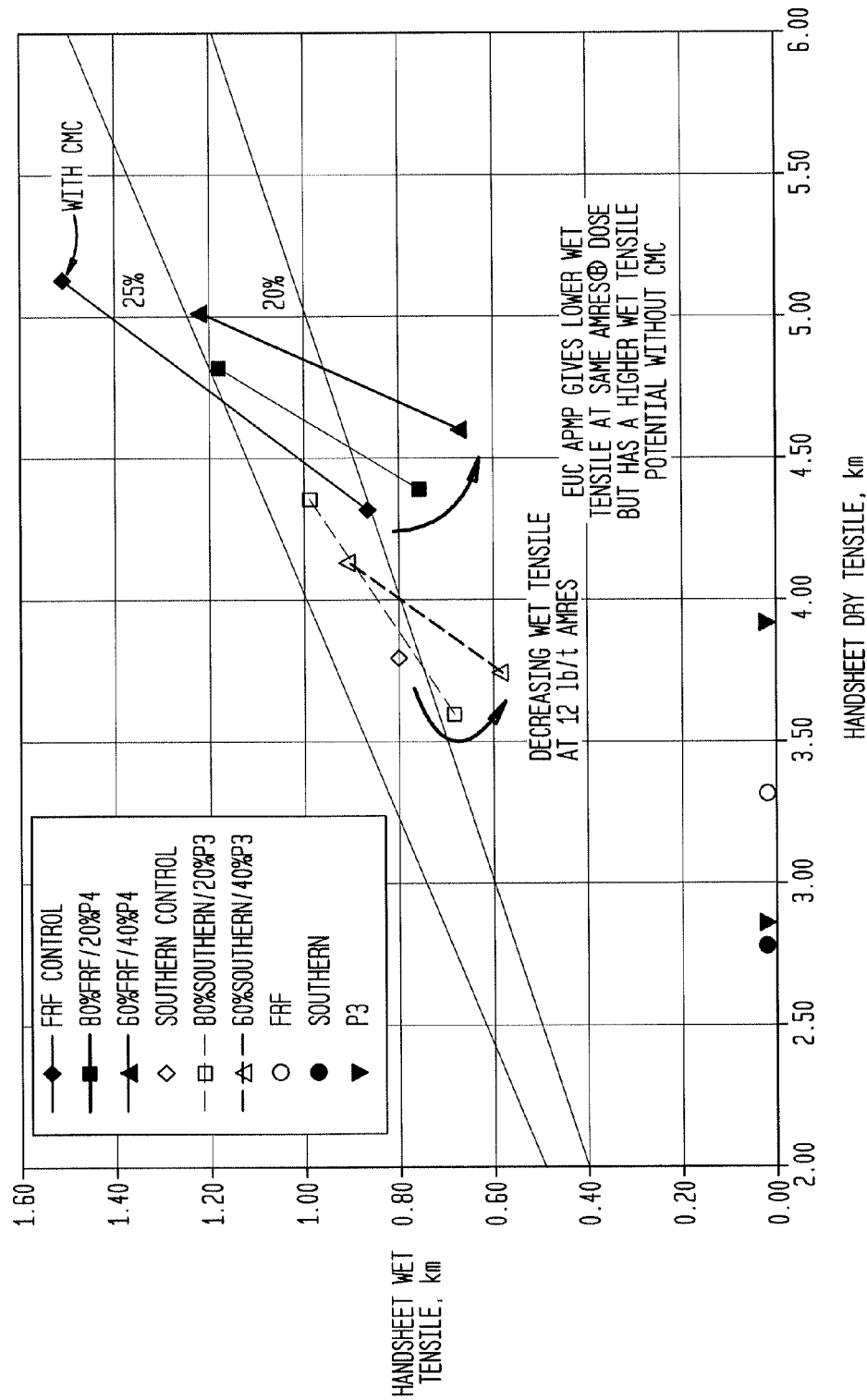
FIG. 21 illustrates the effect of carboxymethylcellulose (CMC) and polyamidoamine (AMRES®) wet strength agents on blends of eucalyptus APMP with southern kraft furnishes and de-inked recycled fiber.

FIG. 20 shows that APMP substantially improves handsheet absorbency of de-inked pulp (FRF), while having less impact on virgin furnish. FIG. 21 shows how eucalyptus APMP impacts wet tensile in handsheets.

Figure 22:
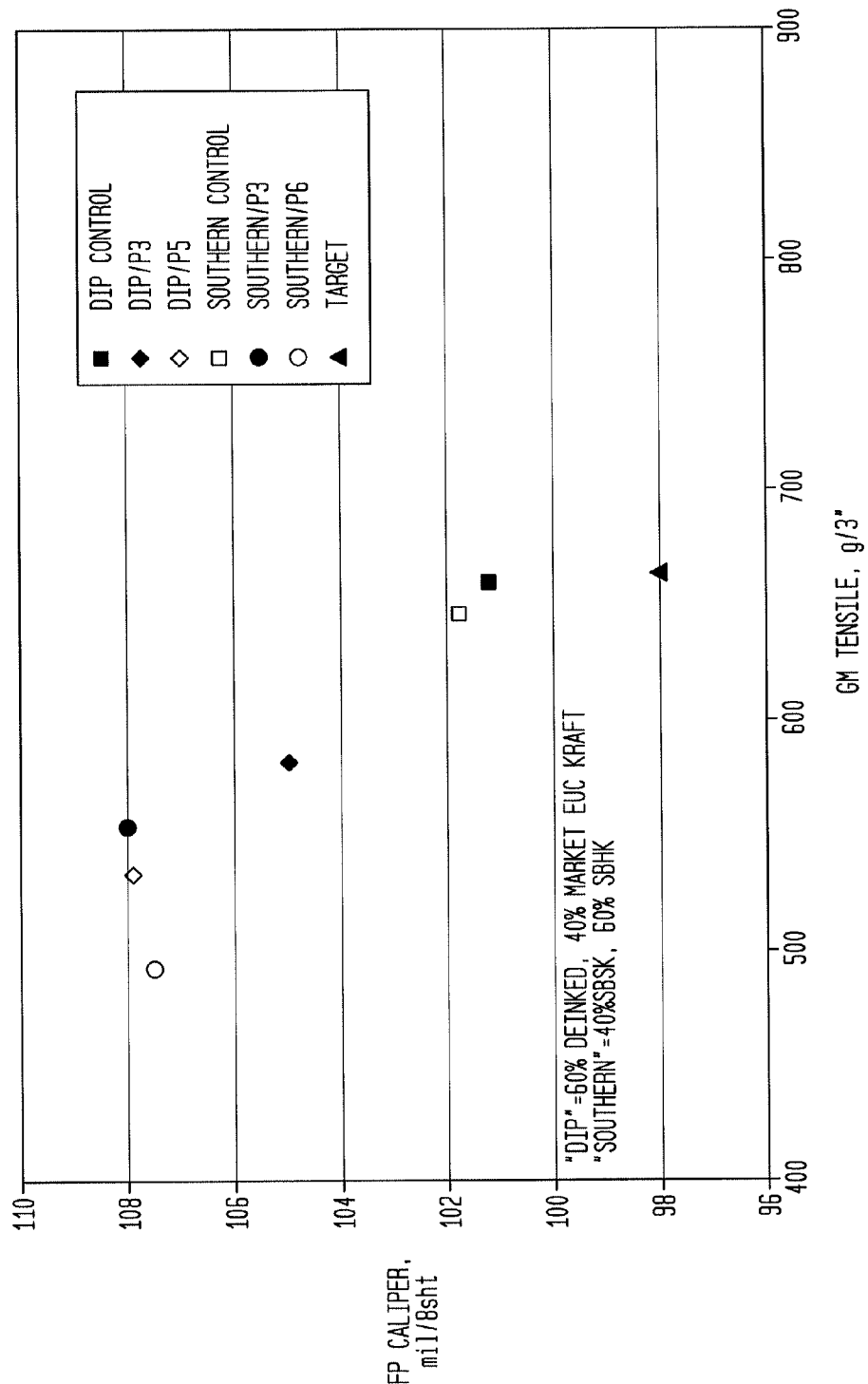
FIG. 22 illustrates the surprising caliper and strength for tissue grades attainable by incorporating eucalyptus APMP into conventional papermaking blends.

FIG. 22 shows the impact of 20% eucalyptus APMP on tissue bulk/caliper. Products were measured at constant emboss penetration. APMP increases bulk about 6% relative to the controls.

Figure 23:
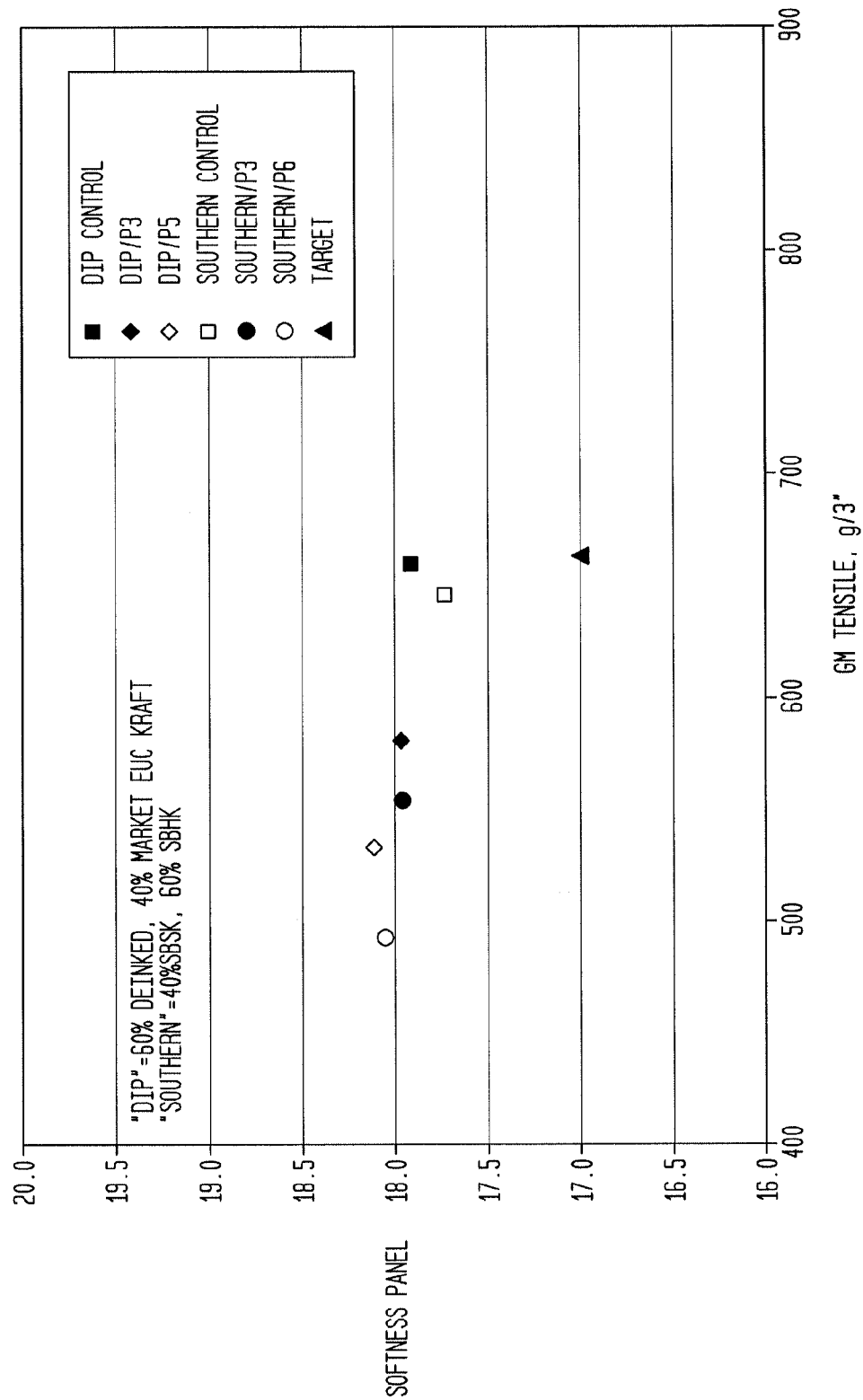
FIG. 23 illustrates the surprising softness and strength for tissue grades attainable by incorporating eucalyptus APMP into conventional papermaking blends.

FIG. 23 shows that, surprisingly, even 20% APMP does not hurt softness. There is a strong correlation between softness and strength, and it is expected that bringing the APMP prototype tensiles up to that of the controls would result in nearly identical softness values. All trial product softness values were above the level of 17, which is indicative of midgrade tissue product, significantly softer than economy and commercial grades, but not as soft as premium grades, which would normally score around 19 or higher by softness panels.

Figure 24:
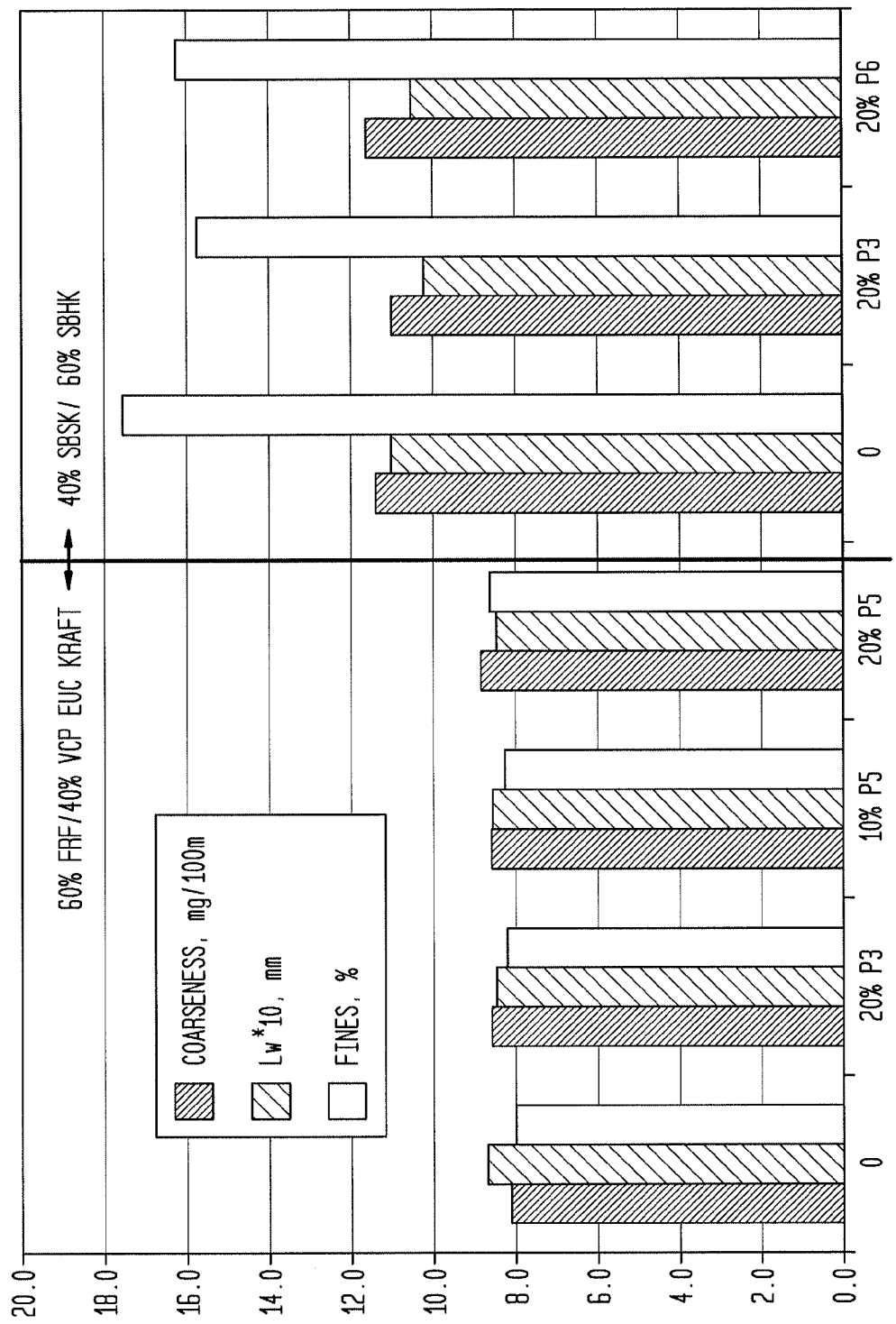
FIG. 24 compares parameters relating to fiber length distribution of blends of eucalyptus APMP with recycled de-inked fiber and eucalyptus kraft as compared to blends of eucalyptus APMP with southern bleached softwood kraft and southern bleached hardwood kraft fiber.

FIG. 24 shows key morphology parameters of tissue finished products. 20% APMP has an almost negligible effect on sheet morphology relative to the control. Table 23, below, summarizes the morphology of individual pulps used to make the products in FIG. 24.

TABLE 23

Morphology of pulps used to make tissue prototypes

| | P3 | P5 | P6 | FRF/Euc kraft | Southern |
|---|---|---|---|---|---|
| $L_n$, mm (# ave) | 0.38 | 0.37 | 0.36 | 0.44 | 0.33 |
| $L_w$, mm (wt. ave) | 0.71 | 0.71 | 0.69 | 0.87 | 1.10 |
| $L_z$, mm (L ave) | 0.92 | 0.96 | 0.95 | 1.30 | 1.75 |
| Coarseness, mg/100 m | 10.7 | 12.4 | 10.6 | 8.1 | 11.4 |
| Fines(w), % | 11.6 | 11.6 | 12.1 | 8.0 | 17.6 |
| Curl Index(w) | 0.03 | 0.03 | 0.03 | 0.10 | 0.10 |

Figure 25:
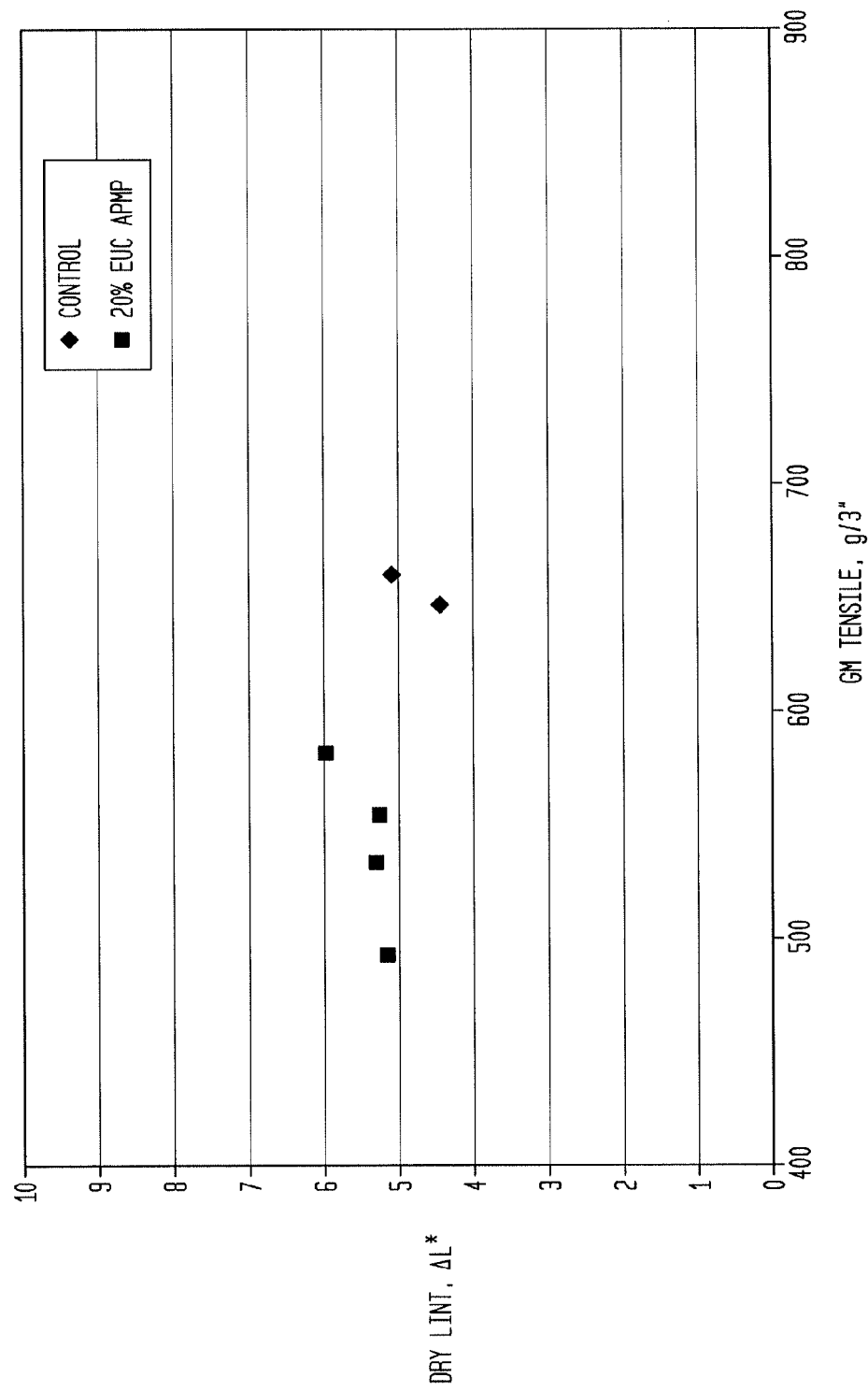
FIG. 25 illustrates the surprising dry lint resistance of tissue grades attainable by incorporating eucalyptus APMP into conventional papermaking blends.

FIG. 25 shows that APMP does not increase lint appreciably when adjusted for strength.

While the invention has been described in connection with numerous examples and embodiments, modifications to those examples and embodiments within the spirit and scope of the invention will be readily apparent to those of skill in the art. In view of the foregoing discussion, relevant knowledge in the art and references, including co-pending applications discussed above, the relevant disclosures of which are all incorporated herein by reference in their entireties, further description is deemed unnecessary.

We claim:

1. A cellulosic tissue comprising:
   (A) cellulosic fibers that include at least one of (a) chemically pulped fibers and (b) mechanically pulped fibers, wherein the cellulosic fibers include:
      (i) from about 10% to about 50% by weight eucalyptus fibers having a lignin content of at least about 20% by weight; and
      (ii) a percentage by weight of regenerated cellulosic microfibers; and
   (B) virgin chemically pulped fibers, recycle fiber in an amount of up to 50%,
      wherein the eucalyptus fiber has been prepared from eucalyptus chips by alkaline peroxide mechanical pulping, exhibiting an ISO brightness of at least $0.82 \times (\% \text{ VCP}) + 0.795 \times (\% \text{ RF})^{0.98} + 0.84 \times (\% \text{ APMP})$, and
      wherein % VCP is the percentage of virgin chemical pulp in the sheet, % RF, the percentage of recycle fiber, and % alkaline peroxide mechanical pulping (APMP), the percentage of APMP eucalyptus.

2. The cellulosic tissue of claim 1, wherein the eucalyptus fibers have a lignin content of at least about 23%, and exhibit an ISO brightness of at least about 82.

3. The cellulosic tissue of claim 2, wherein the chemically pulped fibers are selected from a group consisting of hardwood and softwood fibers, and wherein the weight percentage of chemically pulped softwood fiber in the tissue is at most 30%.

4. The cellulosic tissue of claim 1, wherein the eucalyptus fibers have been prepared from eucalyptus chips by alkaline peroxide mechanical pulping.

5. The cellulosic tissue of claim 1, wherein the eucalyptus fibers have been prepared from eucalyptus chips by pre-conditioning refiner chemical alkaline peroxide mechanical pulping.

6. The cellulosic tissue of claim 1, wherein the eucalyptus fibers have been prepared from eucalyptus chips by pre-conditioning refiner chemical alkaline peroxide mechanical pulping.

7. The cellulosic tissue of claim 6, wherein the weight percentage of the chemically pulped fibers in the tissue is at most 30%.

8. The cellulosic tissue of claim 7, wherein the weight percentage of chemically pulped softwood fibers in the tissue is at most 30%.

9. The cellulosic tissue of claim 1, wherein the tissue exhibits a machine direction (MD) stretch of between about 20% and about 30%.

10. The cellulosic tissue of claim 1, wherein the chemically pulped fibers are selected from a group consisting of hardwood and softwood fibers, and wherein the weight percentage of chemically pulped softwood fibers in the tissue is at most 30%.

11. A method of manufacturing a tissue product, wherein a furnish comprising cellulosic fibers is deposited on a translating foraminous support and is thereafter dewatered and dried, the method comprising:
(A) a step of providing a cellulosic furnish comprising from 50% to 90% of cellulosic papermaking fibers that include (a) chemically pulped fibers and (b) mechanically pulped fibers, wherein the cellulosic papermaking fibers include (i) from about 3% to about 30% by weight of regenerated cellulosic microfibers, and (ii) from about 10% to about 50% high lignin eucalyptus fibers having a lignin content of at least about 20%, an ISO brightness of at least about 84, a Canadian Standard Freeness (CSF) of at least about 400 ml, a bulk of between 2.2 and 4.2 cc/g, and a breaking length of between about 1.2 and 4.7 km;
(B) depositing the cellulosic furnish on a translating foraminous support to form an aqueous web of cellulosic fibers;
(C) removing the aqueous web of fibers from the support; and
(D) thereafter, dewatering and drying the removed web to form the tissue product.

12. The method of claim 11, wherein the tissue exhibits a machine direction (MD) stretch of between about 20% and about 30%.

13. The method of claim 11, wherein the chemically pulped fibers are selected from a group consisting of hardwood and softwood fibers, and wherein the weight percentage of chemically pulped softwood fibers in the tissue is at most 30%.

14. The method of claim 11, wherein the eucalyptus fibers have been prepared from eucalyptus chips by alkaline peroxide mechanical pulping.

15. The method of claim 11, wherein the eucalyptus fibers have been prepared from eucalyptus chips by pre-conditioning refiner chemical alkaline peroxide mechanical pulping.

16. A cellulosic tissue comprising:
from 50% to 90% of cellulosic papermaking fibers that include chemically pulped fibers and mechanically pulped fibers,
wherein the cellulosic papermaking fibers have from about 5% to about 50% high lignin eucalyptus fibers having a lignin content of at least about 23%, an ISO brightness of at least about 83, a Canadian Standard Freeness (CSF) of at least about 400 ml, a bulk of between 2.2 and 4.2 cc/g, and a breaking length of between about 1.2 and about 4.7 km.

17. The cellulosic tissue of claim 16, wherein the tissue exhibits a machine direction (MD) stretch of between about 20% and about 30%.

18. The cellulosic tissue of claim 16, wherein the chemically pulped fibers are selected from a group consisting of hardwood and softwood fibers, and wherein the weight percentage of chemically pulped softwood fibers in the tissue is at most 30%.

19. The cellulosic tissue of claim 16, wherein the eucalyptus fibers have been prepared from eucalyptus chips by alkaline peroxide mechanical pulping.

20. The cellulosic tissue of claim 16, wherein the eucalyptus fibers have been prepared from eucalyptus chips by pre-conditioning refiner chemical alkaline peroxide mechanical pulping.

21. A cellulosic tissue comprising:
from 50% to 90% cellulosic papermaking fibers that include chemically pulped fibers and mechanically pulped fibers,
wherein the cellulosic fibers have (i) from about 3% to about 30% by weight regenerated cellulosic microfibers, and (ii) from about 10% to about 50% high lignin eucalyptus fibers having a Kappa number of at least about 150.

22. The cellulosic tissue of claim 21, wherein the tissue exhibits a machine direction (MD) stretch of between about 20% and about 30%.

23. The cellulosic tissue of claim 21, wherein the chemically pulped fibers are selected from a group consisting of hardwood and softwood fibers, and wherein the weight percentage of chemically pulped softwood fibers in the tissue is at most 30%.

24. A cellulosic tissue comprising:
(a) at least one of (i) about 40% to about 70% recycle fiber and (ii) a percentage of eucalyptus kraft fiber;
(b) from about 3% to about 30% by weight regenerated cellulosic microfibers; and
(c) about 15% to about 30% high lignin eucalyptus fibers having a lignin content of at least about 20%,
wherein the tissue has a basis weight of from about 10 to about 17 lbs per ply per 3000 sq ft ream, a specific geometric mean tensile of between about 35 and 45 g/3 in. per pound of basis weight, and a specific eight sheet caliper of between about 3 to about 3.5 mils per ply per eight sheets per pound of basis weight.

25. The cellulosic tissue of claim 24, wherein the tissue exhibits a machine direction (MD) stretch of between about 20% and about 30%.

26. The cellulosic tissue of claim 24, wherein the chemically pulped fibers are selected from a group consisting of hardwood and softwood fibers, and wherein the weight percentage of chemically pulped softwood fibers in the tissue is at most 30%.

27. The cellulosic tissue of claim 24, wherein the eucalyptus fibers have been prepared from eucalyptus chips by alkaline peroxide mechanical pulping.

28. The cellulosic tissue of claim 24, wherein the eucalyptus fibers have been prepared from eucalyptus chips by pre-conditioning refiner chemical alkaline peroxide mechanical pulping.

29. A cellulosic tissue comprising:
(a) at least one of (i) about 25% to about 40% softwood kraft fiber and (ii) from about 40 to about 60% hardwood kraft fiber;
(b) from about 3% to about 10% by weight of regenerated cellulosic microfiber; and
(c) about 15% to about 30% high lignin eucalyptus fibers having a lignin content of at least about 20%,
wherein the tissue has a basis weight of from about 11 to about 17 per ply lbs per 3000 sq ft ream, a specific geometric mean tensile of between about 35 and 45 g/3 in. per pound of basis weight, and a specific eight sheet caliper of between about 3 to about 3.5 mils per eight sheets per pound of basis weight.

30. The cellulosic tissue of claim 29, wherein the tissue exhibits a machine direction (MD) stretch of between about 20% and about 30%.

31. The cellulosic tissue of claim 30, wherein the weight percentage of chemically pulped softwood fibers in the tissue is at most 30%.

32. The cellulosic tissue of claim 30, wherein the eucalyptus fibers have been prepared from eucalyptus chips by alkaline peroxide mechanical pulping.

33. The cellulosic tissue of claim 30, wherein the eucalyptus fibers have been prepared from eucalyptus chips by pre-conditioning refiner chemical alkaline peroxide mechanical pulping.

34. A cellulosic tissue comprising:
from at least about 10% to about 90% by weight of recycled pulp fibers, wherein the recycled pulped fibers include at least one of hardwood and softwood fibers; and
from about 10% to about 40% by weight of alkaline peroxide bleached eucalyptus fibers having a coarseness of at least about 9.0 mg/100 m, a Kappa number of at least about 80, and an ISO brightness of at least about 82,
wherein the cellulosic tissue has a geometric mean breaking modulus of at most about 75 g/%, a basis weight of least about 22 lbs per 3000 sq ft ream and an MD stretch of at least about 11%.

35. The cellulosic tissue of claim 34, wherein the tissue exhibits a machine direction (MD) stretch of between about 20% and about 30%.

36. The cellulosic tissue of claim 35, wherein the weight percentage of pulped softwood fibers in the tissue is at most 30%.

37. The cellulosic tissue of claim 36, wherein the eucalyptus fibers have been prepared from eucalyptus chips by alkaline peroxide mechanical pulping.

38. The cellulosic tissue of claim 34, wherein the eucalyptus fibers have been prepared from eucalyptus chips by pre-conditioning refiner chemical alkaline peroxide mechanical pulping.

39. The cellulosic tissue of claim 34, wherein the eucalyptus fibers have been prepared from eucalyptus chips by pre-conditioning refiner chemical alkaline peroxide mechanical pulping.

40. A roll of bath tissue comprising:
(A) cellulosic fibers that include at least one of (a) chemically pulped fibers and (b) mechanically pulped fibers, wherein (i) not more than 30% by weight of the tissue is chemically pulped softwood fibers, (ii) the cellulosic fibers have from about 10% to about 50% by weight eucalyptus fibers having a lignin content of at least about 20% by weight, (iii) the cellulosic fibers have from about 3% to about 10% by weight regenerated cellulosic microfibers, and (iv) the tissue exhibits a machine direction (MD) stretch of between about 20% and about 30%; and
(B) virgin chemically pulped fibers, recycle fiber in an amount of up to 50%.

41. The roll of bath tissue of claim 40, wherein the eucalyptus fiber has been prepared from eucalyptus chips by alkaline peroxide mechanical pulping, exhibiting an ISO brightness of at least $0.82 \times (\% \text{ VCP}) + 0.795 \times (\% \text{ RF})^{0.98} + 0.84 \times (\% \text{ APMP})$, and wherein % VCP is the percentage of virgin chemical pulp in the sheet, % RF, the percentage of recycle fiber, and % alkaline peroxide mechanical pulping (APMP), the percentage of APMP eucalyptus.

42. The roll of bath tissue of claim 40, wherein the eucalyptus fibers have a lignin content of at least 21% by weight.

43. The roll of bath tissue of claim 40, wherein the eucalyptus fibers have a lignin content of at least 23% by weight.

44. The roll of bath tissue of claim 43, wherein the eucalyptus fibers have been prepared from eucalyptus chips by alkaline peroxide mechanical pulping.

45. The roll of bath tissue of claim 44, wherein the eucalyptus fibers have been prepared from eucalyptus chips by pre-conditioning refiner chemical alkaline peroxide mechanical pulping.

46. A three-ply bath tissue product comprising:
(a) an upper stratified ply comprising two strata, an outer stratum and an inner stratum,
(i) the outer stratum comprising a blend of at least about 30% to about 70% kraft fiber and at least 30% to about 70% by weight of eucalyptus kraft; and
(ii) the inner stratum comprising at least about 50% eucalyptus fibers having a lignin content of at least about 20% by weight;
(b) an interior ply having a basis weight of at least about 6 to about 15 lbs per 3000 sq ft ream, the interior ply comprising:
(i) at least about 30% to about 70% eucalyptus fibers having a lignin content of at least about 20% by weight; and
(ii) from at least about 30% to about 70% by weight of bleached softwood kraft fibers; and
(c) a lower stratified ply comprising two strata, a first stratum and a second stratum,
(i) the first stratum comprising from at least about 30% to about 70% kraft fiber and from about 30% to about 70% by weight of eucalyptus kraft; and
(ii) the second stratum comprising at least about 50% eucalyptus fibers having a lignin content of at least about 20% by weight.

47. The three-ply bath tissue product of claim 46, wherein the tissue exhibits a machine direction (MD) stretch of between about 20% and about 30%.

48. The three-ply bath tissue product of claim 46, wherein the weight percentage of chemically pulped softwood fibers in the tissue is at most 30%.

49. The three-ply bath tissue product of claim 46, wherein the eucalyptus fibers have been prepared from eucalyptus chips by alkaline peroxide mechanical pulping.

50. The three-ply bath tissue product of claim 46, wherein the eucalyptus fibers have been prepared from eucalyptus chips by pre-conditioning refiner chemical alkaline peroxide mechanical pulping.

51. The three-ply bath tissue product of claim 50, wherein the interior ply and the upper stratified ply have been joined by being embossed together.

52. The three-ply bath tissue product of claim 50, wherein the fibrous composition of the upper stratified ply is substantially the same as that of the fibrous composition of the lower stratified ply.

53. The three-ply bath tissue product of claim 50, wherein the depth of emboss of the lower stratified ply is less than 80% of the depth of emboss of the upper stratified ply.

54. The three-ply bath tissue product of claim 50, wherein the depth of emboss of the lower stratified ply is less than 50% of the depth of emboss of the upper stratified ply.

55. The three-ply bath tissue product of claim 50, wherein the lower stratified ply is generally unembossed.

56. The three-ply bath tissue product of claim 46, wherein the fibrous composition of the upper stratified ply is substantially the same as that of the fibrous composition of the lower stratified ply.

57. The three-ply bath tissue product of claim 46, wherein the outer stratum of the upper stratified ply further comprises at least about 5% by weight of individualized regenerated cellulosic microfiber having a diameter of at most about 5 microns and passing a screen of about 14 mesh.

58. The three-ply bath tissue product of claim 46, wherein the outer stratum of the upper stratified ply further comprises at least about 5% by weight of individualized regenerated cellulosic microfiber having a number average diameter of at most about 4 microns and a number average length of between about 50 microns and about 2000 microns.

59. The three-ply bath tissue product of claim 46, wherein the outer stratum of the upper stratified ply comprises at least about 8% by weight of individualized regenerated cellulosic microfibers.

60. The three-ply bath tissue product of claim 46, wherein the outer stratum of the upper stratified ply comprises at least about 8% by weight of individualized regenerated cellulosic microfibers having a number average diameter of at most about 2 microns.

61. The three-ply bath tissue product of claim 60, wherein the outer stratum of the upper stratified ply further comprises at least about 10% by weight of individualized regenerated cellulosic microfibers having a number average diameter of at most about 4 microns and a number average length of between about 50 microns and 2000 microns.

62. The three-ply bath tissue product of claim 61, wherein the outer stratum of the upper stratified ply comprises at least about 8% by weight of individualized regenerated cellulosic microfiber having a number average diameter of at most about 2 microns.

63. The three-ply bath tissue product of claim 46, wherein the outer stratum of the upper stratified ply further comprises at least about 10% by weight of individualized regenerated cellulosic microfibers having a number average diameter of at most about 2 microns and a number average length of between about 50 microns and about 2000 microns.

64. The three-ply bath tissue product of claim 46, wherein the outer stratum of the upper stratified ply comprises at least about 5% by weight of individualized regenerated cellulosic microfibers having a number average diameter of at most about 1 micron.

65. The three-ply bath tissue product of claim 46, wherein the outer stratum of each of the upper stratified ply and the lower stratified ply further comprises at least about 5% by weight of individualized regenerated cellulosic microfibers having a number average diameter of at most about 4 microns and a number average length of between about 50 microns and about 2000 microns.

66. The three-ply bath tissue product of claim 46, wherein each of the inner stratum of the upper stratified ply and the second stratum of the lower stratified ply comprises at least about 70% eucalyptus fibers having a lignin content of at least about 20% by weight.

67. The three-ply bath tissue product of claim 46, wherein each of the inner stratum of the upper stratified ply and the second stratum of the lower stratified ply comprises debonder.

68. The three-ply bath tissue product of claim 46, wherein the interior ply exhibits a bulk at least 3% greater than that of the exterior plies.

69. The three-ply bath tissue product of claim 68, wherein the interior ply is uncalendered.

70. The three-ply bath tissue product of claim 68, wherein the interior ply exhibits percent crepe at least 3% greater than that of the exterior plies.

71. The three-ply bath tissue product of claim 68, wherein the interior ply comprises an amount of alkaline peroxide mechanical pulping (APMP) eucalyptus that is at least about 10% greater, based on the weight of the ply, than the amount of alkaline peroxide mechanical pulping (APMP) eucalyptus in the exterior plies.

72. A three-ply bath tissue product having:
(a) an upper stratified ply comprising two strata, an outer stratum and an inner stratum,
  (i) the outer stratum comprising a blend of at least about 30% to about 70% kraft fiber and at least 30% to about 70% by weight of eucalyptus kraft, at least about 5% by weight of individualized regenerated cellulosic microfibers having a number average diameter of at most about 4 microns and a number average length of between about 50 microns and about 2000 microns; and
  (ii) the inner stratum comprising at least about 70% eucalyptus fibers having a lignin content of at least about 20% by weight;
(b) an interior ply having a basis weight of at least about 6 to about 15 lbs per 3000 sq ft ream, the interior ply comprising:
  (i) at least about 40% to about 90% eucalyptus fibers having a lignin content of at least about 20% by weight; and
  (ii) from at least about 10% to about 60% by weight of bleached kraft fiber; and
(c) a lower stratified ply comprising two strata, a first stratum and a second stratum,
  (i) the first stratum comprising from at least about 30% to about 70% kraft fiber and from about 30% to about 70% by weight of eucalyptus kraft; and
  (ii) the second stratum comprising at least about 70% eucalyptus fibers having a lignin content of at least about 20% by weight.

73. The three-ply bath tissue product of claim 72, wherein the interior ply is substantially homogeneous in composition.

74. The three-ply bath tissue product of claim 72, wherein the upper stratified ply and the lower stratified ply have substantially identical fibrous compositions.

75. The three-ply bath tissue product of claim 72, further comprising up to about 50% recycle fibers, wherein the kraft fiber is virgin fiber, the eucalyptus fibers are alkaline peroxide mechanical pulping (APMP) eucalyptus fibers and the outer ply of the three ply bath tissue product exhibits an ISO brightness of the outer ply of at least $0.82 \times (\% \text{ VCP}) + 0.795 \times (\% \text{ RF})^{0.98} + 0.84 \times (\% \text{ APMP})$,
wherein % VCP is the percentage of virgin kraft fiber in the sheet, % RF, the percentage of recycle fiber and % APMP+CMF is the percentage of APMP eucalyptus and regenerated cellulosic microfibers in the outer ply.

76. The three-ply bath tissue product of claim 72, wherein the chemically pulped fibers are selected from a group consisting of hardwood and softwood fibers, and wherein the weight percentage of chemically pulped softwood fiber in the tissue is at most 30%.

77. The three-ply bath tissue product of claim 72, wherein the eucalyptus fibers in the interior ply have a lignin content of at least about 23%, and exhibit an ISO brightness of at least about 82.

78. The three-ply bath tissue product of claim 72, wherein the tissue exhibits a machine direction (MD) stretch of between about 20% and about 30%.

79. The three-ply bath tissue product of claim 78, wherein the chemically pulped fibers are selected from a group consisting of hardwood and softwood fibers, and wherein the weight percentage of chemically pulped softwood fibers in the tissue is at most 30%.

80. The three-ply bath tissue product of claim 72, wherein the eucalyptus fibers have been prepared from eucalyptus chips by alkaline peroxide mechanical pulping.

81. The three-ply bath tissue product of claim 72, wherein the eucalyptus fibers have been prepared from eucalyptus chips by pre-conditioning refiner chemical alkaline peroxide mechanical pulping.

\* \* \* \* \*

UNITED STATES PATENT AND TRADEMARK OFFICE
CERTIFICATE OF CORRECTION

| | | |
|---|---|---|
| PATENT NO. | : 9,476,162 B2 | |
| APPLICATION NO. | : 14/992163 | |
| DATED | : October 25, 2016 | |
| INVENTOR(S) | : Jeffrey A. Lee et al. | |

It is certified that error appears in the above-identified patent and that said Letters Patent is hereby corrected as shown below:

On the Title Page

In item "(54)", the title "HIGH SOFTNESS, HIGH DURABILITY BATCH TISSUE INCORPORATING HIGH LIGNIN EUCALYPTUS FIBER" should read -- HIGH SOFTNESS, HIGH DURABILITY BATH TISSUE INCORPORATING HIGH LIGNIN EUCALYPTUS FIBER --.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*